US010514506B2

(12) United States Patent
Brusberg et al.

(10) Patent No.: US 10,514,506 B2
(45) Date of Patent: Dec. 24, 2019

(54) OPTICAL COUPLERS FOR EVANESCENT COUPLING OF POLYMER CLAD FIBERS TO OPTICAL WAVEGUIDES USING ALIGNMENT FEATURES

(71) Applicant: CORNING OPTICAL COMMUNICATIONS LLC, Hickory, NC (US)

(72) Inventors: Lars Martin Otfried Brusberg, Corning, NY (US); Douglas Llewellyn Butler, Painted Post, NY (US); Alan Frank Evans, Beaver Dams, NY (US); Ming-Jun Li, Horseheads, NY (US); James Scott Sutherland, Corning, NY (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 15/884,622

(22) Filed: Jan. 31, 2018

(65) Prior Publication Data
US 2019/0235171 A1 Aug. 1, 2019

(51) Int. Cl.
*G02B 6/293* (2006.01)
*G02B 6/30* (2006.01)
(Continued)

(52) U.S. Cl.
CPC ..... *G02B 6/29331* (2013.01); *G02B 6/02033* (2013.01); *G02B 6/245* (2013.01);
(Continued)

(58) Field of Classification Search
CPC .............. G02B 6/29331; G02B 6/245
See application file for complete search history.

(56) References Cited

U.S. PATENT DOCUMENTS 4,097,117 A * 6/1978 Neil ................. G02B 6/30
385/30
5,046,809 A 9/1991 Stein
(Continued)

FOREIGN PATENT DOCUMENTS

CN 1880986 A 12/2006
CN 102866461 A 1/2013
(Continued)

OTHER PUBLICATIONS

Barry et al; "Efficient Multimode Optical Fiber-To-Waveguide Coupling for Passive Alignment Applications in Multichip Modules," IEEE Transactions on Components, Packaging, and Manufacturing Technology: Part B, vol. 18, Issue 4., pp. 685-690, 1995.
(Continued)

*Primary Examiner* — Sung H Pak
(74) *Attorney, Agent, or Firm* — Adam R. Weeks

(57) ABSTRACT

An optical coupler that provides evanescent optical coupling includes an optical fiber and a waveguide. The optical fiber has a glass core, a glass inner cladding surrounding the glass core, and a polymeric outer cladding surrounding the glass inner cladding. The glass core and glass inner cladding define for the fiber a glass portion, which can be exposed at one end of the fiber by removing a portion of the polymeric outer cladding. The glass portion has a glass-portion surface. The waveguide has a waveguide core and a surface, and can be part of a photonic device. The glass portion of the fiber is interfaced with the waveguide to establish evanescent coupling between the fiber and the waveguide. Alignment features are used to facilitate aligning the fiber core to the waveguide core during the interfacing process to ensure suitable efficiency of the evanescent coupling.

16 Claims, 42 Drawing Sheets

(51) Int. Cl.
*G02B 6/245* (2006.01)
*G02B 6/36* (2006.01)
*G02B 6/42* (2006.01)
*G02B 6/02* (2006.01)
*G02B 6/28* (2006.01)

(52) U.S. Cl.
CPC ......... *G02B 6/2821* (2013.01); *G02B 6/2852* (2013.01); *G02B 6/30* (2013.01); *G02B 6/3636* (2013.01); *G02B 6/4291* (2013.01); *G02B 6/02042* (2013.01)

(56) References Cited

U.S. PATENT DOCUMENTS

| | | | |
|---|---|---|---|
| 5,513,290 | A | 4/1996 | Ishikawa et al. |
| 5,703,980 | A * | 12/1997 | MacElwee ........... G02B 6/2551 385/30 |
| 6,047,095 | A | 4/2000 | Knoesen et al. |
| 6,052,220 | A | 4/2000 | Lawrence et al. |
| 6,064,783 | A | 5/2000 | Congdon et al. |
| 6,661,949 | B1 | 12/2003 | James et al. |
| 6,690,857 | B2 | 2/2004 | Zhao et al. |
| 6,912,343 | B1 | 6/2005 | Chen et al. |
| 6,987,913 | B2 | 1/2006 | Blauvelt et al. |
| 9,120,693 | B2 | 9/2015 | Hoover et al. |
| 9,359,252 | B1 | 6/2016 | Masters et al. |
| 9,377,587 | B2 | 6/2016 | Taylor et al. |
| 9,563,018 | B2 * | 2/2017 | Budd ................ G02B 6/1228 |
| 2002/0076150 | A1 | 6/2002 | Zhao et al. |
| 2002/0197037 | A1* | 12/2002 | Bailey ................. G01L 1/242 385/123 |
| 2004/0208453 | A1 | 10/2004 | Jacobowitz et al. |
| 2007/0122087 | A1 | 5/2007 | Levinson |
| 2007/0258680 | A1* | 11/2007 | Nadeau ................. G02B 6/423 385/30 |
| 2013/0230274 | A1 | 9/2013 | Fish |
| 2016/0077282 | A1* | 3/2016 | Lipson ................ G02B 6/4291 385/30 |
| 2016/0223750 | A1 | 8/2016 | Shastri et al. |
| 2017/0131472 | A1 | 5/2017 | Kobyakov et al. |
| 2017/0205583 | A1* | 7/2017 | Bennett ............. G02B 6/02033 |
| 2018/0188454 | A1* | 7/2018 | Lipson ................. H01H 85/32 |

FOREIGN PATENT DOCUMENTS

| | | |
|---|---|---|
| WO | 2007130603 A2 | 11/2007 |
| WO | 2013103431 A2 | 7/2013 |

OTHER PUBLICATIONS

Barwicz et al; "Low-Cost Interfacing of Fibers to Nanophotonic Waveguides: Design for Fabrication and Assembly Tolerances," IEEE Photonics Journal, vol. 6, No. 4 (2014), 19 Pages.

Butler et al; "Fiber Array Assemblies for Multifiber Connectorized Ribbon Cables and Methods of Forming Same"; Filed as U.S. Appl. No. 15/797,355, filed Oct. 30, 2017; 57 Pages.

Khalili, et al, "A Highly Stable Evanescently-Coupled Hybrid Fibre Semiconductor Laser Design," 33rd European Conference and Exhibition of Optical Communication. pp. 1-2, 2007.

Alignment Ferrule Assemblies and Connectors for Evanescent Optical Couplers and Evanescent Optical Couplers Using Same, U.S. Appl. No. 16/176,413, filed Oct. 31, 2018. 57 pgs.

International Search Report and Written Opinion PCT/US2019/015756 dated May 3, 2019, 15 Pgs.

* cited by examiner

OPTICAL COUPLERS FOR EVANESCENT COUPLING OF POLYMER CLAD FIBERS TO OPTICAL WAVEGUIDES USING ALIGNMENT FEATURES

FIELD

The present disclosure generally relates to optical couplers used to perform optical coupling between fibers and waveguides, and more particularly relates to optical couplers and optical coupling methods for evanescent coupling of polymer clad fibers to optical waveguides using alignment features.

BACKGROUND

Prior art optical couplers used in photonic integrated circuits (PIC) utilize both a waveguide, e.g., made of silicon, and a polymer waveguide positioned on top of the waveguide to establish evanescent coupling. An optical fiber is then optically coupled to the polymer waveguide for providing optical signals to or from the photonic integrated circuit. The use of the polymer waveguide on the PIC can lead to absorption loss within the polymer waveguide that deteriorates the optical signal. For example, optical attenuation in the polymer waveguide may lead to a loss of about 0.5 dB and coupling between the polymer waveguide and the optical fiber may result in an additional 1 dB of loss.

An alternative to using polymer core and polymer clad waveguides for evanescent optical couplers involves using polymer clad optical fibers having an inner glass cladding that surrounds a glass core and an outer polymer cladding that surrounds the inner glass cladding. The outer polymer cladding keeps the optical mode well bound for low loss propagation but is easily stripped off in a desired location so that the fiber core can be brought into close proximity to the core of another waveguide (e.g., silicon or even another optical fiber) to establish evanescent coupling between the two waveguides.

Efficient evanescent coupling between a polymer clad fiber and a waveguide requires that the separation between the two waveguides needs to be controlled to challenging tolerances, e.g., to micron or even sub-micron levels. Even more challenging is assembling multiple polymer clad fibers to multiple waveguides with this same separation tolerance in a high throughput manufacturing environment. Another challenge is ensuring that the fiber core, which usually has a flat section, is it not tilted or otherwise angularly offset from the waveguide to which the fiber is being evanescently coupled.

SUMMARY

An embodiment of the disclosure is an optical coupler. The optical couple comprises at least one optical fiber having a central axis, a glass core, and a cladding. The cladding has an inner cladding comprising glass and an outer cladding comprising a polymer. The glass core and the glass inner cladding define a glass portion of the fiber. The at least one optical fiber has a stripped portion substantially free of the outer cladding and configured to expose the glass portion. The exposed glass portion defines: i) a first flat surface aligned with the central axis, wherein the core resides at or closely proximate to the first flat surface; and ii) an alignment feature. The optical coupler also comprises: i) at least one waveguide having a waveguide core, and ii) an alignment member. The alignment member is configured to engage the alignment feature to operably support the exposed glass portion of the at least one fiber and to bring the glass core in relative alignment with and sufficiently close to the waveguide core to establish evanescent coupling between the at least one optical fiber and the at least one waveguide.

Another embodiment of the disclosure is an optical coupler. The optical coupler comprises at least one optical fiber having a central axis, a glass core, and a cladding. The cladding has an inner cladding comprising glass and an outer cladding comprising a polymer. The glass core and the glass inner cladding define a glass portion of the fiber. The at least one optical fiber includes an end section wherein the glass portion is at least partially exposed to define a curved glass-portion surface having a central section. The core resides at or closely proximate to the curved glass-portion surface at the central section. The optical coupler also comprises a photonic device having a body that operably supports at least one waveguide having a waveguide core that resides within the body. The central section of the curved glass-portion surface is operably disposed relative to the at least one waveguide and aligned therewith by the operation of at least one alignment feature so that the glass core of the at least one fiber is sufficiently close to the waveguide core of the at least one waveguide to establish evanescent coupling between the at least one optical fiber and the at least one waveguide.

Another embodiment of the disclosure is an optical coupler. The optical coupler comprises a multicore optical fiber having central axis, a plurality of glass cores, and a cladding. The cladding has a glass inner cladding and a polymer outer cladding. The glass cores and the glass inner cladding define a glass portion of the fiber. The multicore optical fiber includes a stripped portion substantially free of the outer cladding and configured to expose the glass portion. The exposed glass portion defines: i) a first flat surface aligned with the central axis, wherein each of the cores resides at or closely proximate to the first flat surface; and ii) an alignment surface. The optical coupler also comprises multiple waveguides each having a waveguide core, and further comprises an alignment member. The alignment member is configured to engage the alignment surface to operably support the exposed glass portion of the multicore fiber and bring the glass cores in relative alignment with and sufficiently close to the waveguide cores to establish evanescent coupling between the multicore optical fiber and the multiple waveguides.

Another embodiment of the disclosure is a method of performing evanescent optical coupling. The method comprises: a) providing at least one optical fiber having a central axis, a glass core, and a cladding, the cladding comprising an inner cladding made of glass and an outer cladding made of a polymer, and wherein the glass core and the glass inner cladding define a glass portion of the fiber; b) processing the at least one optical fiber to define a stripped portion substantially free of the outer cladding and configured to expose the glass portion, wherein the exposed glass portion defines: i) a first flat surface aligned with the central axis, wherein the core resides at or closely proximate to the first flat surface; and ii) an alignment feature; c) operably engaging the alignment feature with an alignment member so that the alignment member operably supports the exposed glass portion to define an alignment assembly; and d) using the alignment assembly to bring the glass core sufficiently close to and in relative alignment with a waveguide core of at least one waveguide to establish evanescent coupling between the at least one optical fiber and the at least one waveguide.

Another embodiment of the disclosure is a method of performing evanescent coupling with waveguides having waveguide cores. The method comprises: a) providing a multicore optical fiber having central axis, a plurality of glass cores, and a cladding, the cladding comprising a glass inner cladding and a polymer outer cladding, and wherein the glass cores and the glass inner cladding define a glass portion of the fiber; b) processing the multicore optical fiber to define a stripped portion substantially free of the outer cladding and configured to expose the glass portion, wherein the exposed glass portion defines: i) a first flat surface aligned with the central axis, wherein each of the cores resides at or proximate to the first flat surface; and ii) an alignment feature; c) operably engaging the alignment feature with an alignment member so that the alignment member operably supports the exposed glass portion to define an alignment assembly; and d) using the alignment assembly to bring the glass cores in relative alignment with and sufficiently close to the waveguide cores to establish coupling between the optical fiber and the waveguides.

Additional features and advantages will be set forth in the detailed description which follows, and, in part, will be apparent to those skilled in the art from that description or recognized by practicing the embodiments as described herein, including the detailed description which follows the claims, as well as the appended drawings.

It is to be understood that both the foregoing general description and the following detailed description are merely exemplary and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1A:
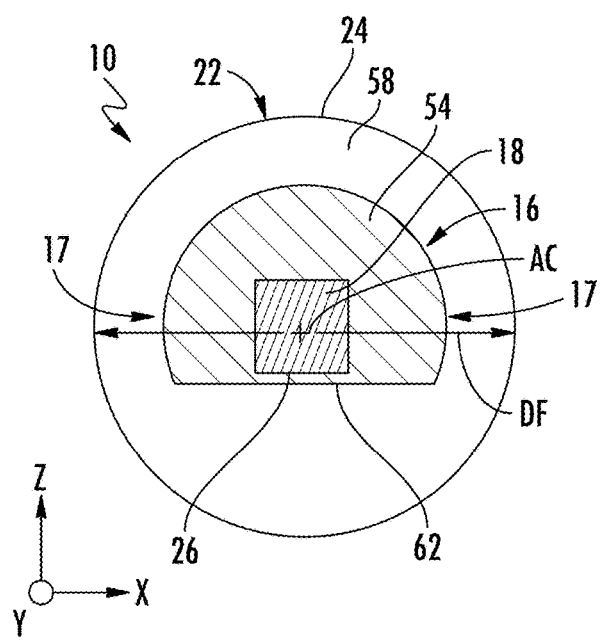
FIGS. 1A through 1D are cross-sectional views of different examples of prior art polymer clad optical fibers ("fibers").

Reference will now be made in detail to the present embodiments, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Example Polymer Clad Fibers

FIGS. 1A through 1D are cross-sectional views of different examples of prior art polymer clad optical fibers ("fibers") 10. Each example fiber 10 includes a central axis AC and has an overall diameter DF. Each fiber 10 includes a glass portion defined by a glass core 18 and a glass inner cladding 54. The fiber includes an outer cladding 58 positioned around the glass portion 16 and in particular around the glass inner cladding 54. The outer cladding 58 is made of a polymer and so is referred to hereinafter as the polymeric outer cladding 58 to distinguish from the glass inner cladding 54.

The polymeric outer cladding 58 can be composed of two parts: an inner, softer layer and an outer harder layer. The polymeric material that makes up the polymeric outer cladding 58 may include high density acrylate, low density acrylate, polyethylene, polystyrene, polymethylmethacrylate, nylon, silicone, silicone based materials, fluorinated acrylates, polyimide, ethylene tetrafluoroethylene, fluoroacrylate, fluoromethacrylate and combinations thereof. The polymeric material may be optically transparent. The polymeric outer cladding 58 may have a diameter ranging from between about 50 µm and about 900 µm, between about 80 µm and about 250 µm or between about 100 µm and 150 µm.

The glass inner cladding 54 and the polymeric outer cladding 58 cooperate to form a cladding 22 disposed around the core 18. The fiber 10 has an outer surface 24, which in various examples can be defined either by: i) the polymeric outer cladding 58; ii) a portion of the polymeric outer cladding 58 and a portion of the glass inner cladding 54; or iii) a portion of the polymeric outer cladding 58 and a portion of the glass inner cladding 54 and a portion of the core 18; iv) the glass inner cladding 54; (v) a portion of the glass inner cladding 54 and a portion of the core 18.

The glass portion 16 has a glass-portion surface 62 formed when the fiber 10 is processed to remove some of the glass portion. In an example, this removal process is carried out prior to drawing the fiber 10. Note that in some examples, the glass-portion surface 62 exists only within the glass inner cladding 54 while in other examples the glass-portion surface exists in both the glass inner cladding and the core 18. The flat glass-portion surface 62 may be aligned such as generally parallel with the central axis AC of the fiber 10 and/or may extend coaxially with the fiber for either a portion of the fiber 10 or the entire length of the fiber. In an example, the glass core 18 is centered on the central axis.

Figure 1B:
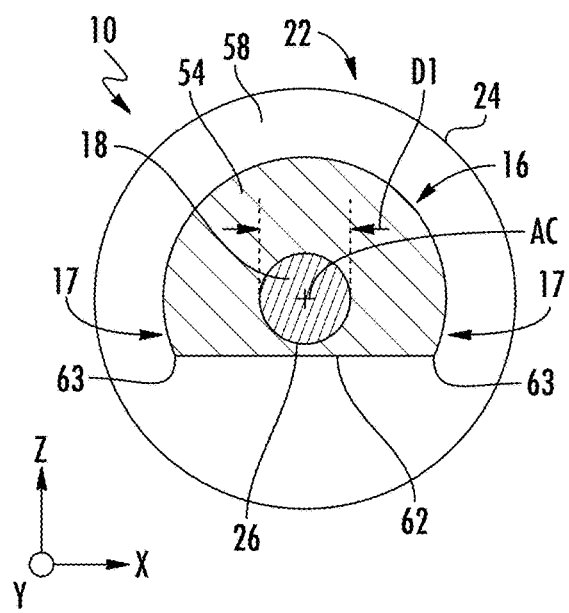
Figure 1C:
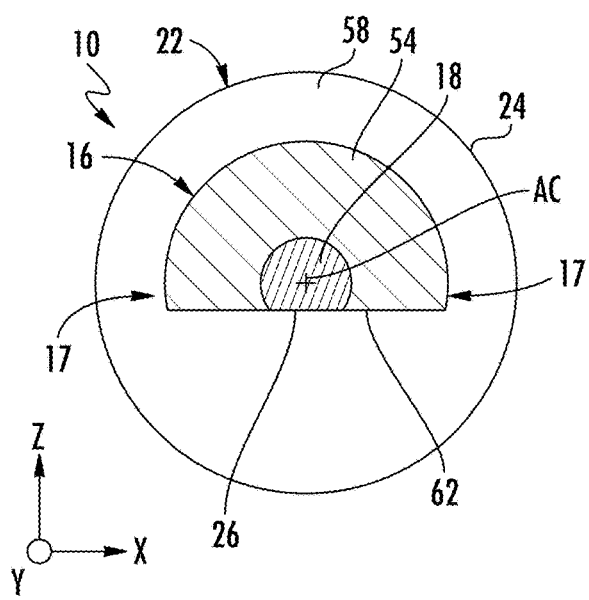
Figure 1D:
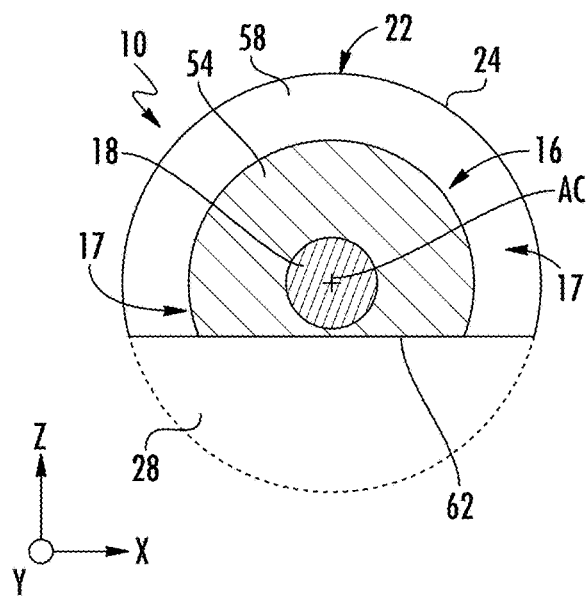

The fiber 10 may include one or more stripped portions 28 as shown in FIG. 1D, where a portion, or all of the polymeric outer cladding 58 (e.g., all or part of the cladding 22) along a given length of the fiber has been removed or stripped from the fiber to define the glass-portion surface 62. In an example where the glass-portion surface 62 is flat, it is referred to as the flat glass-portion surface 62. In an example, the glass portion 16 includes sides 17 that reside adjacent the glass-portion surface 62. In some cases, for the sake of reference and ease of description, the glass-portion surface 62 can be considered the "bottom" of the glass portion 16.

The core 18 may be composed of pure silica, doped silica (e.g., doped with germanium, aluminum, titanium, and/or chlorine) and/or other optically transparent materials. The glass inner cladding 54 may be composed of pure silica, doped silica (e.g., fluorine, boron, and/or titanium) or other optically transparent materials. The fiber 10 may be a single mode fiber or may be a multi-mode fiber. The core 18 has a higher refractive index than the glass inner cladding 54. The core 18 may have a relative refractive index change, or delta, relative to the glass inner cladding 54 in the range of about 0.2% to about 3.0%, for example about 0.34%, about 0.5%, about 1.0%, about 1.5%, about 2.0%, about 2.5% or about 3.0%. The core may also be surrounded by one or more moat or angular rings where the index of refraction is lowered or raised. The cladding 22 may be a composite (e.g., glass inner cladding 54 is composed of glass and the polymeric outer cladding 58/polymeric outer cladding 58 is composed of a polymer). The refractive indexes of the materials of the cladding 22 generally have a lower refractive index than the core 18. It will be understood that the fiber 10, as described herein, may simply be a connection or connector to another longer or larger optical fiber (not shown).

Figure 1E:
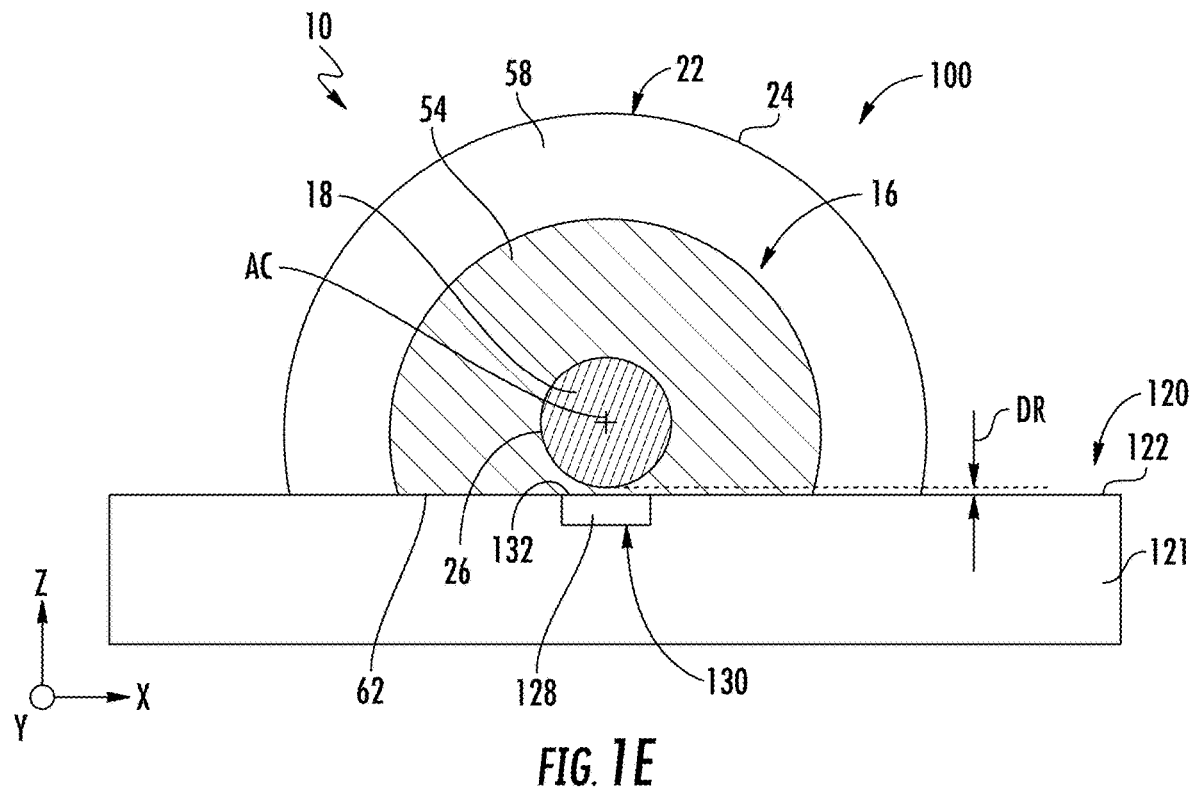
FIG. 1E is a front-on view and FIG. 1F through FIG. 1H are side views that shows the fiber of FIG. 1D operably disposed relative to a photonic device to form example optical couplers that operates using evanescent coupling ("evanescent coupler").

Aspects of the disclosure are directed to optical couplers. In cases where the optical couplers operate using evanescent coupling, they are referred to as "evanescent couplers." FIG. 1E is a front-on view that shows the fiber 10 of FIG. 1D operably disposed relative to a photonic device 120 to form an example evanescent coupler 100. The photonic device 120 has a support body 121 with a surface 122.

Figure 1F:
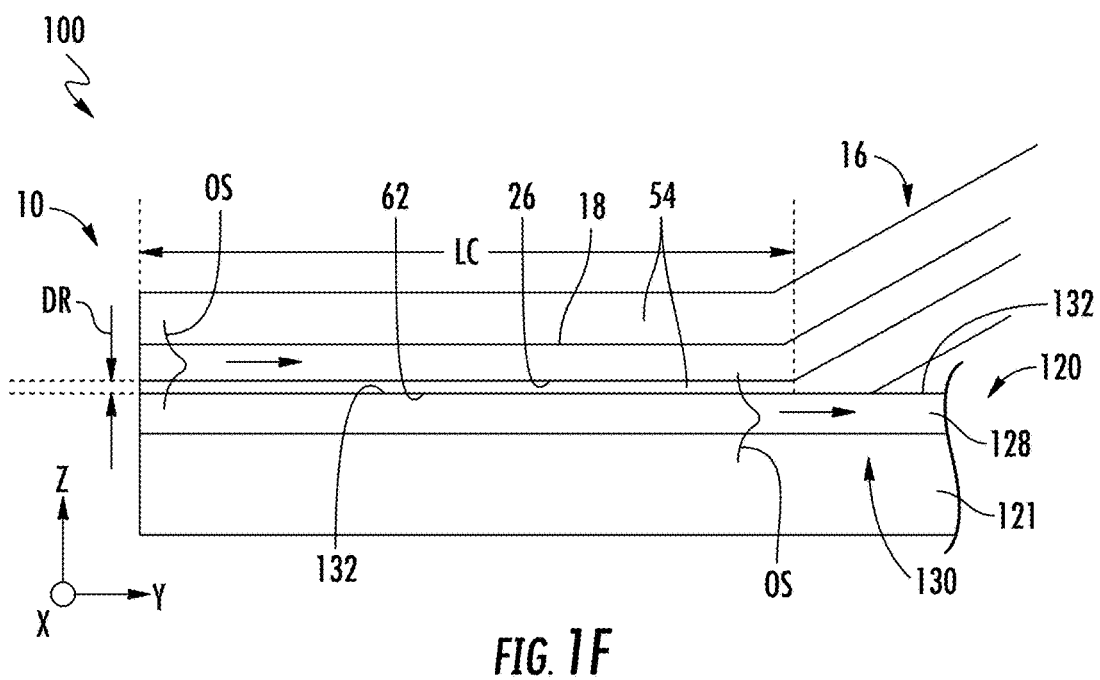
Figure 1G:
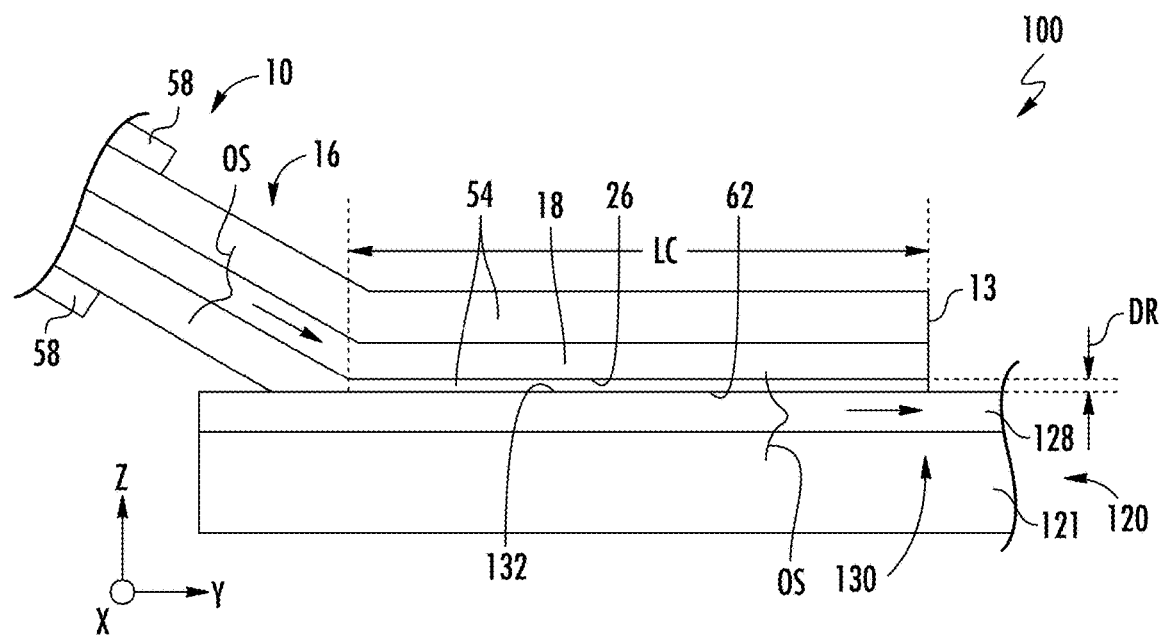
Figure 1H:
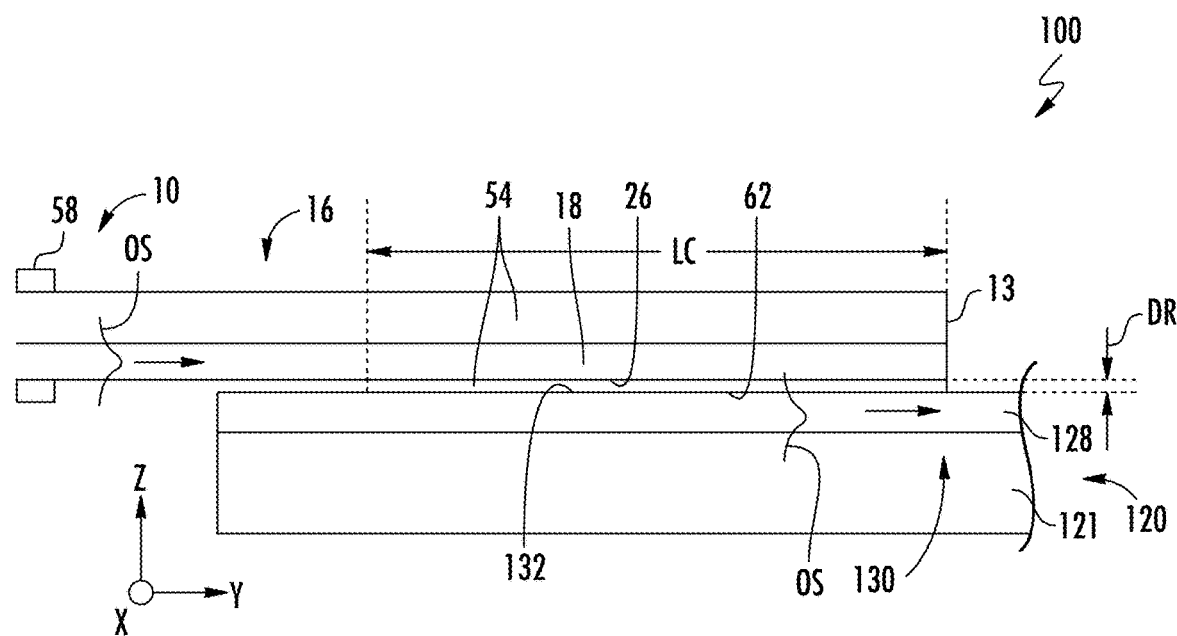

FIGS. 1F, 1G, and 1H are side views of two example evanescent coupler configurations based on the optical coupler 100 of FIG. 1E. The photonic device 120 operably supports within the support body 121 a waveguide core 128 that defines, along with the immediately surrounding portion of the support body, a waveguide 130. The waveguide 130 has a surface 132 that resides at or closely proximate to the surface 122. In an example, the waveguide 130 is planar, i.e., constitutes a planar waveguide. The flat glass-portion surface 62 of the fiber 10 is disposed in close, intimate, contact with the surface 132 of the waveguide 130 such that optical signals OS initially carried mainly in the core 18 of the fiber may be transferred to the waveguide or vice versa. Note that in FIG. 1F, the fiber 10 extends beyond the left edge of the photonic device 120 and is shown truncated at the left-side edge for ease of illustration. In FIG. 1G and FIG. 1H, the fiber 10 extends beyond the left edge of the photonic device 120 and is shown truncated at the left-side edge for ease of illustration.

The core 18 of the fiber 10 and the waveguide core 128 reside within a distance DR of each other that allows for an evanescent field of light associated with the optical signals OS propagating through the fiber 10 to enter the waveguide 130, or vice versa. In embodiments of evanescent couplers 100 disclosed herein, the glass-portion surface 62 overlaps the surface 132 of the waveguide 130 in a coupling region 30 by a length LC to facilitate the evanescent coupling. The distance DR is called the "coupling distance" while the length LC is called the "coupling length." In the example of FIG. 1F, the fiber 10 bends away from the photonic device 120 to define the coupling region 30. The coupling region can also be terminated in FIG. 1F by the photonic device 120 having a right-side edge. In the example of FIG. 1G, the coupling region 30 is terminated at the tip (end) 13 of the fiber 10.

The coupling length LC is the distance over which evanescent coupling occurs between the fiber 10 and the waveguide 130. In an example, the coupling length LC is selected to provide the maximum amount of transfer of energy between the fiber 10 and the waveguide 130. In other examples, the coupling length LC is selected to provide a partial transfer of energy between the fiber 10 and the waveguide 130. The optical signals OS are shown initially traveling in fiber 10 and being transferred to the waveguide 130. The optical signals OS can also travel initially in the waveguide 130 and be evanescently coupled into the optical fiber.

Tapering of the waveguide 130 such that the effective index of the waveguide matches that of the core 18 of the fiber may facilitate or increase the power transfer between the fiber 10 and the waveguide 130. Examples of such tapering are described below.

For the core 18 of the fiber 10 to get close enough to the core 128 of the waveguide 130 to facilitate evanescent coupling, the glass portion 16 may take a variety of cross-sectional shapes configured to expose the core surface 26 and/or the cladding surface 62 of the fiber 10 once some of the polymeric outer cladding 58 has been stripped off. The cross-sectional shape of the core 18 may be square (FIG. 1A), round or circular (FIG. 1B), a truncated circle (FIG. 1C), or triangular, rectangular, truncated triangular or other polygons configured to define the core surface 26 which extends along a length of the core 18. The cross-sectional shape of the core 18 may extend the entire length of the core 18 or may only extend for a portion of the core 18 (e.g., the area intended to be the stripped portion 28 as shown in FIG. 1D). The cross-sectional shape of the core 18 and/or the glass portion 16 may be developed in the preform stage of the fiber 10, and the core 18 and/or the glass portion 16 of the preform may have specific geometries (e.g., corners removed) applied to maintain the core surfaces 26 of the core 18 during production of the fiber 10.

With reference again to the example fiber 10 of FIG. 1B, the core 18 may have a diameter D1 (i.e., the largest straight line dimension or width of the flat core surface 26) of about 6 µm, about 7 µm, about 8 µm, about 9 µm, about 10 µm, about 11 µm, about 12 µm, about 13 µm, about 14 µm or about 50 µm. The core diameter D1 may be large enough such that the mode field diameter of the core 18 is approximately that of a single mode fiber. The diameter D1 of the core 18 may also be configured for specific design purposes to have a larger or smaller mode field diameter than standard single mode fiber. The diameter of the fiber 10 may be greater than about 50 µm, greater than about 100 µm, greater than about 110 µm, greater than about 120 µm, greater than about 130 µm or greater than about 140 µm. In a specific example, the diameter of the fiber 10 may be about 125 µm.

Aligning Multiple Fibers to Multiple Waveguides

Figure 2A:
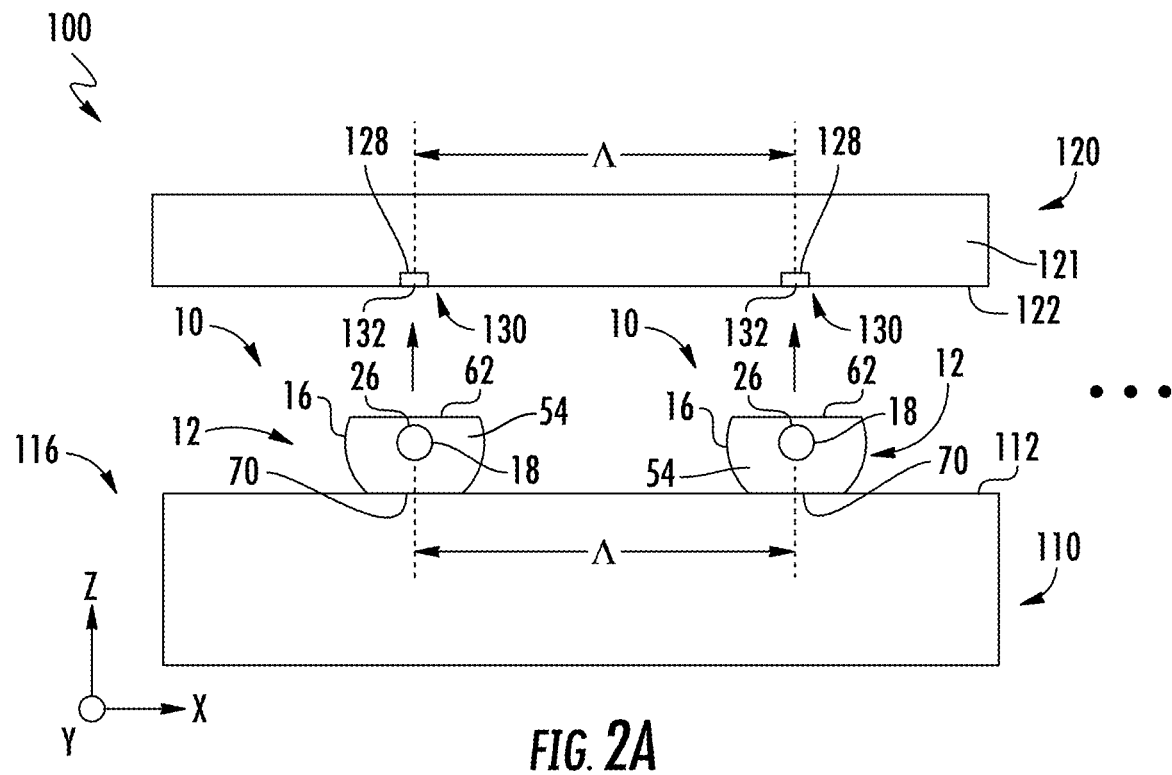
FIG. 2A is a partially exploded cross-sectional view and FIG. 2B is an assembled cross-sectional view of an example evanescent coupler wherein the fibers include a flat alignment surface that contacts an alignment member to facilitate alignment of the fibers to waveguides of a photonic device.
Figure 2B:
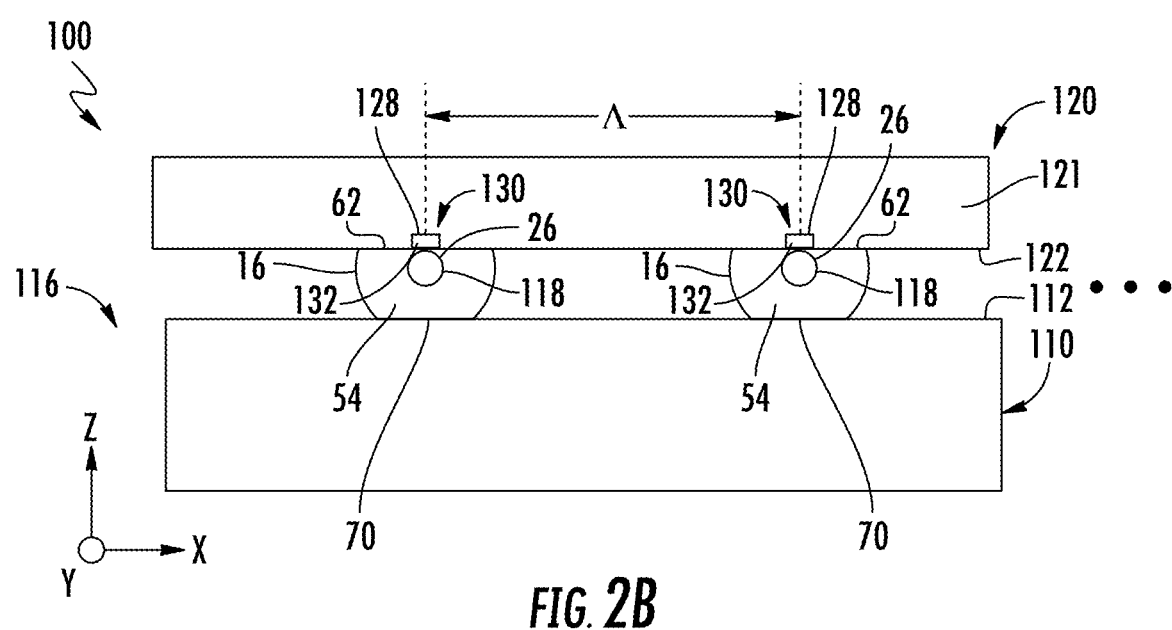

FIG. 2A is a partially exploded cross-sectional view and FIG. 2B is an assembled cross-sectional view of an example evanescent coupler 100. The evanescent coupler 100 includes one or more fibers 10 each having an exposed glass portion 16 at an end section 12 of the fiber. The exposed glass portion (hereinafter, simply "glass portion") 16 includes the aforementioned flat glass-portion surface 62 that is aligned to the central axis AC (e.g., runs generally parallel). Each fiber 10 also includes an alignment surface 70 that in the example of FIG. 2A is a flat surface that is opposite to and aligned (e.g., generally parallel) to the flat glass-portion surface 62. In some cases, the alignment surface 70 can be considered to reside at the "top" of the glass portion 16. Thus, in an example, the glass-portion surface 62 and the alignment surface 70 can be said to reside on opposite sides of the glass portion 16. In an example, the alignment surface 70, as well as other alignment features of the fiber 10 discussed below (see, e.g., groove 75 of FIGS. 4A, 4B), are defined in a fiber preform used to form the fiber.

The evanescent coupler 100 includes an alignment member 110 that in an example has a planar surface 112 (or alternatively one or more planar sections). The alignment member 110 supports the one or more fibers 10 with the alignment surfaces 70 in contact with the planar surface 112. The alignment member 100 and the one or more fibers 10 operably supported thereon constitute an alignment assembly 116.

The evanescent coupler 100 also includes the aforementioned photonic device 120, which can comprise for example a photonic integrated circuit (PIC) or a photonic lightwave circuit (PLC). In the example of FIG. 2A, the photonic device 120 operably supports an array of one or more of the waveguide cores 128 within the body 121 of the support body and at or immediately adjacent the surface 122 to define an array of one or more waveguides 130. In the discussion below, it is assumed for the sake of illustration that the evanescent coupler 100 includes multiple fibers 10 and multiple waveguides 130 unless otherwise noted.

The fibers 10 and the waveguides 130 each run generally if not directly in the y-direction. In an example, each waveguide surface 132 is co-planar with the surface 122 of the support body 121. The alignment assembly 116 is disposed relative to the photonic device 120 such that the surface 112 of the alignment member 110 and the surface 122 of the photonic device reside in generally parallel x-y planes. As used herein, generally parallel or parallel means within ±2 degrees of parallel.

The alignment assembly 116 and the photonic device 120 are brought together (e.g., by moving the alignment assembly in the z-direction) until the flat glass-portion surfaces 62 of the fibers 10 contact the surface 122 of the photonic device 120, as shown in FIG. 2B. The fibers 10 are spaced apart with a period Λ and the waveguides 130 are also spaced apart with this same period Λ so that the cores 18 of the fibers align in the x-direction with the cores 128 of the waveguides 130 of the photonic device 120. The flat glass-portion surfaces 62 are formed to allow for the respective cores 18 to reside sufficiently close to the corresponding cores 128 of the waveguides 130 (e.g., within the coupling distance DR) to allow for evanescent coupling between the fibers 10 and the waveguides 130. Note that in an example, the core surface 26 can reside at the glass-portion surface 62 while in another example the core surface 26 can reside within the glass inner cladding 54 in close proximity to the glass-portion surface.

The flat alignment surfaces 70 of the fibers 10 allows for the flat glass-portion surface 62 and the surface 122 of the photonic device 120 to reside in generally parallel x-y planes so that the fibers and waveguides can be brought into contact without a substantial angular misalignment, i.e., without a substantial relative angular rotation about the y-axis of the two contacting surfaces 62 and 122.

In an example, fiber 10 can be formed with the flat alignment surface 70 and the flat glass-portion surface 62 being generally parallel by machining of the fiber blank used to make the fiber before the blank is drawn into the fiber. Alternatively, the two flat surfaces 62 and 70 can be made by extruding a cladding and sleeving the core into it or by soot pressing a cladding of the right shape around a core cane, i.e., cane with the core and a small amount of the cladding.

The ellipses in FIG. 2A denote that two or more fibers 10 are aligned when the alignment assembly 116 is operably positioned relative to the photonic device 120, as shown in FIG. 2B.

In an example, the surface 112 of the alignment member 110 is flat to less than approximately one micron over the area occupied by the fibers 10. In an example, the alignment member 110 comprises a rigid material such as glass. In another example, the surface 112 of the alignment member 110 comprises a compliant material, such as a polymer film, which allows for some small rotational movement of the fibers 10 as they are being pressed into the waveguides 130. Allowance of a small rotational movement allows for a slight adjustment in the position of each fiber 10 if there is slight misalignment when interfacing the alignment assembly 116 with the photonic device 120 (e.g., the surface 112 of the alignment member is not perfectly parallel with the surface 122 of the photonic device).

Figure 3A:
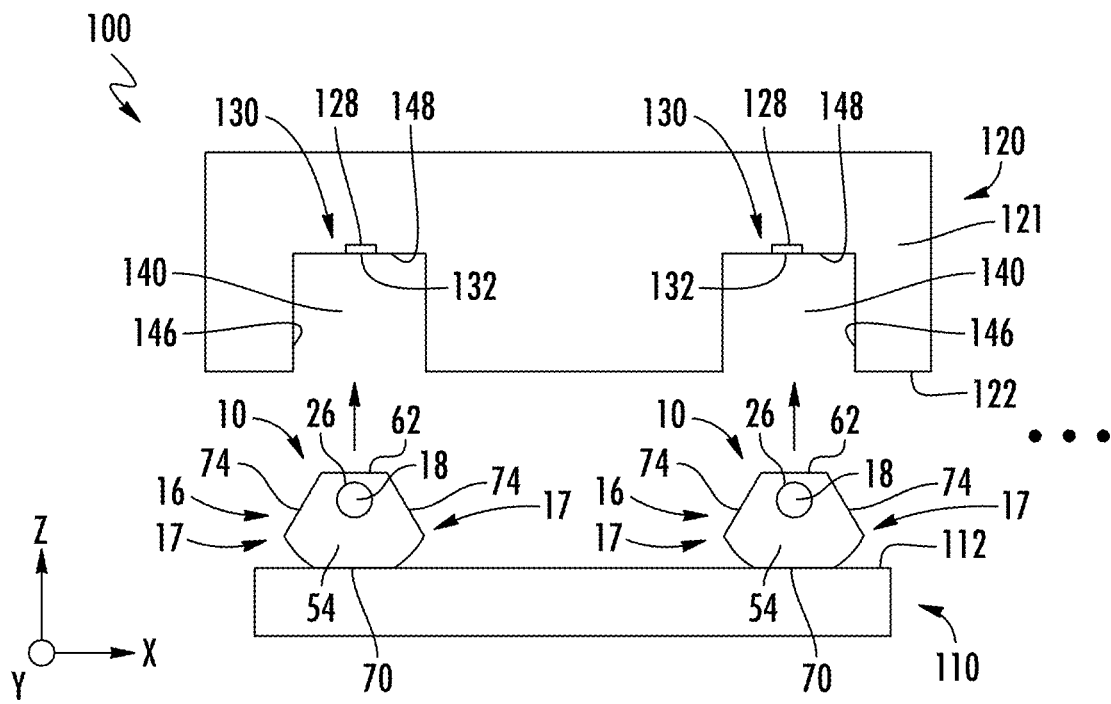
FIG. 3A is a partially exploded cross-section view and FIG. 3B is an assembled cross-sectional view of an example evanescent coupler wherein the photonic device includes alignment channels that serve as alignment features to align the fibers to the waveguides of the photonic device.
Figure 3B:
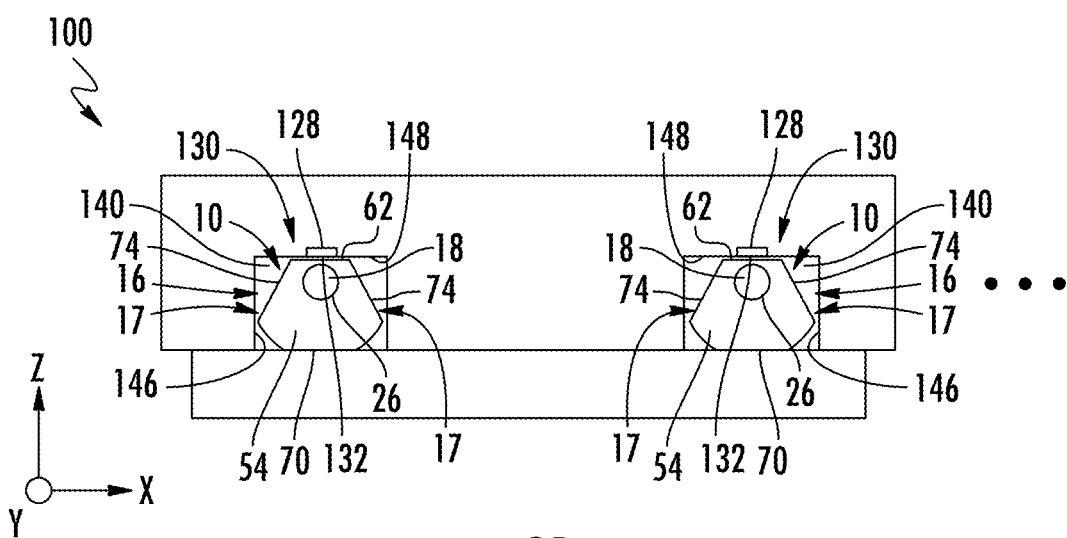

FIG. 3A is a partially exploded cross-sectional view and FIG. 3B is an assembled cross-sectional view of an example evanescent coupler 100 wherein the photonic device 120 includes alignment channels 140 formed in the surface 122 of the support body and 121, wherein the alignment channels serve as example alignment features. The alignment channels 140 run in the y-direction and each includes opposing sidewalls 146 and a bottom surface 148. The alignment channels 140 are sized to closely accommodate respective fibers 10 supported on the alignment member 110 of the alignment assembly 116 so that the cores 18 of the fibers align with respective cores 128 of the waveguides 130 of the photonic device 120. In an example, the cores 128 are centered within the alignment channels 140, i.e., midway between the sidewalls 146.

In the example of fiber 10 of FIGS. 3A and 3B, in addition to the flat glass-surface portion 62 and the flat alignment surface 70, the outer surface 24 of the fiber 10 can include angled flat side surfaces 74 on the sides 17 that give the fiber a tapered cross-sectional shape. The taper is narrowest at the flat glass-surface portion 62. This tapered cross-sectional shape facilitates inserting the fibers 10 into the respective alignment channels 140 to form the assembled evanescent coupler 100, as shown in FIG. 3B. FIG. 3B shows by way of example the entire glass portion 16 of each fiber 10 residing within the corresponding alignment channel 140. In other examples, each glass portion 16 can reside partially within its alignment channel 140. Thus, the glass portions 16 can be said to reside at least partially within its corresponding alignment channel 140.

Figure 4A:
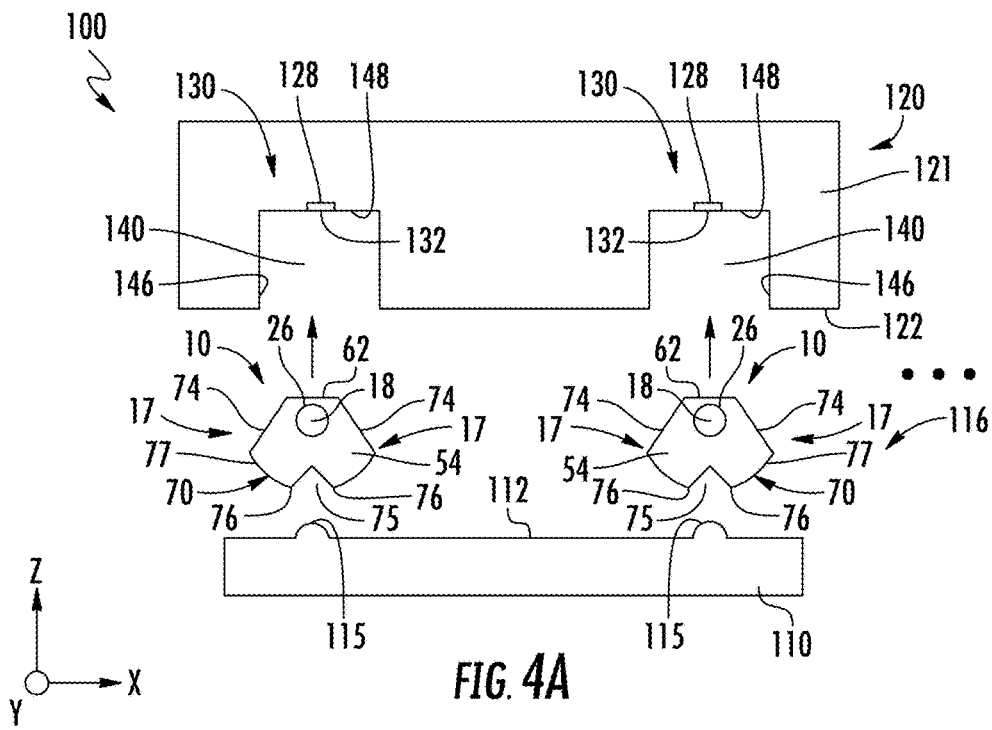
FIG. 4A is similar to FIG. 3A and shows an example wherein the surface of the alignment member includes an alignment feature in the form of protrusion that runs in the y-direction, and wherein the alignment surface of the glass portion includes a groove sized to engage the protrusion.

FIG. 4A is similar to FIG. 3A and shows an example wherein the alignment surface 70 is replaced with or is modified to include an alignment feature in the form of a groove 75 that runs in the y-direction. The groove has outside corners 76. Likewise, the surface 112 of the alignment member 110 is modified to include a protrusion 115. The protrusion 115 is sized to closely fit within the groove 75 of the fiber 10. The protrusion 115 can either be a localized bump or a ridge that runs in the y-direction. In an example, multiple protrusions 115 can be formed along the y-direction rather than having a single ridge, where the additional protrusions help align and stabilize the fiber by their contact with fiber side surfaces or ridges 77.

Figure 4B:
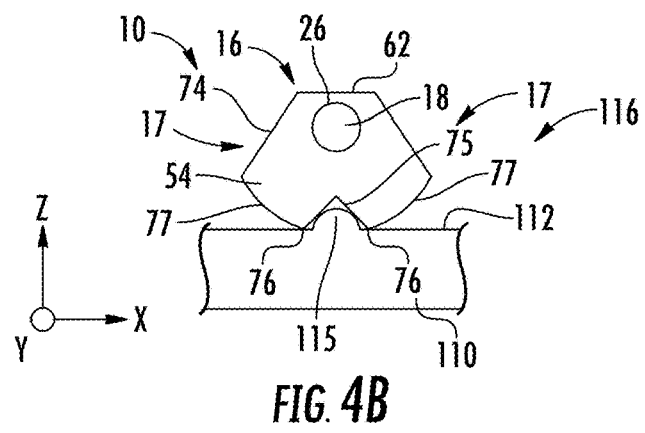
FIG. 4B is a close-up cross-sectional view of the fiber and the alignment member of FIG. 4B showing the protrusion of the alignment member engaged with the groove of the glass portion of the fiber.

FIG. 4B is a close-up cross-sectional view of a portion of the alignment assembly of FIG. 4A showing the example fiber 10 and a portion of the alignment member 110 that includes the protrusion 115 as received by the groove 75. Note that the groove 75 can be used to define two side ridges 77 that can contact the surface 112 of the alignment member 110. In the example shown where the alignment surface 70 is convexly curved, the outside corners 76 of the groove 75 can contact the surface 112 of the alignment member 110.

Figure 4C:
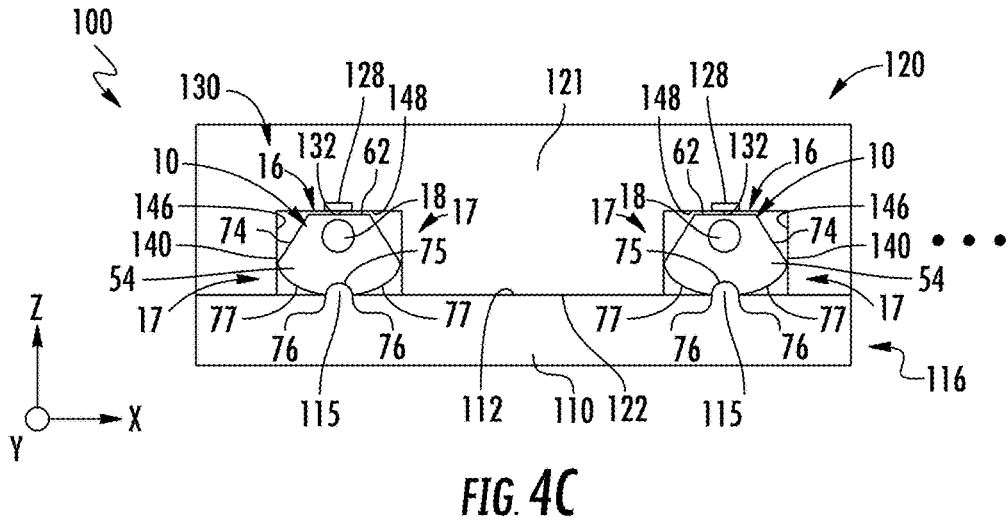
FIG. 4C is similar to FIG. 4A and shows the assembled evanescent coupler.

FIG. 4C shows the assembled evanescent coupler 100 formed by operably engaging (interfacing) the alignment assembly 116 and the photonic device 120 of FIG. 4A.

An advantage of providing alignment features in the form of the groove 75 and the protrusion 115 is that they can provide either point contact or line contact between the fiber 10 and the alignment member 110. Such point contact or line contact makes the evanescent coupler 110 less susceptible to particulate contamination between two flat surfaces, which can cause the fibers 10 to not fully seat on the surface 112 of the alignment member 100. Improper seating can result in a rotational or translational misalignment between the fiber 10 and the waveguide 130.

In an example, the groove 75 can be machined into a fiber blank before draw so that when the fiber is drawn from the blank, the groove 75 will run the length of the fiber. In an example, the protrusion 115 can be formed on the alignment member 110 with high precision using a laser, especially in the case where the alignment member is made of glass that is amenable to laser-bump formation, such as described for example in U.S. Pat. No. 9,359,252, which is incorporated by reference herein.

In an example, the protrusion 115 can be omitted from the surface 112 of the alignment member 110 so that the two side ridges 77 defined by the groove 75 can rest directly on the surface 112 of the alignment member 110. As noted above, the outside corners 76 defined by the groove 75 can provide lines of contact on the surface 112 of the alignment member 110 of the alignment assembly 116.

Multicore Fibers

Figure 5A:
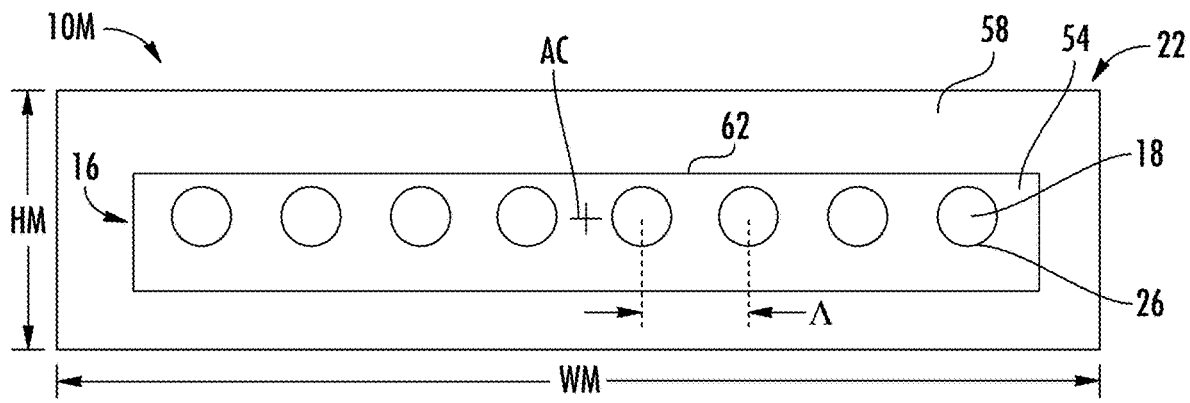
FIG. 5A is a cross-sectional view of an example multicore fiber that includes multiple cores that reside within a single inner cladding.

FIG. 5A is a cross-sectional view of an example multicore fiber 10M that includes multiple cores 18 that reside within a single glass inner cladding 54. The single inner cladding is surrounded by a single polymeric outer cladding 58 to define the multipart cladding 22. The polymeric outer cladding could also consist of two cladding layers. The glass portion 16 comprises the multiple cores 18 and the glass inner cladding 54. The cross-sectional shape of the multicore fiber 10M is shown by way of example as rectangular with a height HM and a width WM. The cores 18 all reside in a common x-y plane at or immediately adjacent the flat glass-portion surface 62 and have a period $\Lambda$. Eight cores 18 are shown by way of example, but any number of cores two or greater (e.g., $2^n$ cores, where n=1, 2, 3, . . . ) can be employed in the multicore fiber 10M. Example multicore fibers suitable for use in the alignment assembly 116 are disclosed in U.S. Pat. No. 9,120,693, which is incorporated by reference herein.

Figure 5B:
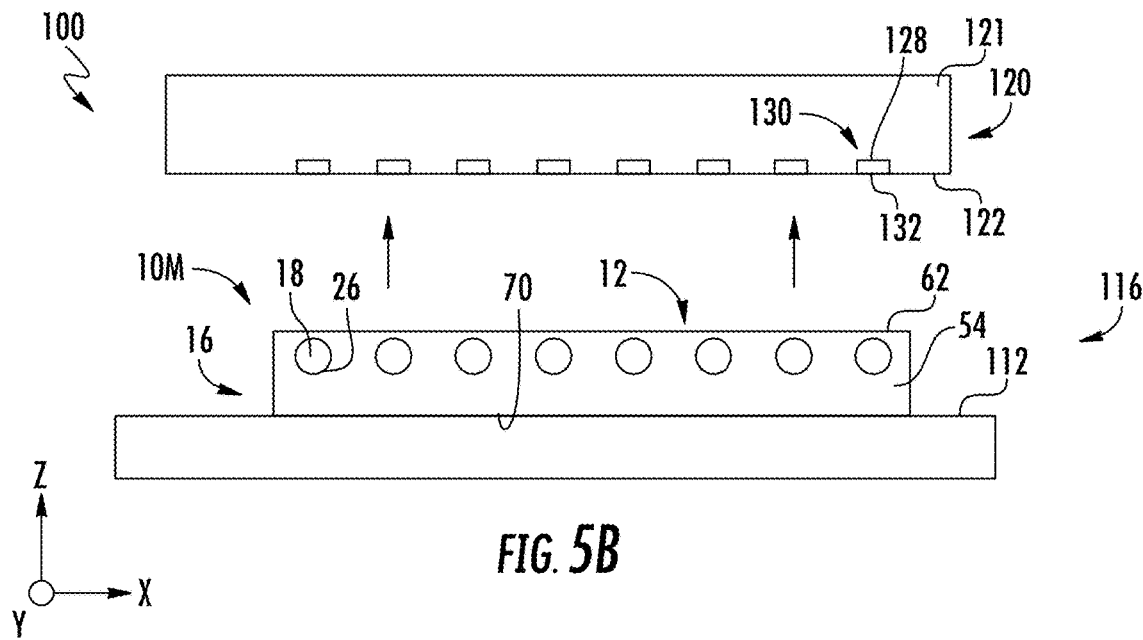
FIG. 5B is a partially exploded side view and FIG. 5C is an assembled side view of an example evanescent coupler wherein the multicore fiber of FIG. 5A is supported by an alignment member to form an alignment assembly that is used to operably interface and align the multiple cores with respective waveguides of a photonic device.

FIG. 5B is a partially exploded side view of an example of the evanescent coupler 100 that shows an example configuration of the alignment assembly 116 wherein the single fibers 10 are replaced by the multicore fiber 10M of FIG. 5A. The multicore fiber 10M includes the flat alignment surface 70, which is generally parallel to the flat glass-portion surface 62 and is supported on the top surface 112 of the alignment member 110. Note that the flat glass-portion surface 62 has been formed by processing (e.g., laser processing) the multicore fiber 10M to remove the outer cladding 58 at an end section 12 of the multicore fiber so that only the glass portion 16 remains, with the cores 18 located at or closely proximate to the flat glass-portion surface 62.

Figure 5C:
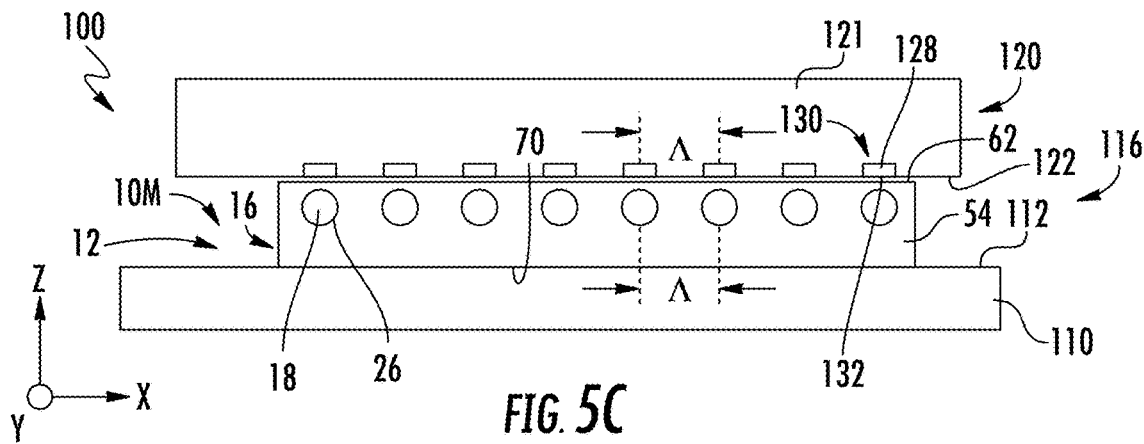

FIG. 5C shows the alignment assembly 116 operably arranged (interfaced) relative to the photonic device 120 to form the evanescent coupler 100, with the cores 18 aligned in the x-direction with corresponding cores 128 of the waveguides 130 of the photonic device, which also have a period Λ. The respective fiber and waveguide cores 18 and 128 reside sufficiently close to one another (i.e., within the coupling distance DR) to allow for evanescent coupling between the corresponding fibers 10 and the waveguides 130. Again, having the flat glass-portion surface 62 and the flat alignment surface 70 being generally parallel allows for the flat glass-portion surface 62 and the surface 122 of the photonic device 120 to both reside in generally parallel x-y planes and to be brought into contact without a substantial angular misalignment, i.e., without a substantial relative angular rotation about the y-axis of the two contacting surfaces.

Figure 6A:
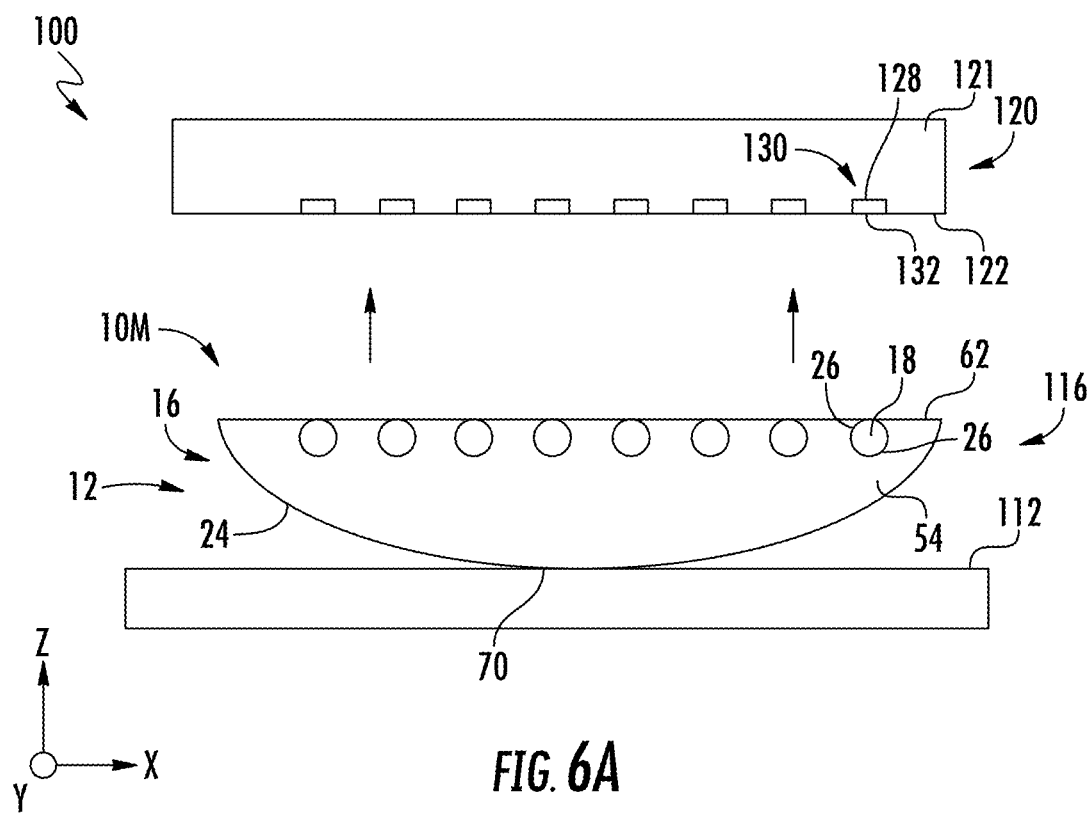
FIGS. 6A and 6B are similar to FIGS. 5A and 5B, respectively, and illustrate an embodiment where the multicore fiber has a non-rectangular cross-sectional shape.
Figure 6B:
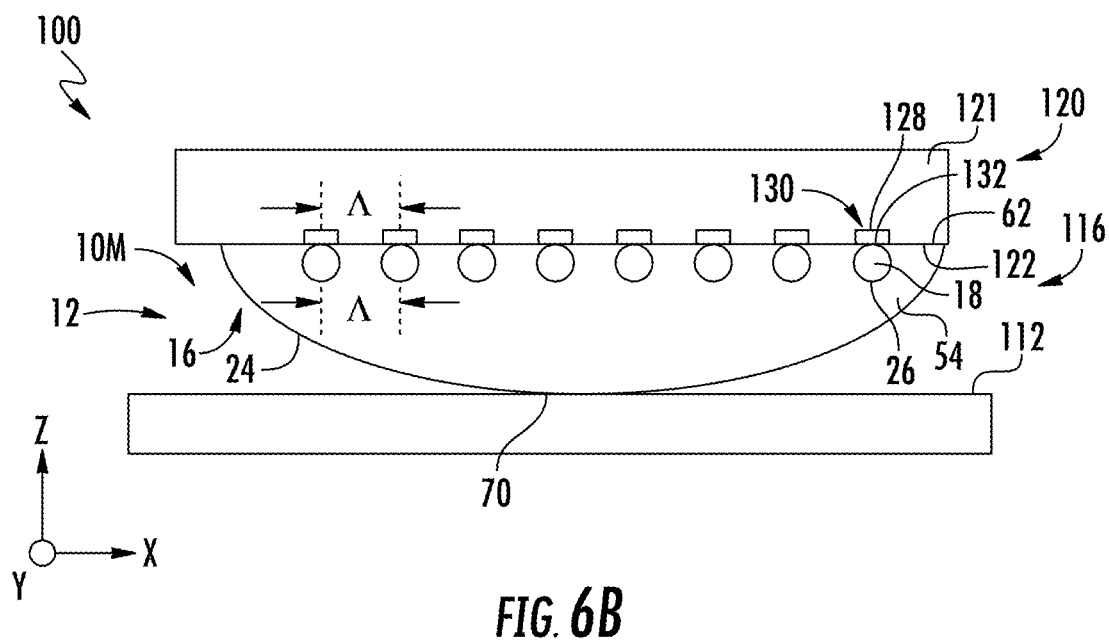

FIGS. 6A and 6B are similar to FIGS. 5B and 5C, respectively, and illustrate an embodiment where the multicore fiber 10M has a non-rectangular cross-sectional shape, with the flat alignment surface 70 being smaller than the flat glass-portion surface 62, and with the remaining portion of the outer surface 24 of the glass section 16 being curved.

Figure 7A:
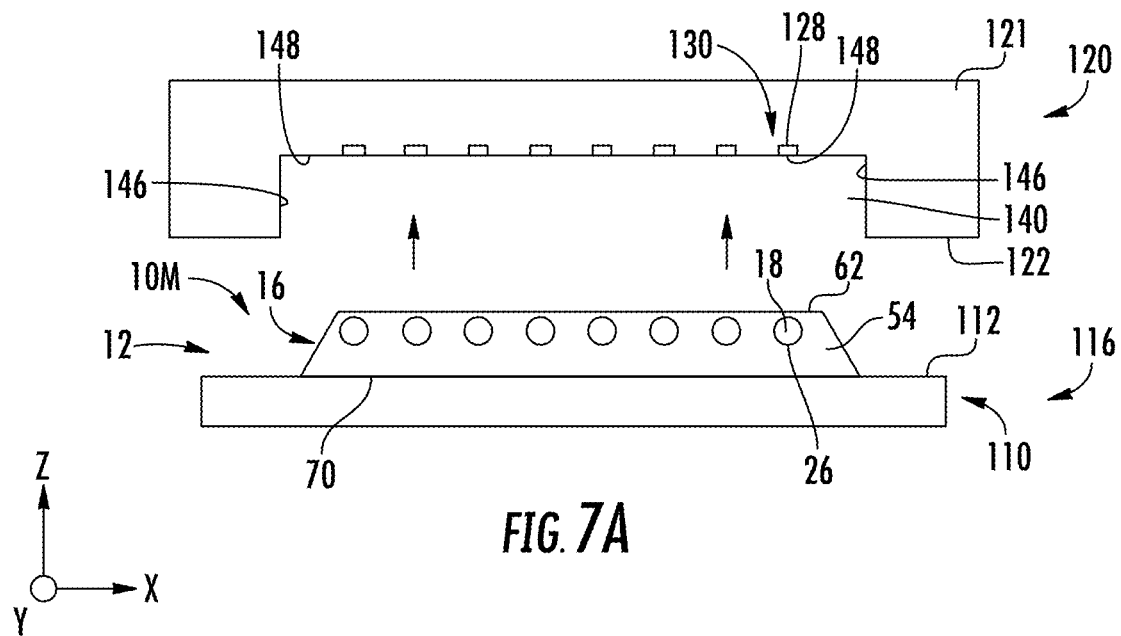
FIGS. 7A and 7B are similar to FIGS. 5A and 5B and illustrate an embodiment like that shown also in FIGS. 3A and 3B, wherein the photonic device includes an alignment channel and the multicore fiber has a tapered cross-sectional shape.
Figure 7B:
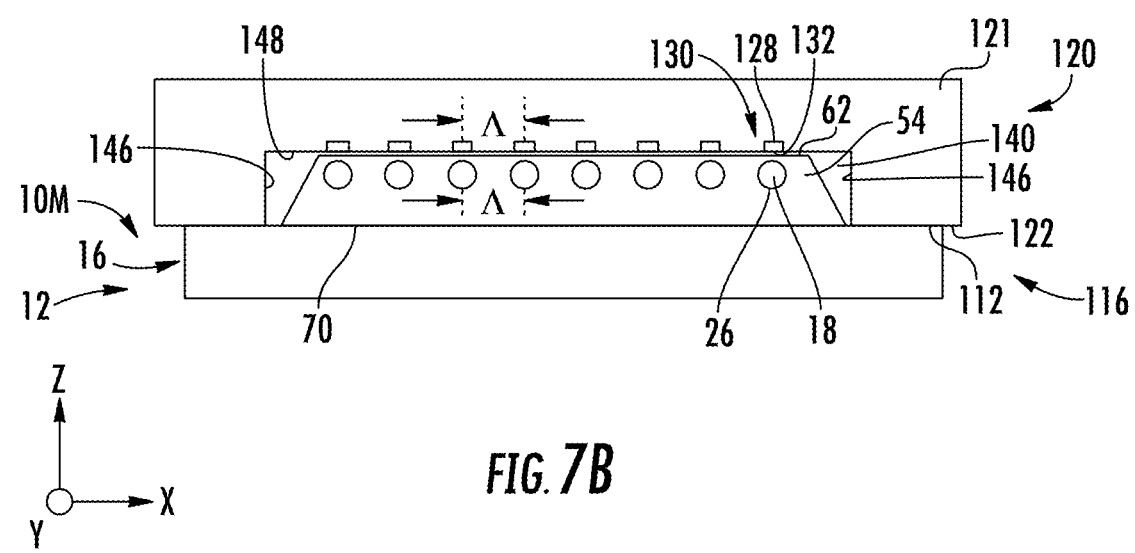

FIGS. 7A and 7B are similar to FIGS. 5B and 5C and illustrate an embodiment similar to that shown in FIGS. 3A and 3B in that the photonic device 120 includes the alignment channel 140. In addition, the multicore fiber 10M is provided with a tapered cross-sectional shape that is narrowest at the flat glass-portion surface 62. As with the single-fiber embodiment of FIGS. 3A and 3B, the tapered cross-sectional shape of the multicore fiber 10M facilitates inserting the multicore fiber into the alignment channel 140. The cores 128 of the waveguides 130 are disposed at or immediately proximate to the bottom 148 of the channel, and the cores 18 of the multicore fiber 10M are brought into alignment with the cores 128 of the waveguides 130, to form the assembled evanescent coupler 100, as shown in FIG. 7B.

As noted above, when forming the evanescent coupler 100, the cores 18 of the multicore fiber 10M need to be placed to with submicron accuracy with respect to the cores 128 of the waveguides 130 to obtain efficient evanescent coupling. Consequently, the flat glass-portion surface 62 and the alignment surface 70 need to be flat to this same sub-micron tolerance. On the other hand, there is a limitation in the ability to retain non-cylindrical glass shapes in conventional fiber draws due to the nearly rotationally symmetric nature of traditional draw furnaces. Thus, with reference again to FIG. 5A, in an example, the multicore fiber 10M has a form factor (i.e., width to height ratio WM:HM) of 5:1 or less (i.e., WM≤5HM), and preferably less than 2:1. An example of such a multicore fiber 10M has eight cores 18 on a 125 micron pitch A with WM×HM dimensions of 1.125 mm×1.125 mm (i.e., a square or 1:1 form factor) drawn. The dimensions are too large to be wound on a fiber spool. The height of the fiber can be reduced for example to 225 microns to allow the fiber to be wound on a fiber spool along the short dimension. Another example of such a multicore fiber 10M has eight cores 18 on a 25 micron pitch A with WM×HM dimensions of 0.225 mm×0.225 mm (i.e., a square or 1:1 form factor) drawn and wound using a conventional fiber draw process. A modified draw furnace with axially symmetric heating on both sides of the multicore fiber can be used for fabricating multicore fibers 10M with a greater width-to-height ratio.

Additional Photonic Device and Fiber Configurations

Figure 8A:
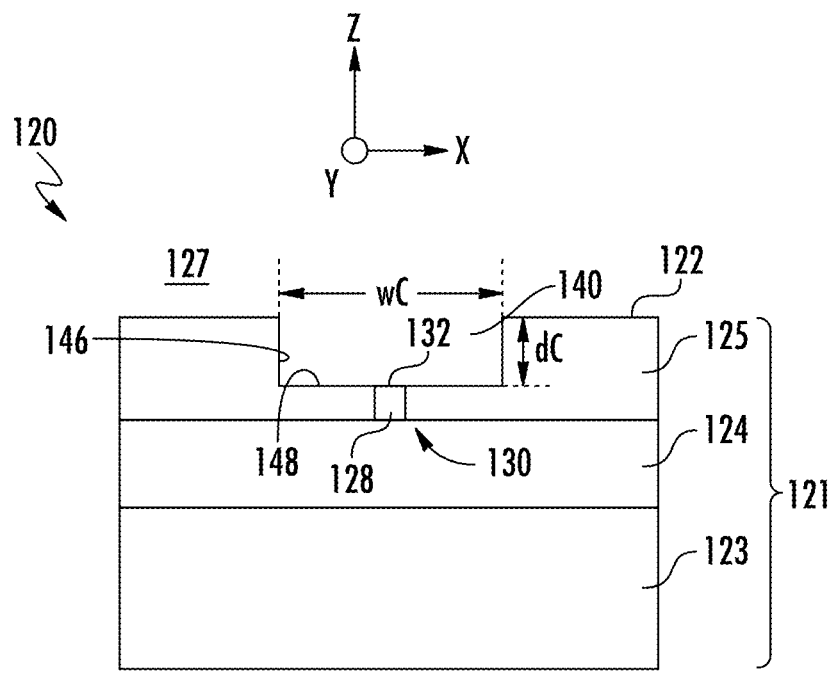
FIG. 8A is a cross-sectional view of an example photonic device showing an example alignment channel defined by an overclad layer residing atop an underclad layer that resides atop a support substrate and showing a waveguide core formed adjacent the bottom of the alignment channel in the underclad layer to define a waveguide.

FIG. 8A is a cross-sectional view of an example photonic device 120 that shows more detail than the photonic devices described above. The support body 121 comprises a support substrate 123, an underclad layer 124 disposed atop the support substrate, and an overclad layer 125 disposed atop the underclad layer. The waveguide core 128 resides within the overclad layer 125. The overclad layer 125 defines the surface 122 of the support body 121. An air space 127 is shown adjacent the surface 122. The overclad layer 125 includes an alignment channel 140, with the core 128 residing within the channel at or immediately proximate to the bottom 148 of the channel. The channel 140 has a width wC and a depth dC.

The waveguide 130 is defined by the core 128, the underclad layer 124, the overclad layer 125 and the air space 127 adjacent the channel bottom 128.

In an example, the alignment channel 140 can be formed by selectively etching the overclad layer 125. Also in an example, the core 128 can be defined by etching a slot in the bottom 148 of the alignment channel 140 and then filling the slot with a relatively high index material as compared to the underclad layer 124 and overclad layer 125. In an example, the underclad layer 124, the overclad layer 125 and the core 128 are all made of different dielectric materials.

Figure 8B:
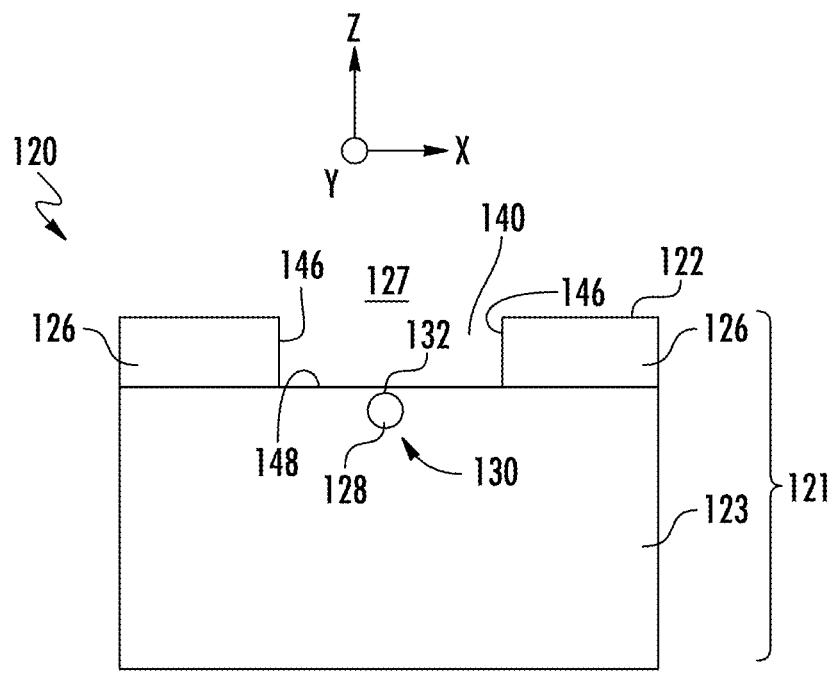
FIG. 8B is similar to FIG. 8A and shows an example photonic device wherein overclad layer resides directly upon the support substrate and the waveguide core is formed in the support substrate adjacent the bottom of the alignment channel.

FIG. 8B is a cross-sectional view of another example photonic device 120 wherein the support body 121 is defined by a unitary support substrate 123 that supports non-optical spacers 126 that define the alignment channel 140. The core 128 can be formed in the unitary support substrate 123 by an ion-exchange process into its surface and then the non-optical spacers 126 added to the unitary support substrate. In an example, the non-optical spacers 126 can be formed using an etch process on either a photoresist layer or a metal layer.

In the example embodiments of FIGS. 8A and 8B, the etch process that defines the alignment channel 140 can be performed with an alignment accuracy relative to the position of the core 128 of less than 0.5 microns.

The example photonic devices 120 of FIGS. 8A and 8B show the alignment channel 140 having vertical sidewalls 146. In other examples, the sidewalls 146 need not be vertical and can include other features that facilitate the positioning and alignment of a fiber 10 within the alignment channel 140 so that the fiber core 18 is optimally aligned with the waveguide core 128 of the waveguide 130 of the photonic device 120.

Figure 9A:
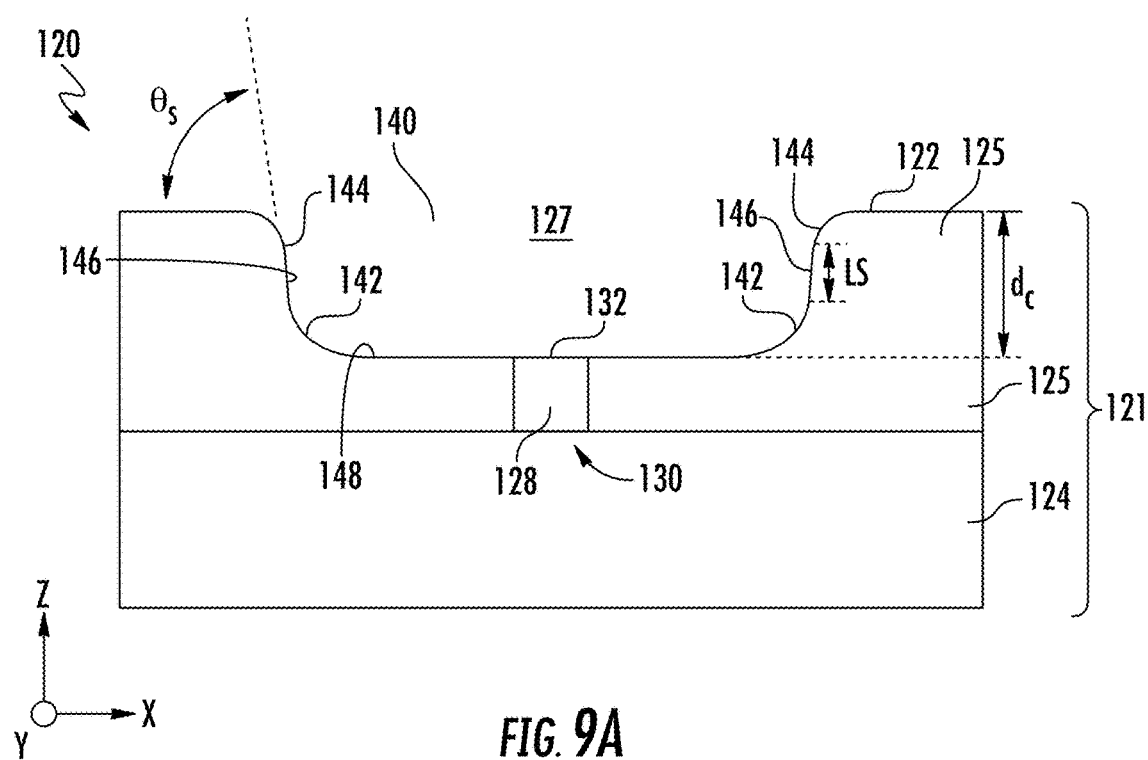
FIGS. 9A and 9B are similar to FIG. 8A and shows an example alignment channel having curved sidewalls, with FIG. 9B showing example dimensions of the alignment channel.
Figure 9B:
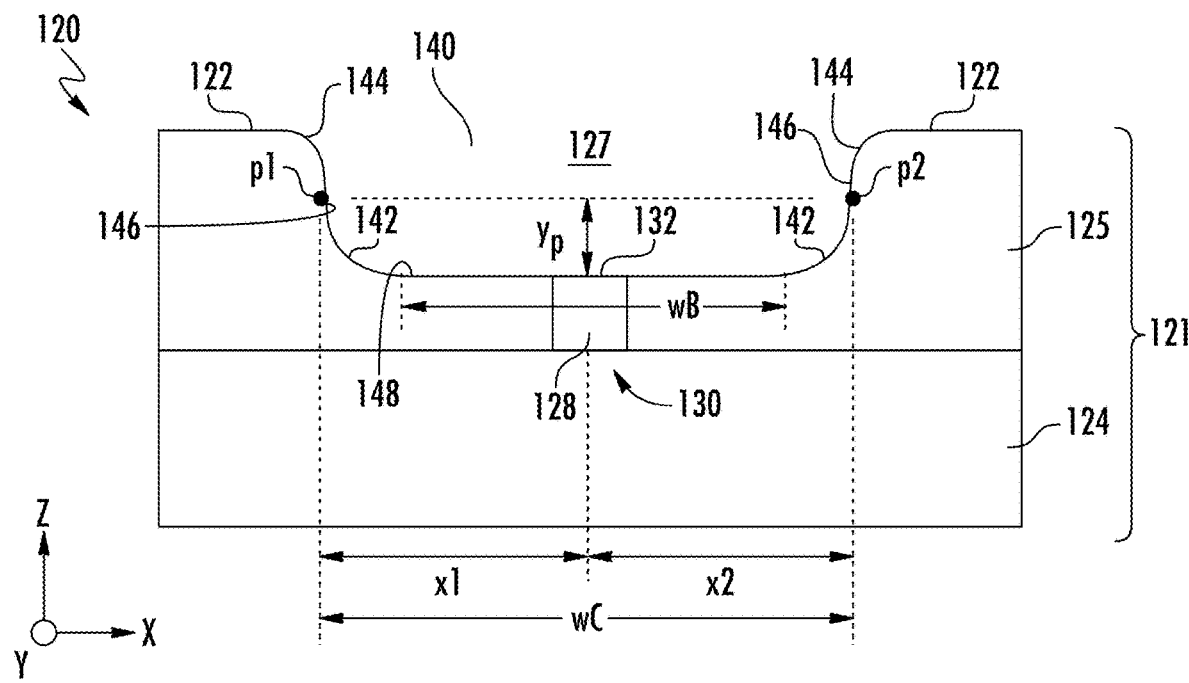

FIGS. 9A and 9B are similar to FIG. 8A and illustrate an example configuration of the photonic device 120 and in particular the alignment channel 140. In the example, the sidewalls 146 of the alignment channel 140 can have an angle θs<90° relative to the surface 122 of the photonic device 120. Also, the alignment channel 140 can have inside corners 142 that are rounded, e.g., with a radius of curvature in the range from 0.5 micron to 2.0 micron, depending on the etch process conditions. Also in an example, the bottom 148 of the alignment channel 140 can be made flat over a reduced width wB (wB<wC) centered on the waveguide core 128. Similarly, the alignment channel 140 can have rounded outside corners 144 and the sidewalls 146 can be made flat over a select length LS.

An alignment channel 140 formed using an etch process may only present a limited number of locations that are well-defined and suitable for use as an alignment datum. FIG. 9B also shows an example where the alignment channel 140 has two sidewall contact points p1 and p2 that serve as suitable alignment datum locations formed at a known vertical offset $y_p$ from the channel bottom 148. The sidewall contact points p1 and p2 can be positioned relative to the waveguide core 128 (e.g., at distances x1 and x2 as shown) using precision photolithographic processes. In an example, x1=x2. In an example, the width wC of the alignment channel 140 is defined by wC=x1+x2.

Figure 10:
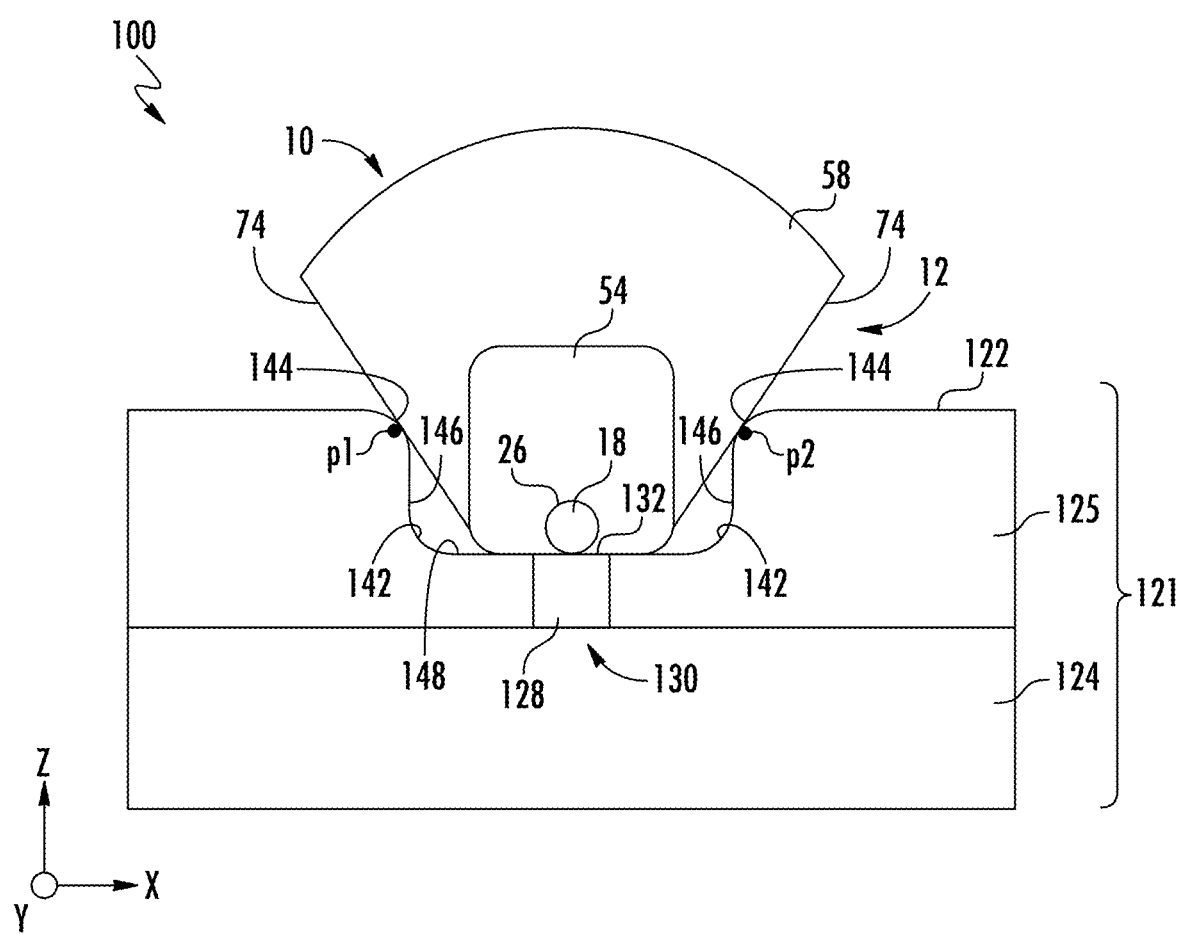
FIG. 10 is similar to FIG. 3A and shows an example fiber having a tapered cross-sectional shape being inserted into an alignment channel of a photonic device such as shown in FIG. 8A, wherein the alignment channel has curved sidewalls such as shown in FIG. 9A.

FIG. 10 shows a fiber 10 having a tapered cross-sectional shape with angled flat surfaces 74 (see also FIG. 3A) being inserted into the alignment channel 140 of the example photonic device 120 of FIG. 9A. The rounded outer corners 144 of the alignment channel 140 help prevent the angled flat surface 74 of the fiber 10 from touching the outer corners as the fiber is inserted into the alignment channel. Once inserted into the alignment channel, the angled flat surfaces make contact with the rounded outer corners 144 at contact points p1 and p2.

Figure 11A:
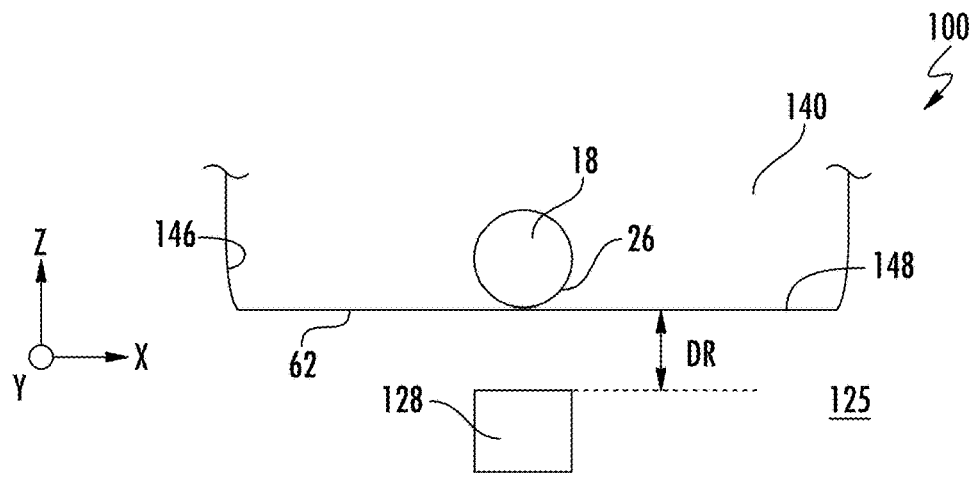
FIGS. 11A through 11C are close-up views of the alignment channel of the photonic device of FIG. 8A illustrating different examples of the coupling distance DR between the fiber core and the waveguide core.
Figure 11B:
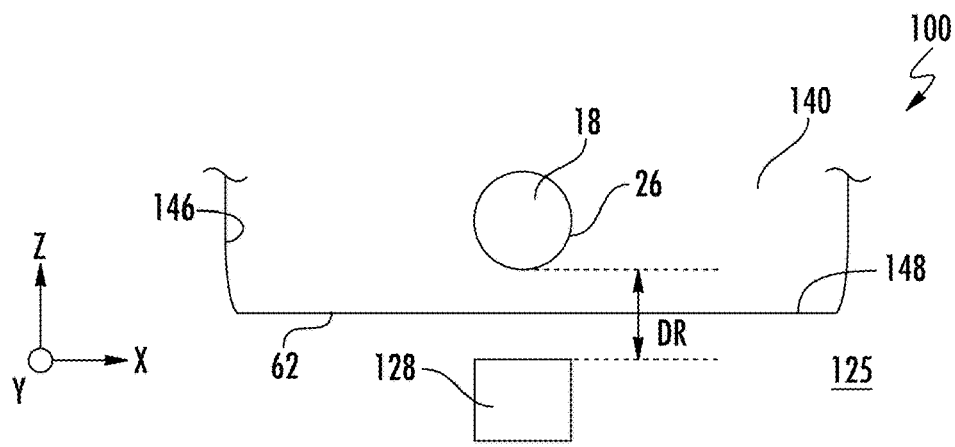
Figure 11C:
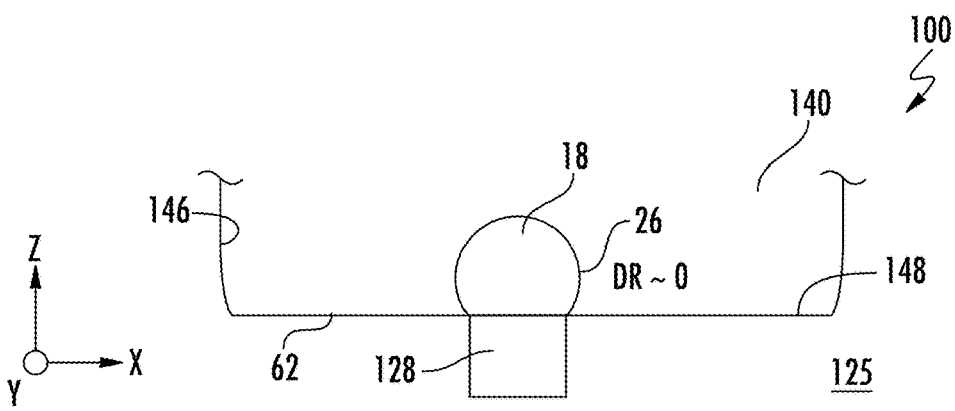

It can also be difficult to control the thickness of a thick overclad layer 125 (e.g., 15-20 µm) to within 0.5 µm. FIGS. 11A through 11C are schematic close-up views of the fiber core 18 and the waveguide core 128 that show different coupling distances DR for the evanescent coupler 100. Some of the other components of the evanescent coupler 100 are omitted from FIGS. 11A through 11C for clarity. The thickness variation in the overclad layer 125 can translate directly to a variation in the coupling distance DR between the waveguide core 128 and the bottom 148 of the alignment channel 140 in the coupling region 30. When the coupling distance DR changes, the coupling efficiency between the fiber 10 and the waveguide 130 changes, requiring a change in the coupling length LC of the coupling region 30 to maintain the same coupling efficiency (see FIG. 1F). Such changes in the coupling length LC can be problematic since it requires changing the configuration of the end section 12 of the fiber 10, as described below.

FIG. 11A assumes that the core 18 of fiber 10 is located at the flat glass-portion surface 62 and thus at the bottom 148 of the alignment channel 140. FIG. 11B shows an example where the core 18 of the fiber 10 is located in close proximity to the flat glass-portion surface 62. In this case, the waveguide core 128 needs to reside closer to the bottom 148 of the alignment channel 140 so that it is within the coupling distance DR from the core 18 of the fiber 10. FIG. 11C shows an example configuration wherein the core surface 26 of core 18 of the fiber 10 is flat and resides at the flat glass-portion surface 62 while the surface 132 of the waveguide resides at the bottom 148 of the alignment channel. In this case, the coupling distance DR~0, so that there is greater tolerance for variations in the thickness of the overclad layer 125.

Figure 12A:
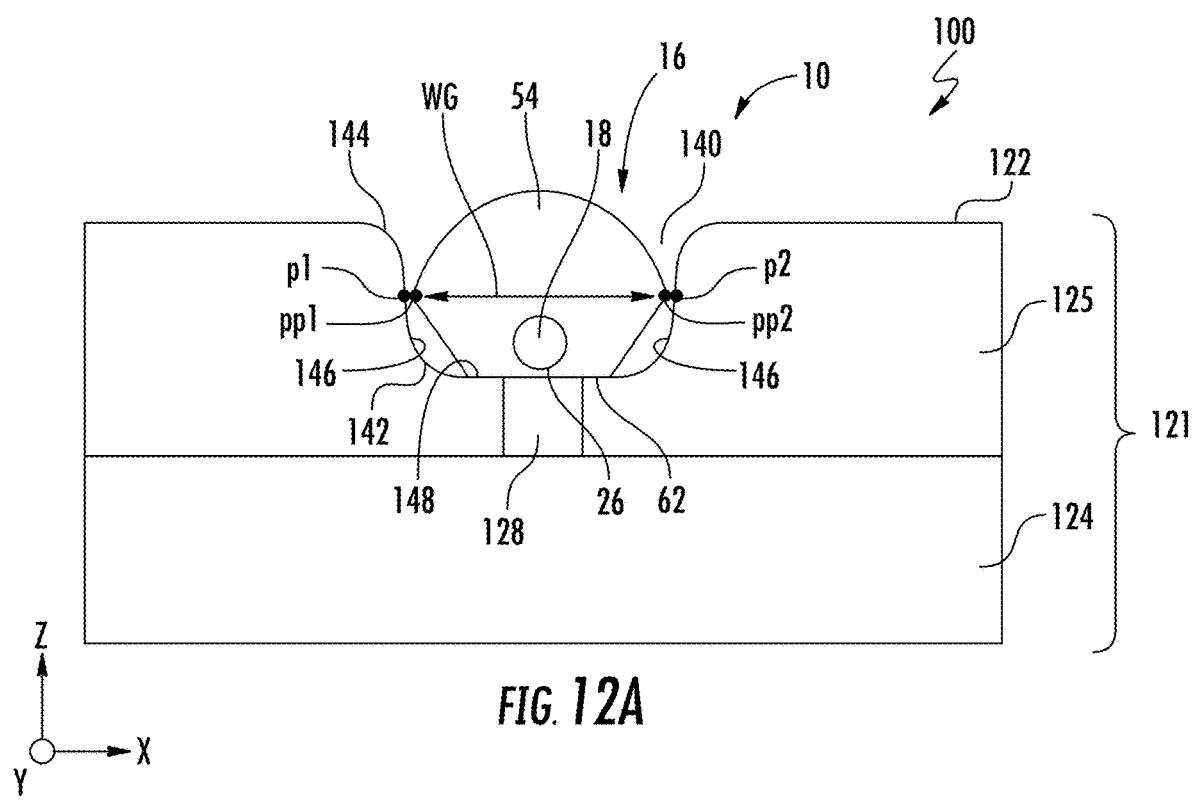
FIG. 12A is similar to FIG. 10 and shows an example wherein the glass portion of the fiber has a tapered cross-sectional shape having a widest point that contacts the sidewalls of the alignment channel of the photonic device.

FIG. 12A is similar to FIG. 10 and shows an example wherein the glass portion 16 of the fiber 10 defines the tapered cross-sectional shape for the fiber and also defines the outer surface 24 of the fiber for an end section 12 of the fiber. The tapered cross-sectional shape of the glass portion 16 includes two profile points pp1 and pp2 that define a maximum width WG of the glass portion. The tapered cross-sectional shape of the fiber 10 as defined by the glass cladding 16 is formed so that the two profile points pp1 and pp2 contact the contact points p1 and p2 of the sidewalls 146 of the alignment channel 140. In this configuration, the widest part of the glass portion 16 resides below the surface 122 of the photonic device 120 and the glass portion does contact the rounded outer corners 144 of the alignment channel 140. Precise lateral alignment of the core 18 of the fiber 10 to the core 128 of the waveguide 130 can be achieved by controlling the width wC of the alignment channel 140 so that it substantially matches the maximum width wG of the glass portion 16. In an example, the widths wC and wG can be in the range from about 10 µm to 40 µm and can be controlled to about 0.5 µm.

Figure 12B:
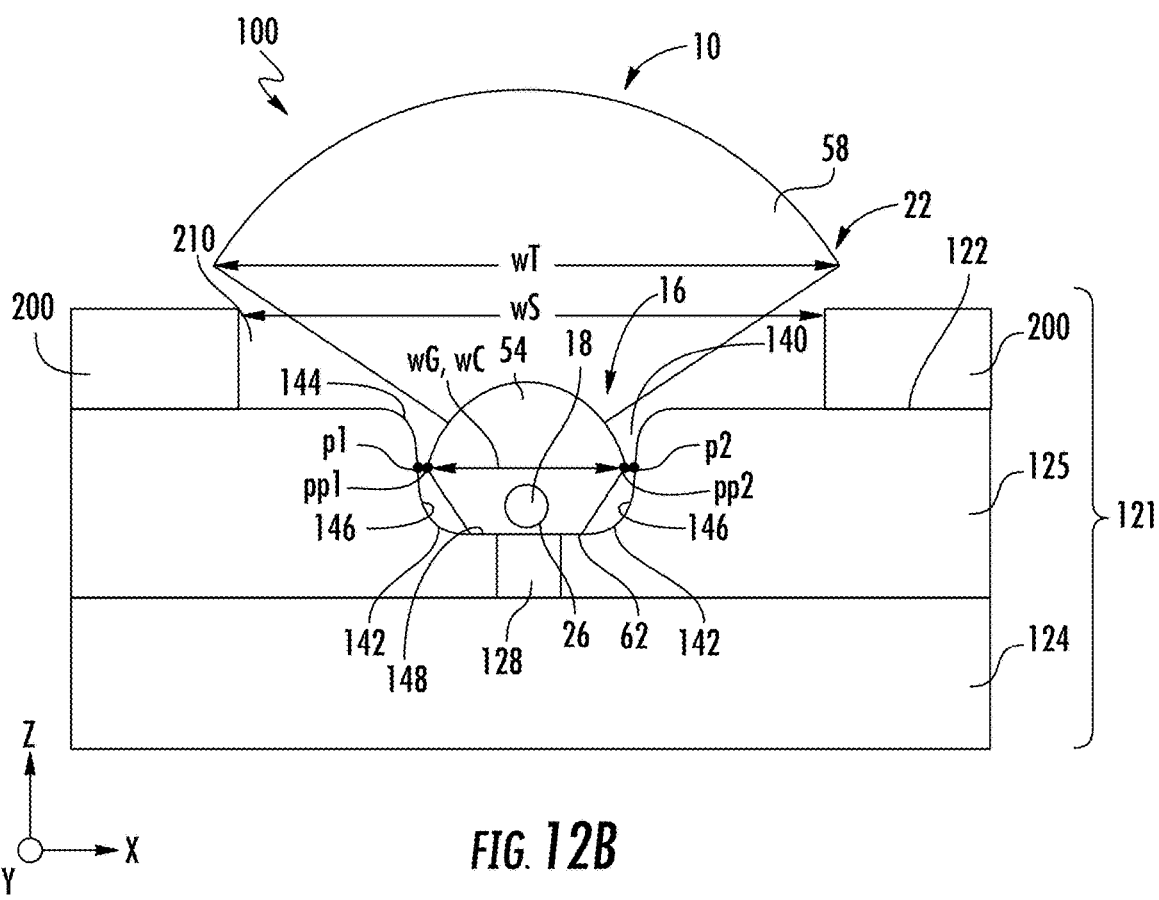
FIG. 12B is similar to FIG. 12A and illustrates an example configuration wherein the polymeric portion of the cladding also has a tapered configuration.

FIG. 12B is similar to FIG. 12A and illustrates an example configuration wherein the polymeric outer cladding 58 of the cladding 22 is configured (e.g., by laser ablation) to also have a tapered configuration. The tapered polymeric outer cladding 58 is substantially larger than the tapered glass portion 16 and is used to provide coarse alignment of the glass portion 16 with the alignment channel 140 of the photonic device 120. The coarse alignment utilizes a guide layer 200 formed on the surface 122 as defined by the overclad layer 125. The guide layer 200 includes a guide slot 210 centered on the alignment channel 140 of the overclad layer 125. The guide slot 210 has a width wS that is smaller than the maximum width wT of the tapered polymeric outer cladding 58 (e.g., 70-90% of the width wT), where it serves as a guide feature for placing the fiber 10 in coarse alignment with the alignment channel 140.

The position of the guide slot 210 does not need to be controlled very precisely to provide suitable coarse alignment of the fiber 10 with the photonic device 120. For example, the guide slot 210 can be centered to within 5 µm to 15 um of the center of the alignment channel 140 and still provide an adequate degree of course alignment.

Figure 12C:
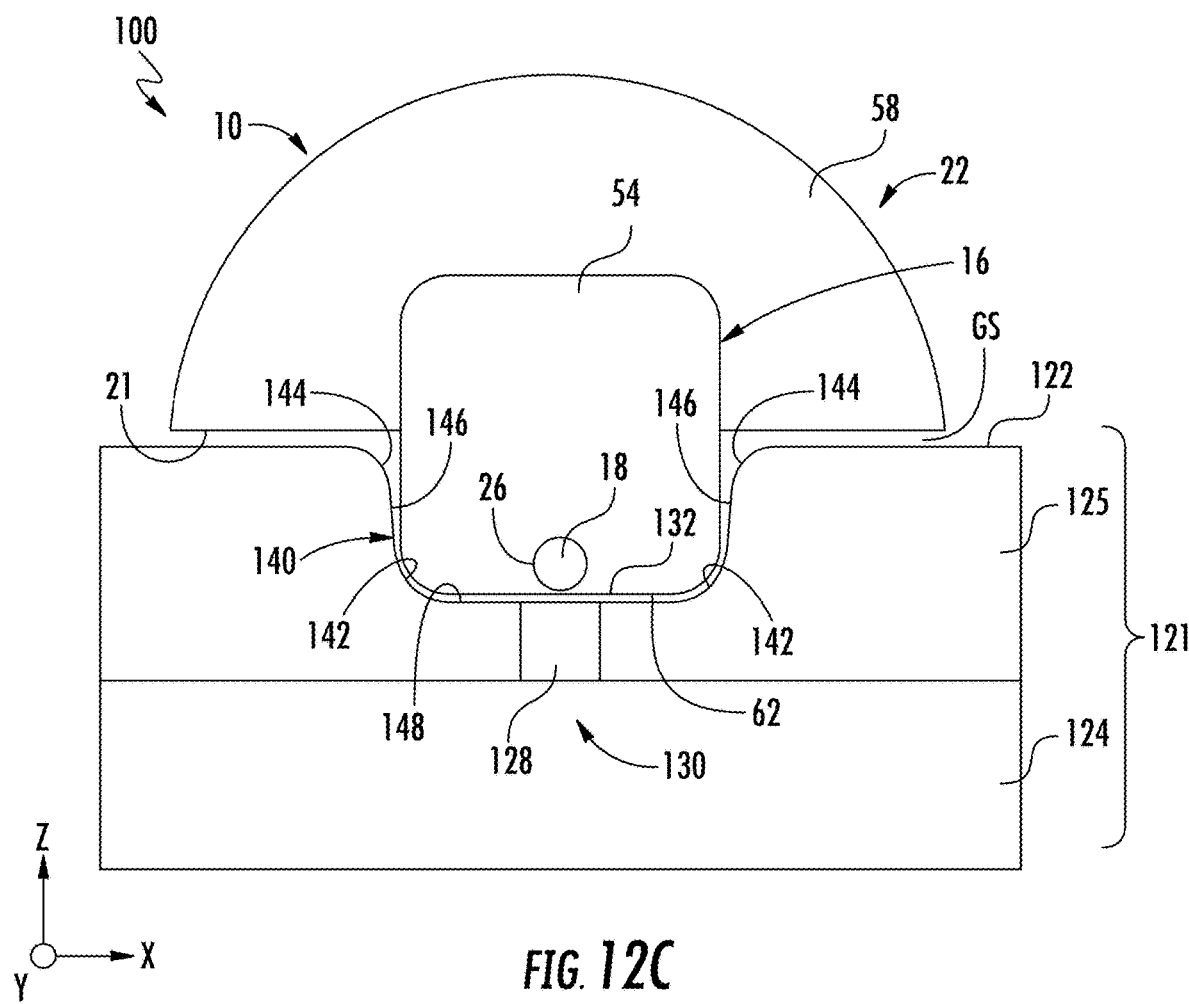
FIG. 12C is similar to FIG. 12B and shows an example wherein the polymeric portion of the cladding has a semi-circular cross-sectional shape while the glass portion has a rounded rectangular cross-sectional shape that substantially matches the size and shape of the alignment channel of the photonic device.

FIG. 12C is similar to FIG. 12B and shows an example wherein the polymeric outer cladding 58 of cladding 22 is formed (e.g., via laser ablation) to have a semi-circular cross-sectional shape while the glass portion 16 has a rounded rectangular cross-sectional shape that substantially matches the size and shape of the alignment channel 140. The glass portion 16 includes the flat glass-portion surface 62 at which the core 18 resides. The polymeric outer cladding 58 has a bottom surface 21 that confronts the surface 122 of the photonic device 120 when the glass cladding 16 is operably positioned in the alignment channel 140. In an example, there can be a small gap GS between the bottom surface 21 of the polymeric outer cladding 58 and the surface 122. This gap GS accommodates variations in the thickness of the overclad layer 125 and/or the depth of the alignment channel 140.

Figure 13A:
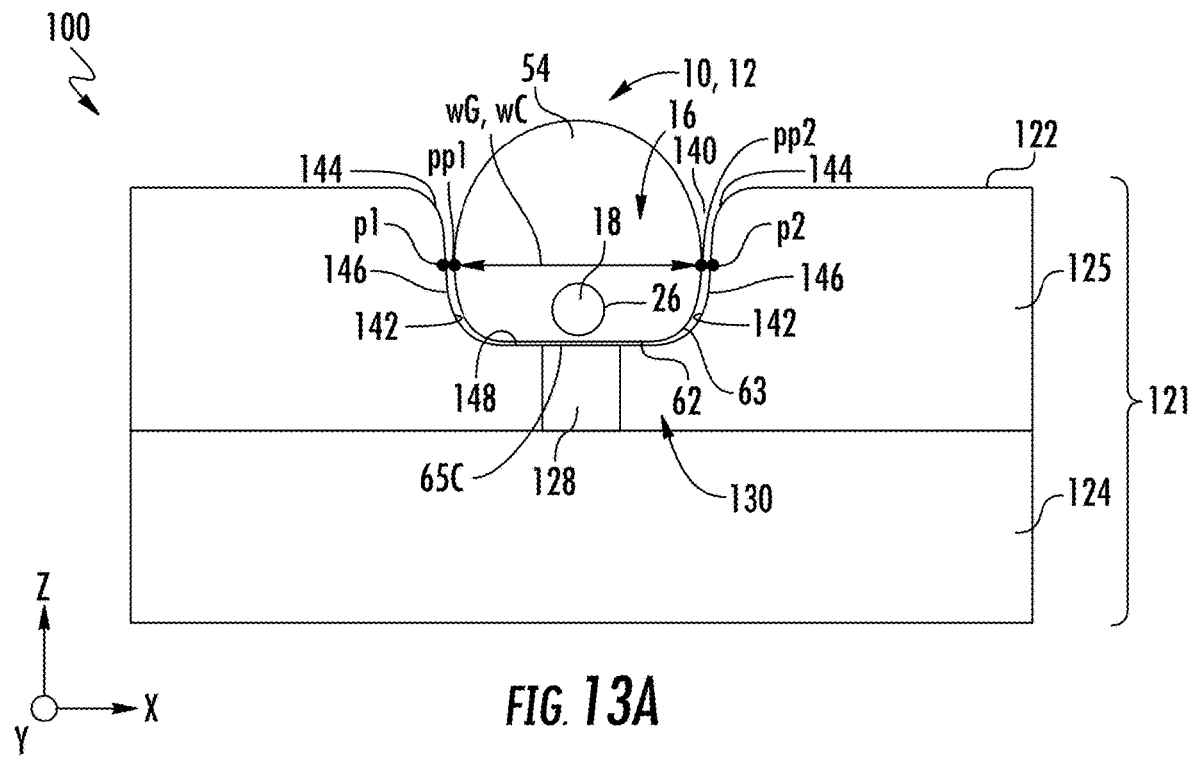
FIG. 13A is similar to FIG. 12A and illustrates an example wherein the glass portion of the fiber has a cross-sectional shape similar to that shown in FIG. 1B but with rounded edges that match the curvature of the inner corners of the alignment channel of the photonic device.

A potential issue with fiber 10 of FIG. 1B is that the flat glass-portion surface 62 has outer corners 63 that are relatively sharp. These sharp outer corners 63 can interfere with the rounded inside corners 142 of the alignment channel 140 and create a gap between the flat glass-portion surface 62 and the bottom 148 of the alignment channel 140. FIG. 13A is similar to FIG. 12A and illustrates an example wherein the fiber 10 has a glass portion 16 with cross-sectional shape similar to that shown in FIG. 1B. The polymeric outer cladding 58 has been removed (e.g., via laser ablation) from the end section 12 to define the flat glass-portion surface 62 of the glass portion 16.

The glass portion 16 of the fiber 10 of FIG. 13A has rounded outer corners 63 each having a radius of curvature the same as or less than that of the rounded inside corners 142 of the alignment channel 140. This allows for the glass portion 16 to reside within the alignment channel 140 with the flat glass-portion surface 62 in contact with the bottom 148. In an example, the (maximum) width wG of the glass portion 16 is substantially equal to the width wC of the alignment channel 140 so that the profile points pp1 and pp2 of the glass portion contact the contact points p1 and p2 of the sidewalls 146, noting that some space is shown between the glass portion and sidewalls for ease of illustration.

Figure 13B:
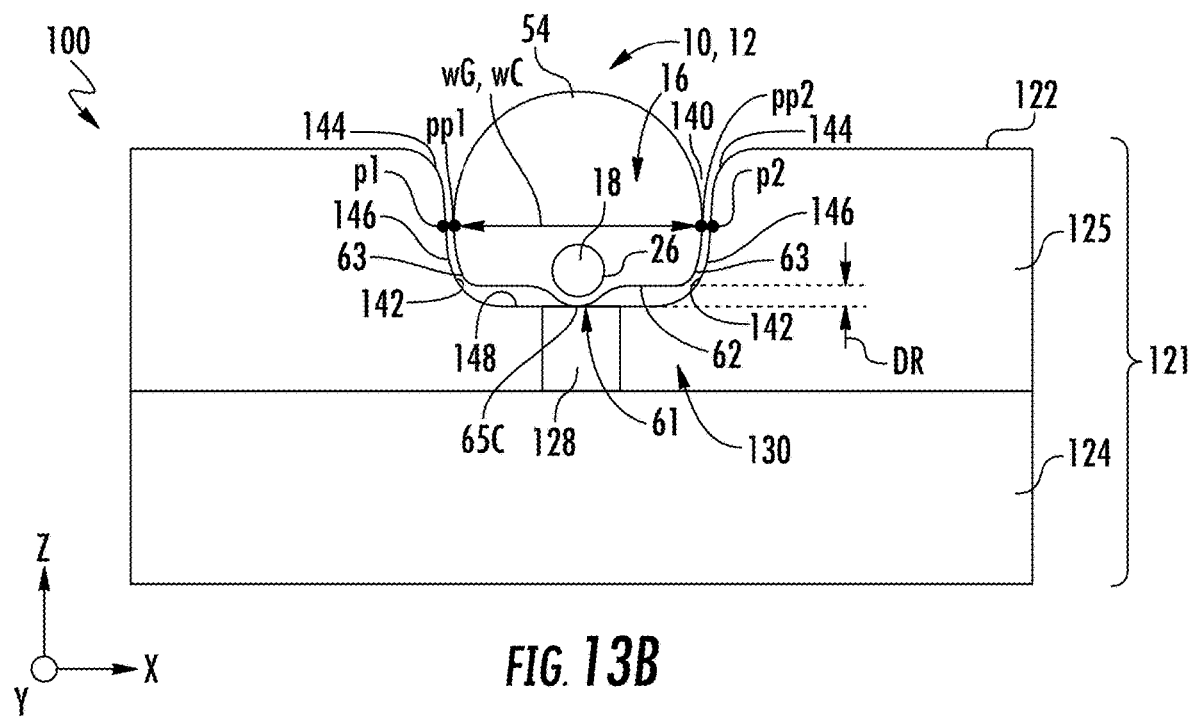
FIG. 13B is similar to FIG. 13A and illustrates an example wherein the otherwise flat glass-portion surface has a central ridge aligned with the core.

FIG. 13B is similar to FIG. 13A and illustrates an example wherein the otherwise flat glass-portion surface 62 includes a central section 61 wherein the core 18 resides within the coupling distance DR. The central section 61 can also be referred to as the coupling section since the evanescent coupling occurs through this part of the glass-portion surface 62. In an example, this is accomplished by the central section 61 having a central ridge 65C aligned with the core 18. The central ridge 65C can be formed by selectively laser ablating the flat glass-portion surface 62 so that the core 18 resides partially within the central ridge. The central ridge 65C is used to ensure that the glass portion 16 at which the core 18 resides contacts the bottom 148 of the alignment channel 140 at which the waveguide core 128 resides. The central ridge 65C can be also serve to provide a more concentrated force between the glass portion 16 and the bottom 148 of the alignment channel 140. The more concentrated force can ensure close contact, especially in the presence of debris, which can form an unwanted gap (or increase the size of the desired coupling distance DR) between the fiber core 18 and the waveguide core 128 in the coupling region 30. Note that the central ridge 65C remains in contact with the bottom 148 of the alignment channel 140 even if the glass portion 16 rotates about the fiber central axis AC within the alignment channel.

Figure 13C:
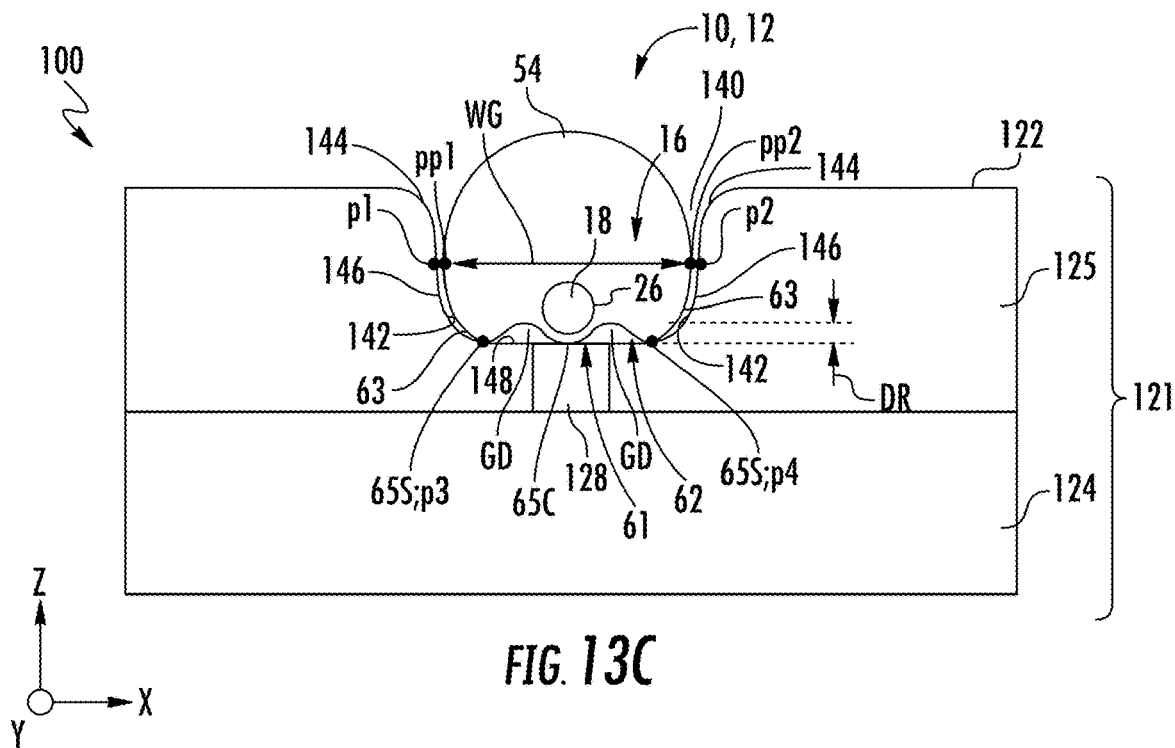
FIG. 13C is similar to FIG. 13B and shows an example where the flat glass-portion surface includes two outboard or "side" bumps in addition to the central ridge.

FIG. 13C is similar to FIG. 13B and shows an example where the flat glass-portion surface 62 is further processed to have two outboard or "side" bumps 65S in addition to the central ridge 65C. The side ridges 65S are formed to provide additional precision contact points p3 and p4 for alignment of the core 18 of the fiber 10 to the core 128 of the waveguide 130 when the fiber 10 is operably disposed in the alignment channel 140. The side ridges 65S can allow for the fiber 10 to rotate slightly upon insertion into the alignment channel 140 so that the fiber core 18 is always precisely aligned to waveguide core 128. The side ridges 65S and the central ridge 65C define two longitudinal gaps GD between the flat glass-portion surface 62 of the glass portion 16 and the bottom 148 of the alignment channel 140. The gaps GD provide a place for debris to migrate during the insertion of the fiber 10 into the alignment channel 140.

Figure 13D:
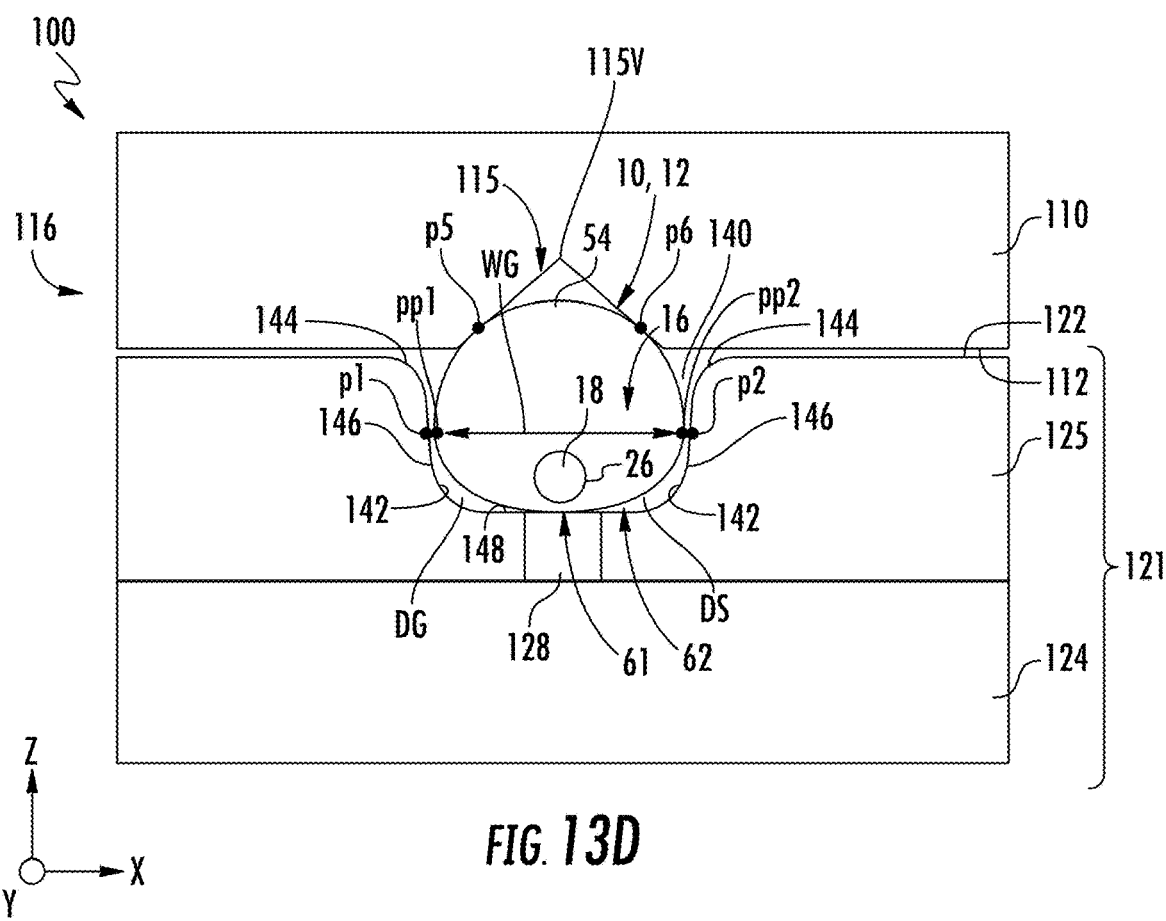
FIG. 13D is similar to FIGS. 13B and 13C and illustrates an embodiment wherein the glass-portion surface rounded rather than flat and wherein an alignment member with a V-groove engages the alignment surface of the fiber.

FIG. 13D is similar to FIGS. 13B and 13C and illustrates an embodiment wherein the glass-portion surface 62 of the glass portion 16 is rounded rather than flat. This configuration for the glass portion 16 may be easier to fabricate than the configuration that has the central ridge 65C while still providing gaps DG for debris collection. This rounded configuration tolerates modest fiber rotational misalignment about the fiber central axis AC without significantly changing the coupling distance DR.

FIG. 13D also shows an example where alignment member 110 of the alignment assembly 116 includes an alignment feature 115 in the form of a V-groove 115V formed in the surface 112 of the alignment member 110. The V-groove 115V makes contact with a now curved alignment surface 70 of the glass portion 16 at two contact points p5 and p6. Use of the alignment member 110 in the alignment assembly 116 allows for a looser fit of the glass portion 16 within the alignment channel 140.

Figure 13E:
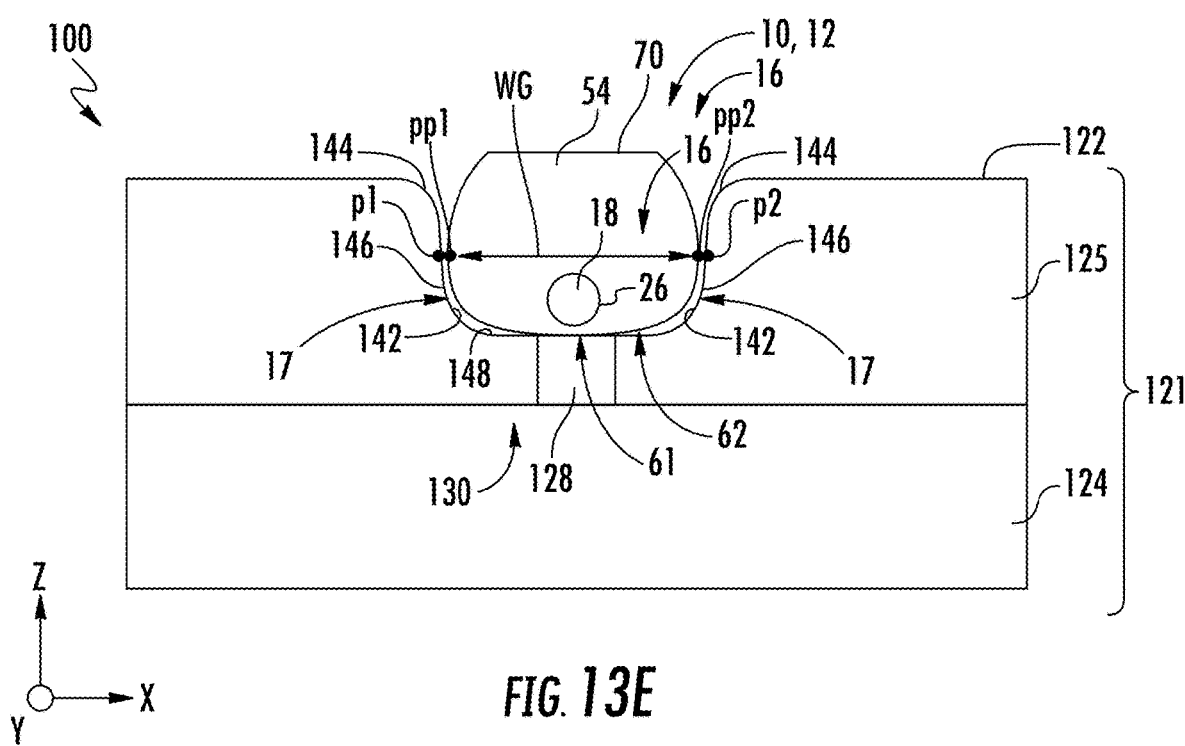
FIG. 13E is similar to FIG. 13A and illustrates an embodiment where the glass portion includes the flat glass-portion surface 62 and a flat alignment surface 70 aligned to and opposite from the flat glass-portion surface.

FIG. 13E is similar to FIG. 13A and illustrates an embodiment where the glass portion 16 includes the flat glass-portion surface 62 and the flat alignment surface 70 generally parallel to the flat glass-portion surface, similar also to the embodiment of fiber 10 of FIG. 10 described above. Having generally parallel surfaces 62 and 70 makes the cladding profile more symmetric so that it can be more readily formed without distortion during the drawing process. Making the sides 17 of the glass portion 16 that reside adjacent the sidewalls 146 of the alignment channel 140 symmetrical about the z-axis axis can further improve the ability to maintain the desired cladding profile of the fiber 10 during the drawing process, as well as providing for symmetric contact points p1 and p2 on sidewalls 146 of the channel 140.

Figure 14A:
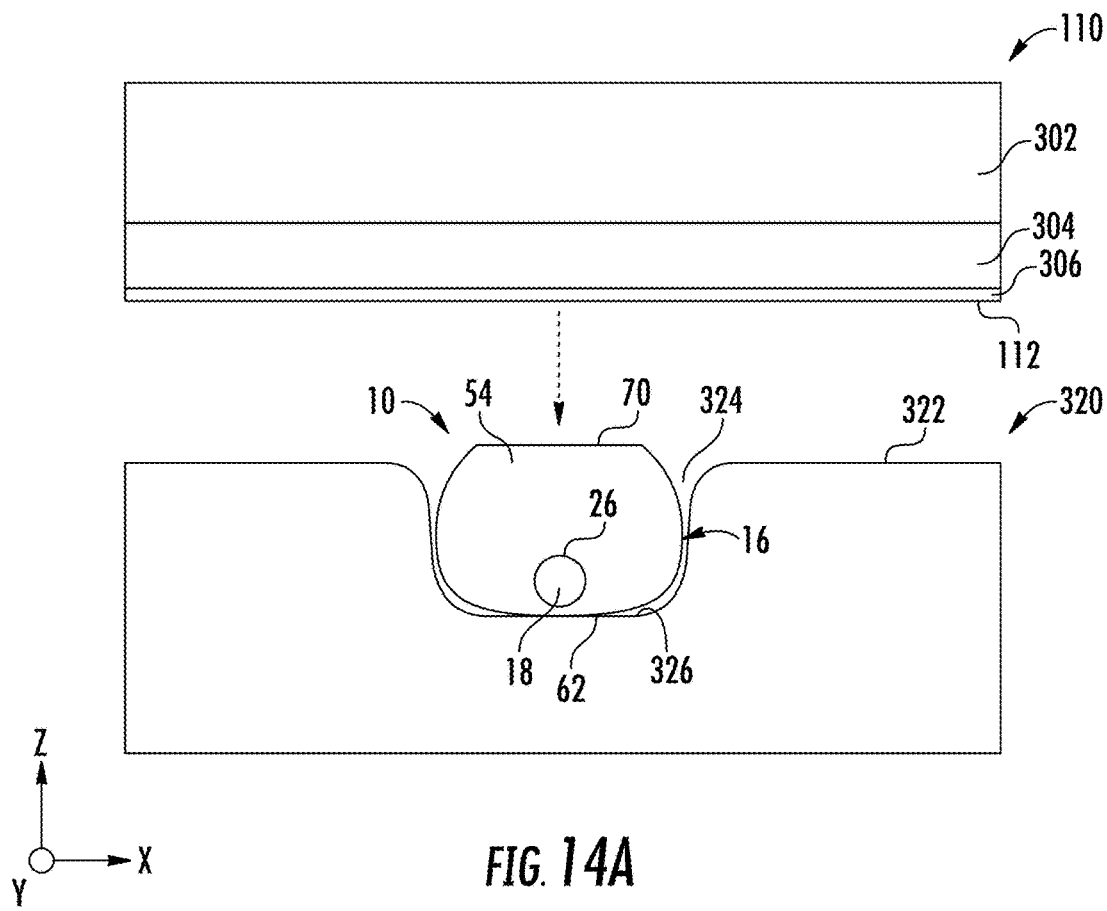
FIG. 14A is a cross-sectional view of the fiber of FIG. 13E residing within an alignment channel of an alignment jig and showing an alignment member in position above the flat alignment surface.

As discussed above, the flat top surface 70 of the glass portion 16 also makes it easier to employ the alignment member 110 or like support member and generally allows for simplified methods of fabricating the evanescent coupler 100. FIG. 14A shows an example alignment member 110 initially positioned above the flat alignment surface 70 of the glass portion 16 of an example fiber 10 as a first step in fabricating an example evanescent coupler 100. Also shown in FIG. 14A is an alignment jig 320 having a top surface 322 in which an alignment groove 324 is formed. The alignment groove 324 has a bottom 326. The glass portion 16 is shown supported in the alignment groove 324, with the core 18 located closest to the bottom 326 of the alignment groove. The alignment jig 320 can include multiple alignment grooves 324 having the same period Λ as the alignment channels 140 of the photonic device 120.

In an example, the alignment member 110 includes a support sheet 302, an elastomeric layer 304 supported by the support sheet, and an adhesive layer 306 supported by the elastomeric layer. In the example, the adhesive layer defines the surface 112 of the alignment member 110. The alignment member 110 is disposed with the adhesive layer 306 confronting the flat alignment surface 70 of the glass portion 16.

Figure 14B:
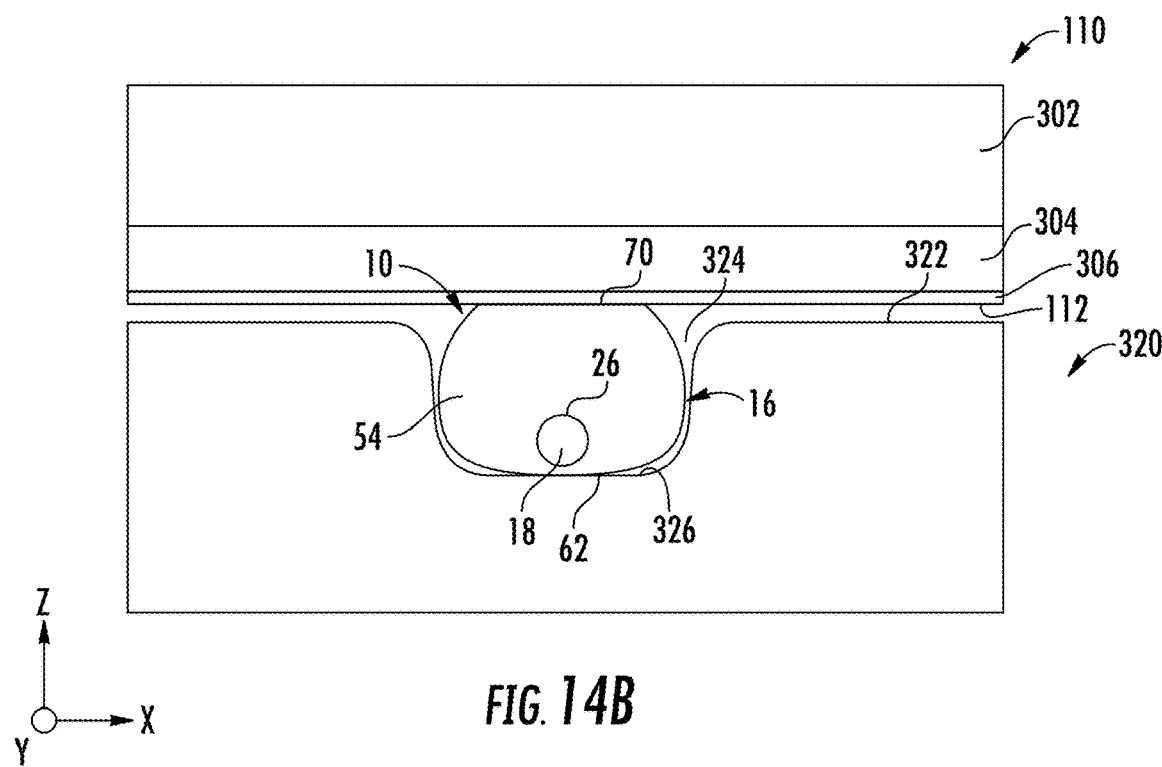
FIG. 14B is similar to FIG. 14A and shows an adhesive layer of the alignment member contacting the flat alignment surface of the fiber.
Figure 14C:
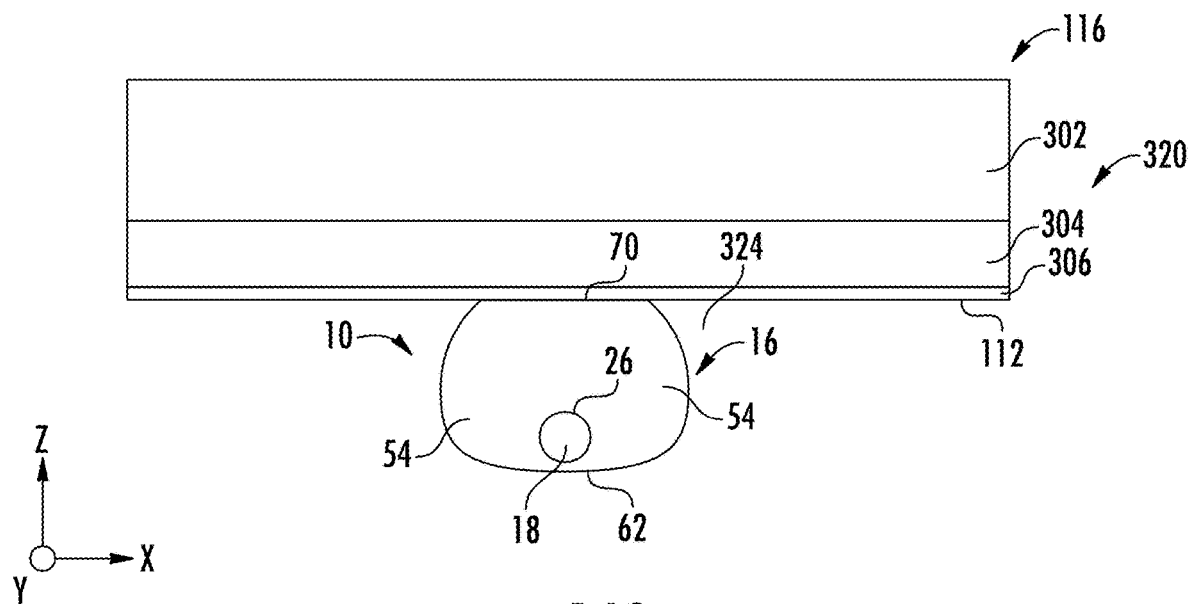
FIG. 14C is similar to FIG. 14B and shows an alignment assembly formed by the fiber and the alignment member, wherein the fiber is adhered to the adhesive layer of the alignment member.

FIG. 14B shows the next step in the fabrication process, wherein the alignment member 110 is brought into contact with the glass portion 16 so that the flat alignment surface 70 of the glass portion bonds to the adhesive layer 306. The alignment jig 320 is then removed, leaving the structure shown in FIG. 14C, which forms an alignment assembly 116.

Figure 14D:
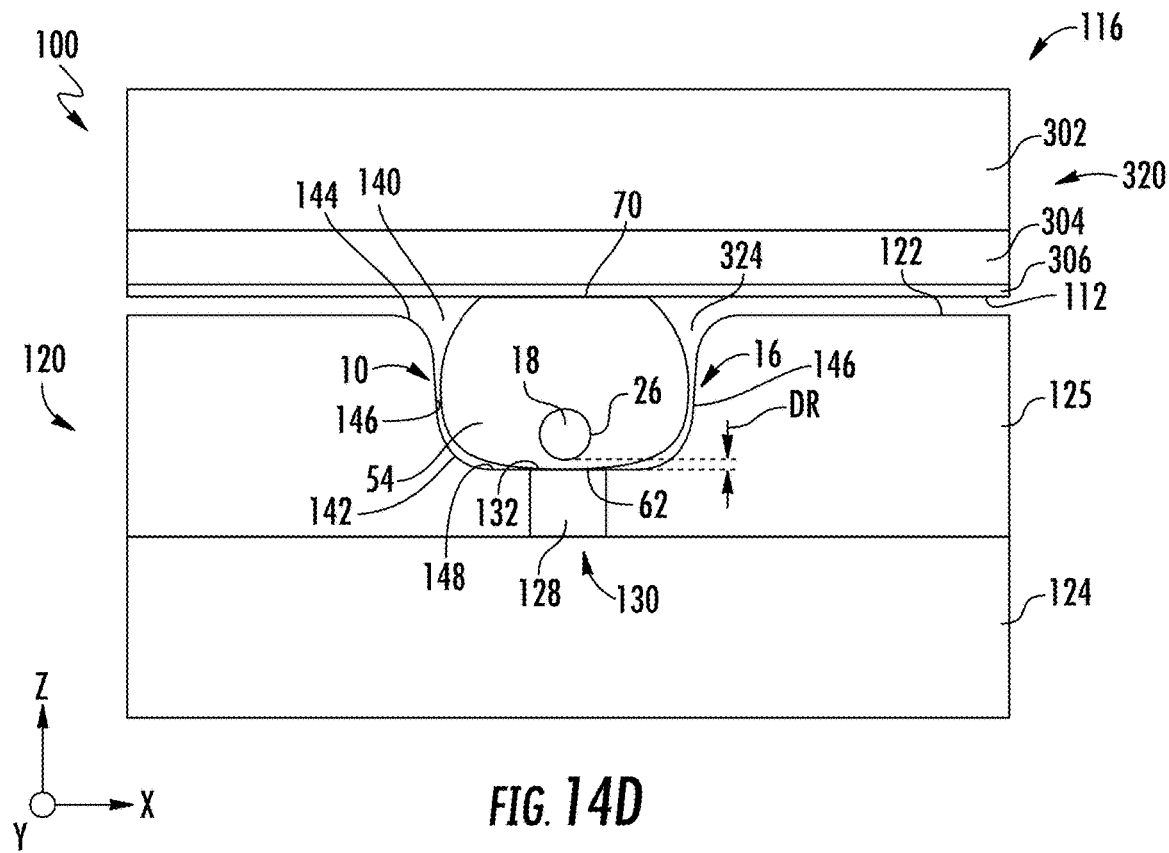
FIG. 14D is similar to FIG. 14C and shows how the alignment assembly is used to deploy the glass portion of the fiber within an alignment channel of the photonic device.

In the next step as shown in FIG. 14D, the alignment member 110 and the glass portion 16 bonded thereto is used to deploy the glass portion 16 into the alignment channel 140 of the photonic device 120 to form the final evanescent coupler 100. The elastomeric layer 304 is optional and used to allow the glass portion 16 to be deflected slightly during the deployment process.

While the example assembly process for forming the evanescent coupler 100 has been shown for a single fiber 10, the fabrication process can be applied to an array of fibers 10 to ensure that the glass portions 16 of the fibers are positioned in respective alignment channels 140 of the photonic device 120 with a precise center-to-center pitch (i.e., period) Λ.

Figure 15A:
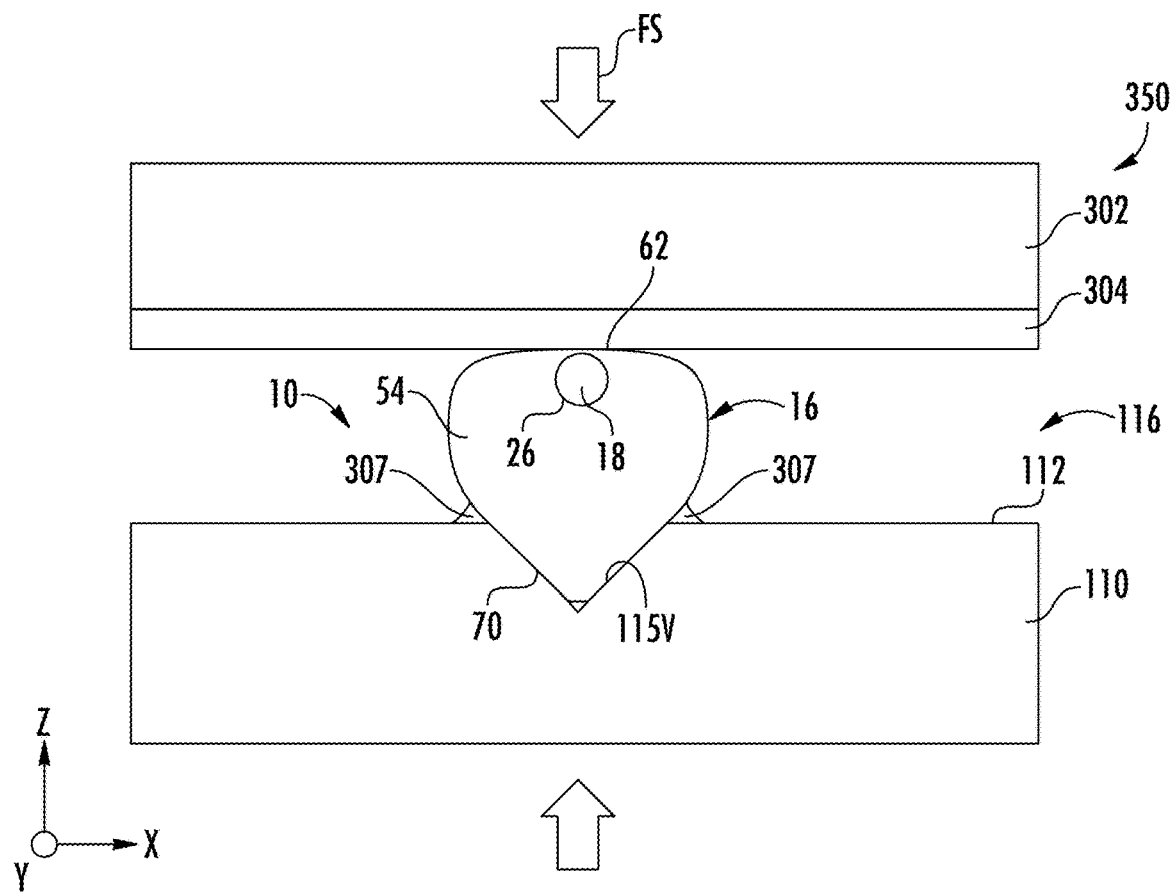
FIGS. 15A through 15C are cross-sectional views of an example fiber having a flat glass-surface portion and a V-shaped alignment surface and illustrating the use of an alignment member and a pressing member as part of a process of forming an evanescent coupler.

FIG. 15A is a cross-sectional view that shows a first step in an example assembly process for forming an example evanescent coupler 100. The alignment surface 70 of the glass portion 16 of the fiber 10 has a V-shape profile while the alignment member 110 is similar to that of FIG. 13D and includes the V-shaped alignment groove 115V complementary to the V-shape alignment surface. The alignment member 110 can include multiple spaced-apart V-shaped alignment grooves 115V having a select period Λ.

The V-shaped alignment surface 70 of the glass portion 16 is urged into the V-shaped alignment groove 115V using a pressing member 350, which in an example can comprise the another alignment member 110 as described above but without the adhesive layer 306 so that the elastomeric layer 304 contacts the flat glass-portion surface 62 of the glass portion 16. The optional elastomeric material 304 of the pressing member 350 helps prevent damage to the flat glass-portion surface 62 of the glass portion 16 that could occur if a hard material (e.g., a glass sheet) is used. The elastomeric material 304 also allows the V-shaped alignment surface 70 of the glass portion 16 to rotate slightly about the central axis AC of the fiber 10 as it is forced into the V-shaped alignment groove 115V.

An adhesive material 307 is used to bond the V-shaped alignment surface 70 of the glass portion 16 within the V-shaped alignment groove 115V of the alignment member 110. The application of the adhesive material 307 is controlled to prevent excess adhesive material from reaching the flat glass-portion surface 62 of the glass portion 16. In an example, at least one thin layer of the adhesive material 307 may be applied to the top surface 112 of the alignment member 110 and in the V-shaped alignment groove 115V prior to inserting the V-shaped alignment surface 70 into the alignment channel. In an example, the adhesive material 307 may be applied using a spin-on technique.

Figure 15B:
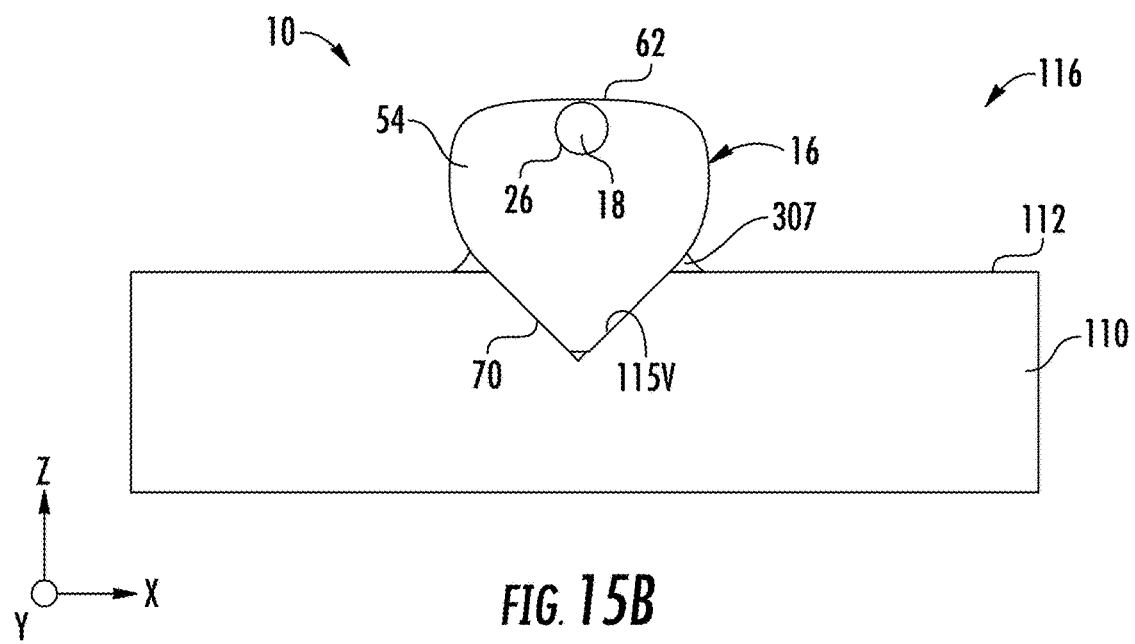

After the adhesive material 307 is cured, the pressing member 350 is removed, resulting in the alignment assembly 116 as shown in FIG. 15B. As noted above, the alignment member 110 can be configured with multiple V-shaped grooves 115V to support an array of fibers 10 having the select period Λ.

Figure 15C:
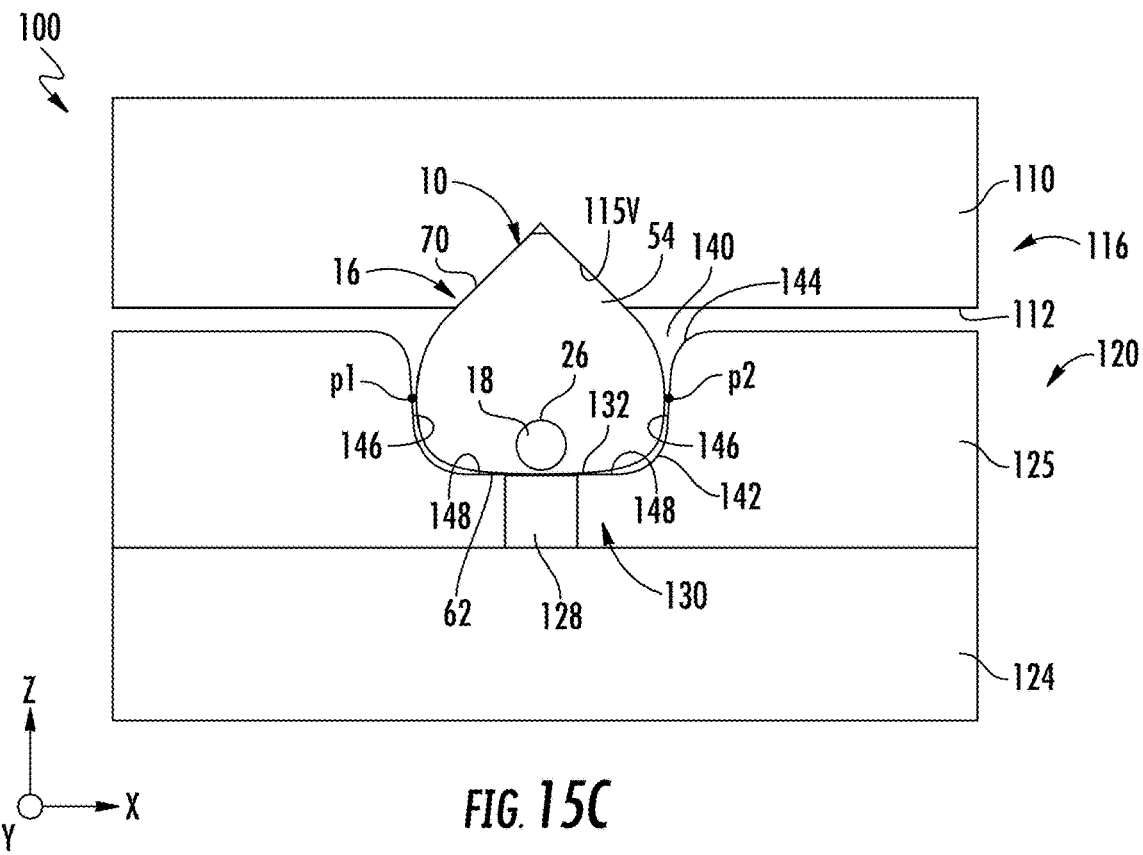

FIG. 15C shows the next step in the fabrication process, wherein the alignment assembly 116 is inverted and aligned with the alignment channel 140 of the photonic device 120. The alignment assembly 116 and the photonic device 120 are then brought together (interfaced) so that the part of the glass portion 16 that includes the flat glass-portion surface 62 resides within the alignment channel 140, with the flat glass-portion surface in contact with or in close proximity to the bottom 148 of the alignment channel, thereby forming the evanescent coupler 100. As in this and the other configurations for the evanescent coupler 100, the core 18 of the fiber 10 resides sufficiently close to the core 128 of the waveguide 130 (e.g., within the coupling distance DR) to enable evanescent coupling as described above.

Figure 15D:
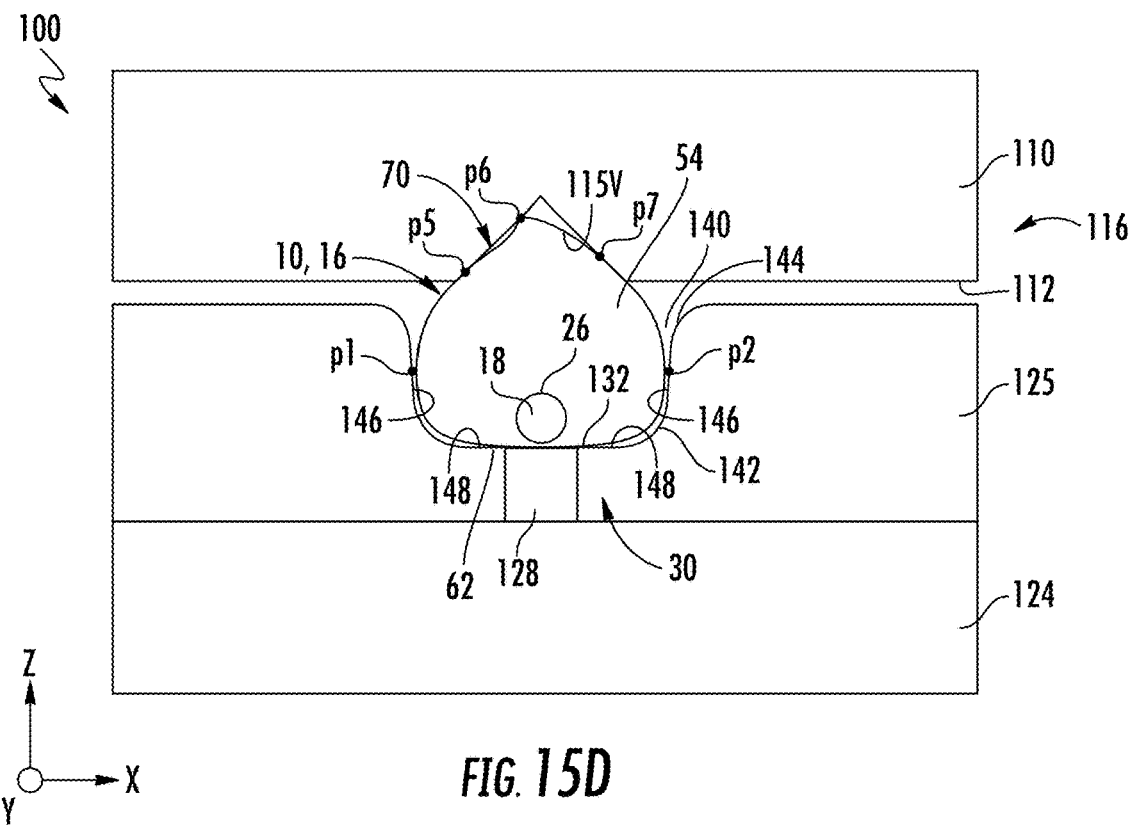
FIGS. 15D and 15E are similar to FIG. 15C but shows the alignment surface having a curvature that defines select contact points with the V-groove of the alignment member.

FIG. 15D is similar to FIG. 15C and illustrates an example wherein the alignment surface 70 of the glass portion 16 has a modified V-shape that provides for multiple contact points p5, p6 and p7 between the glass portion and the V-shaped alignment groove 115V of the alignment member 110, in addition to the aforementioned contact points p1 and p2 between the glass portion and the channel sidewalls 146. This can be accomplished for example by introducing a slight curvature to the otherwise flat surfaces that define the general V-shape of the alignment surface 70.

Figure 15E:
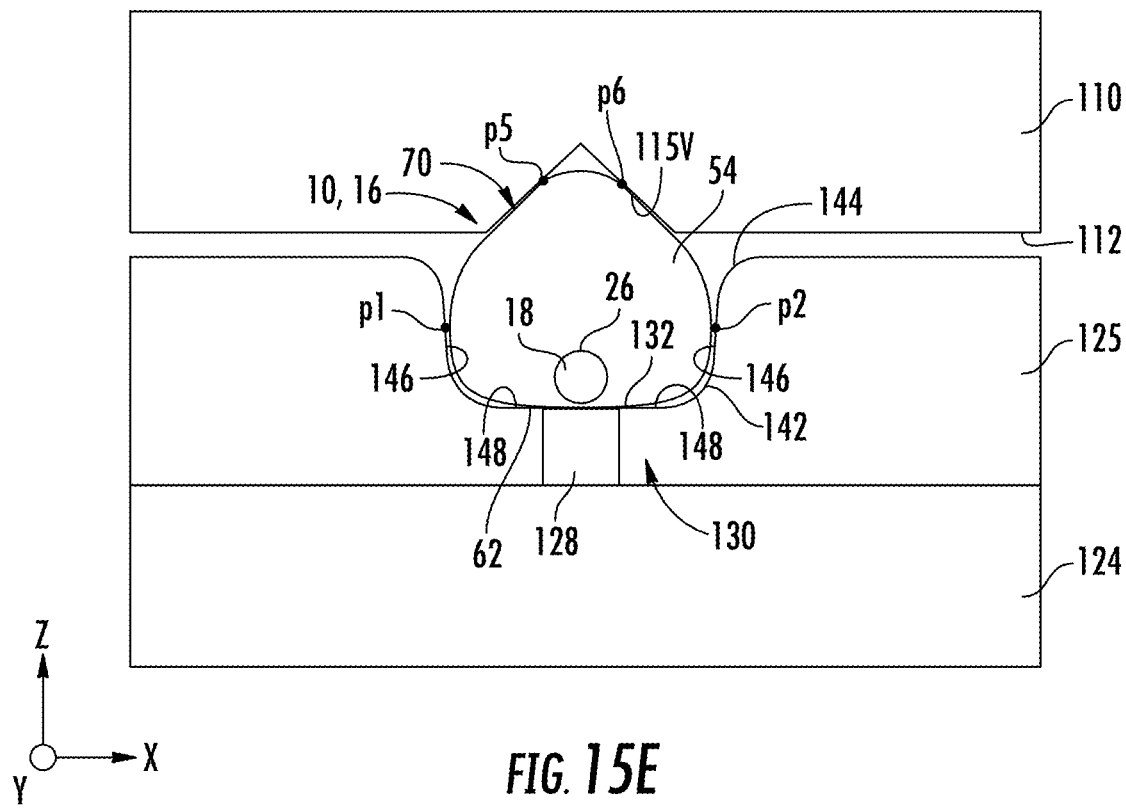

FIG. 15E is similar to FIG. 15D and shows an example configuration of the evanescent coupler 100 wherein the alignment surface 70 of the glass portion 16 has a rounded V-shape that provides two contact points p5 and p6 with the V-shaped alignment groove 115V of the alignment member 110. During alignment and pressing of the glass portion 16 into the V-shaped alignment groove 115V of the alignment member 110 using the pressing member 350, the glass portion 16 can be rotated within the V-shaped alignment groove 115V so that the flat glass-portion surface 62 of the glass portion 16 is generally parallel with the top surface 112 of the alignment member 110. This ensures that if the top surface 112 of the alignment member 110 is generally parallel with the top surface 122 of the photonic device 120, the glass portion 16 will be properly seated within the alignment channel 140 of the photonic device for evanescent coupling.

Dual Use Cladding Profiles

Fibers 10 used in evanescent coupling to planar waveguides 130 of a photonic device 120 can extend to remote locations where optical connectors are required. Most commercially available optical connector ferrules (e.g., MTP, LC, and SC connector ferrules) are designed to accept fibers that have a standard outside diameter (e.g. 125 µm for SMF-28 fiber). It may therefore be desirable for the fiber 10 to have a cladding 22 configured for dual use, i.e., for use at one end in evanescent coupling configurations of the evanescent couplers 100 as well as for use at its other end with standard optical connector ferrules.

Figure 16A:
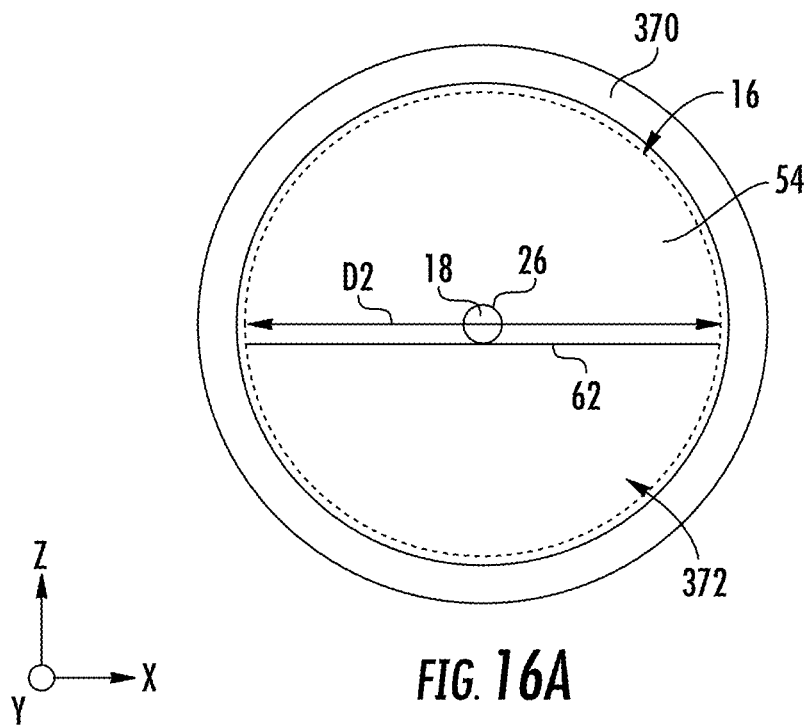
FIG. 16A is a cross-sectional view of an example glass portion of a fiber residing within a ferrule, wherein the glass portion has a D-shape so that only 50% of the ferrule interior is occupied by the glass portion of the fiber.

FIG. 16A is a cross-sectional view of an example fiber 10 residing within an interior 372 of a ferrule 370. The glass portion 16 of the fiber 10, which includes the core 18 and glass inner cladding 54, has a D-shape (i.e., semi-circular shape) with a diameter D2, which in an example is 125 µm. A dashed circle is used to show the perimeter of the glass portion 16 for clarity. The core 18 of the fiber 10 is located at or in close proximity to the flat glass-portion surface 62 as well as centered on the central axis AC so that it can be coaxially aligned with a standard SMF-28 optical fiber within the ferrule 370.

For such a fiber 10, only about 50% of the glass portion 16 is curved with diameter D2, so that only half of the interior 372 of the ferrule is occupied by the glass portion 16. A problem with this configuration is that if the diameter D2 is even slightly undersized, the fiber 10 will be highly unconstrained within the ferrule interior 372 the vertical direction. This results in undesirable vertical play that introduces lateral misalignment of the core 18 during fiber-to-fiber coupling.

Figure 16B:
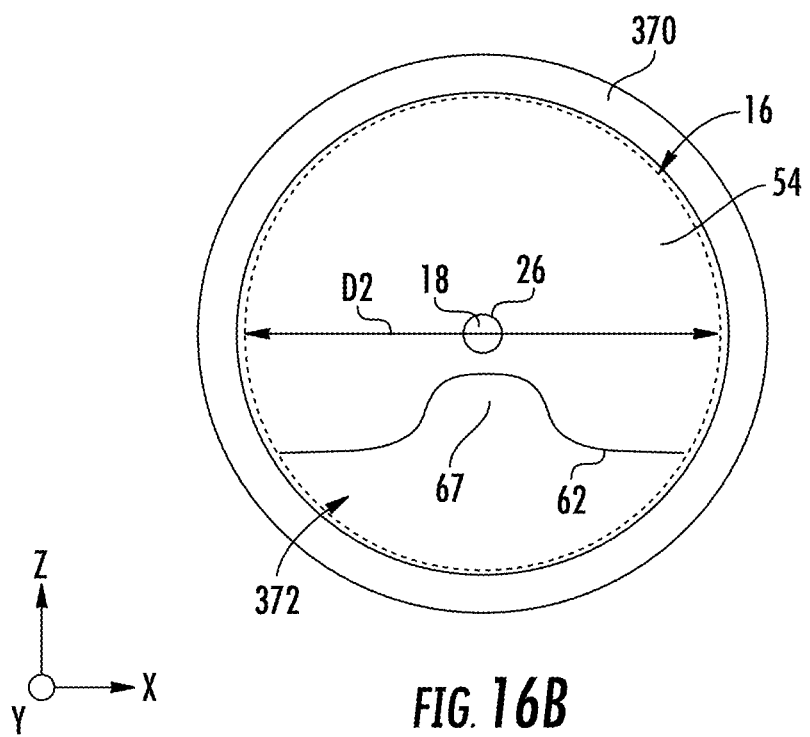
FIG. 16B is similar to FIG. 16A, but wherein the glass portion is shaped so that greater than 50% of the ferrule interior is occupied by the glass portion of the fiber.

FIG. 16B shows a modified profile for the glass portion 16 of cladding 22 of the fiber 10, wherein the glass-portion surface 62 is shaped such that 75% or greater of the glass portion 16 is curved with the diameter D2. In this configuration, the glass portion 16 fills substantially greater than 50% of the interior 372 of the ferrule 370. This in turn greatly reduces the amount of vertical play when the glass portion 16 is held within the standard ferrule 370.

The profile of the glass portion 16 of FIG. 16B includes a groove 67 in the central section 61 of the glass-portion surface 62 so that the core 18 of the fiber 10 resides at or closely proximate to flat glass-portion surface 62 for evanescent coupling to exterior waveguides 130, which in an example can be another optical fiber. The groove 67 can be designed to serve as an alignment feature for aligning to an exterior waveguide 130.

Figure 17A:
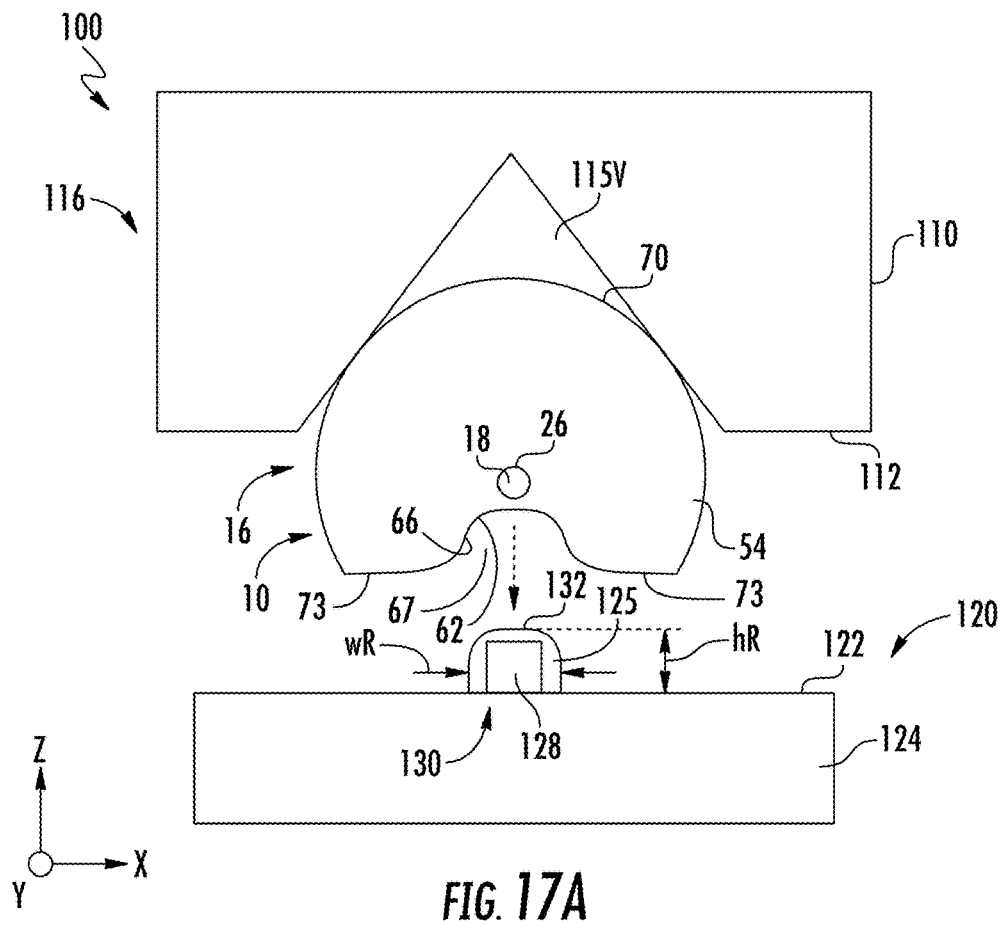
FIG. 17A shows an example alignment assembly with the glass portion of the fiber of FIG. 16B held within a V-shaped alignment groove of an alignment member to form an alignment assembly, shown positioned above a photonic device in anticipation of interfacing the alignment assembly and the photonic device to form an evanescent coupler.

FIG. 17A shows an example alignment assembly 116 with the glass portion 16 of fiber 10 of FIG. 16B held within the V-shaped alignment groove 115V of the alignment member 110. The alignment assembly 116 is shown in position relative to an example photonic device 120 in anticipation of interfacing the alignment assembly to the photonic device to form an evanescent coupler 100. The waveguide 130 resides atop the underclad layer 124 and has the form of a ridge waveguide. The overclad layer 125 surrounds the core 128 on three sides and is processed (e.g., etched) so that the ridge waveguide 130 has a select width wR and a select height hR so that the cross-sectional shape of the ridge waveguide is substantially complementary to the cross-sectional shape of the groove 67 formed in the glass portion of the fiber 10.

Figure 17B:
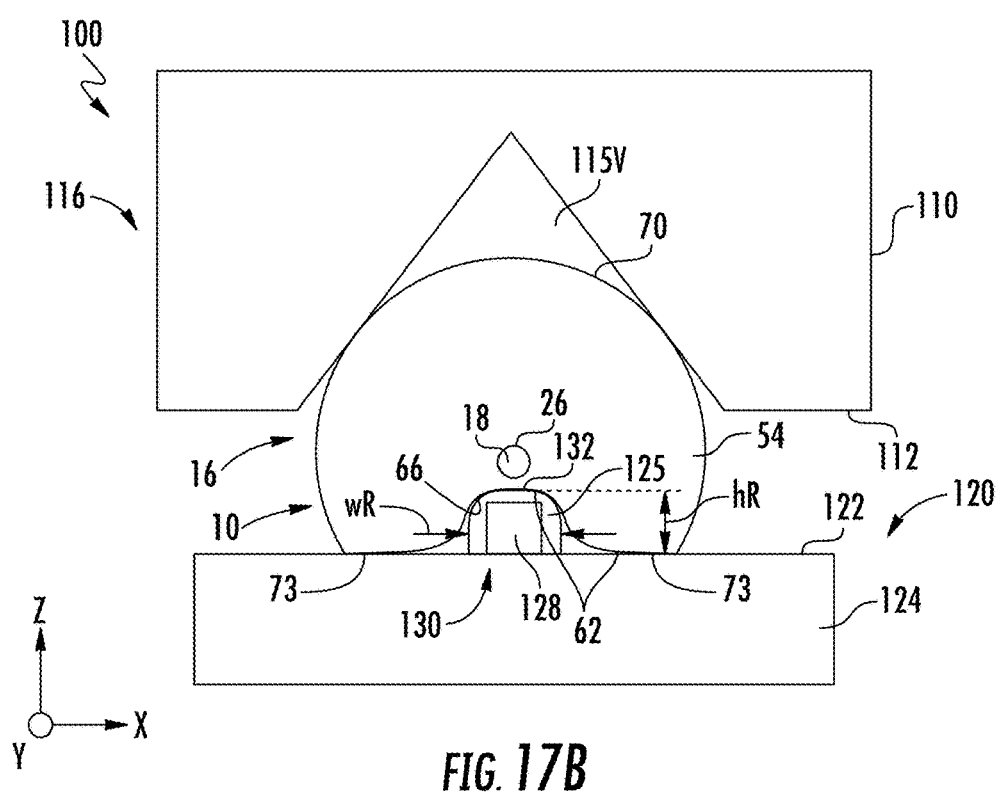
FIG. 17B is similar to FIG. 17A and shows the assembled evanescent coupler.

FIG. 17B shows the assembled evanescent coupler 100 with the ridge waveguide 130 residing within the groove 67 of the glass portion 16 so that the core 18 of the fiber is sufficiently close to the core 128 of the ridge waveguide (e.g., within the coupling distance DR) for evanescent coupling. In an example, the groove 67 can have tapered sidewalls 66 (see FIG. 17A) that facilitate guiding the ridge waveguide 130 into the groove. External alignment aids (not shown) can also be employed when operably interfacing the alignment assembly 116 with the photonic device 120.

The groove 67 in the glass portion 16 defines two bumps 73 at the glass-portion surface 62. The bumps 73 may be designed to either contact the surface 122 of the photonic device 120 or to reside just above the surface to ensure that the ridge waveguide 130 is properly situated within the groove 67 for evanescent coupling to occur between the fiber 10 and the ridge waveguide.

Figure 18A:
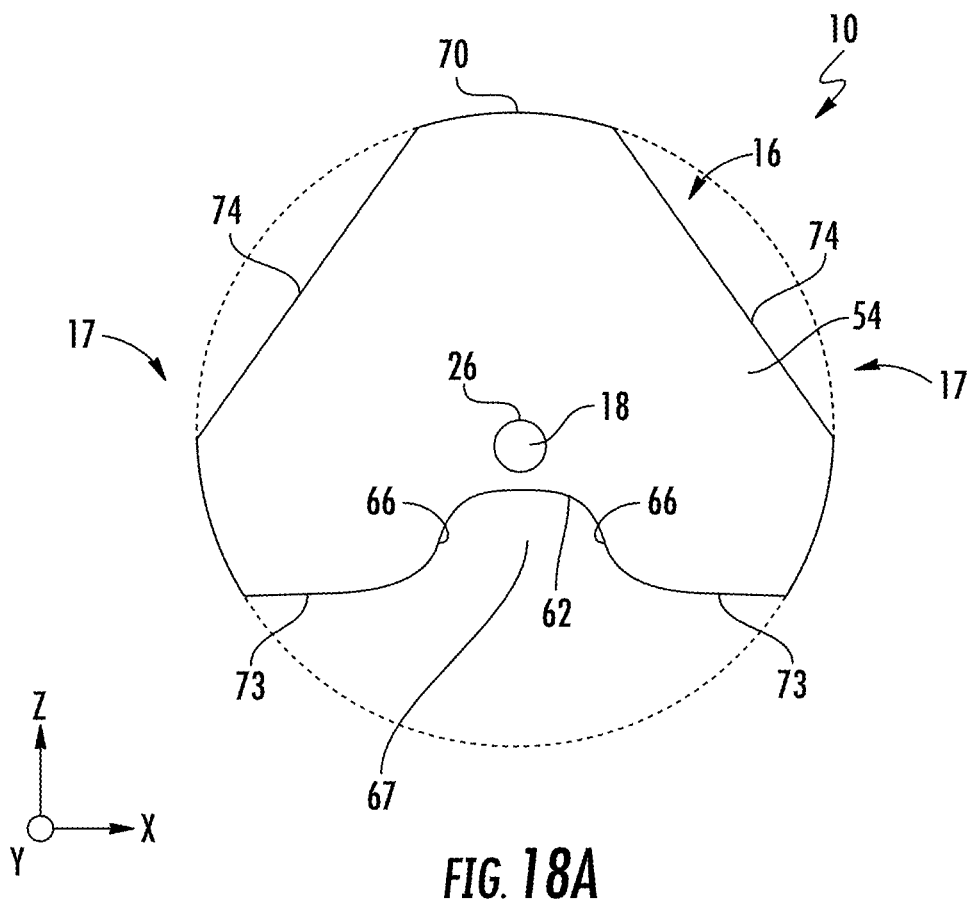
FIG. 18A is a cross-sectional view of an example fiber similar to that shown in FIG. 16B, but wherein the round portion of the outer surface now includes two flat angled sections that give the glass portion a generally triangular or V shape.

FIG. 18A is a cross-sectional view of an example fiber 10 wherein the glass portion 16 of the cladding 22 has a profile similar to that of FIG. 16B, except that the round portion of the outer surface 24 at the sides 17 now includes two flat angled sections 74 (see also FIGS. 3A and 3B) that give the glass portion 16 a generally triangular or V shape.

Figure 18B:
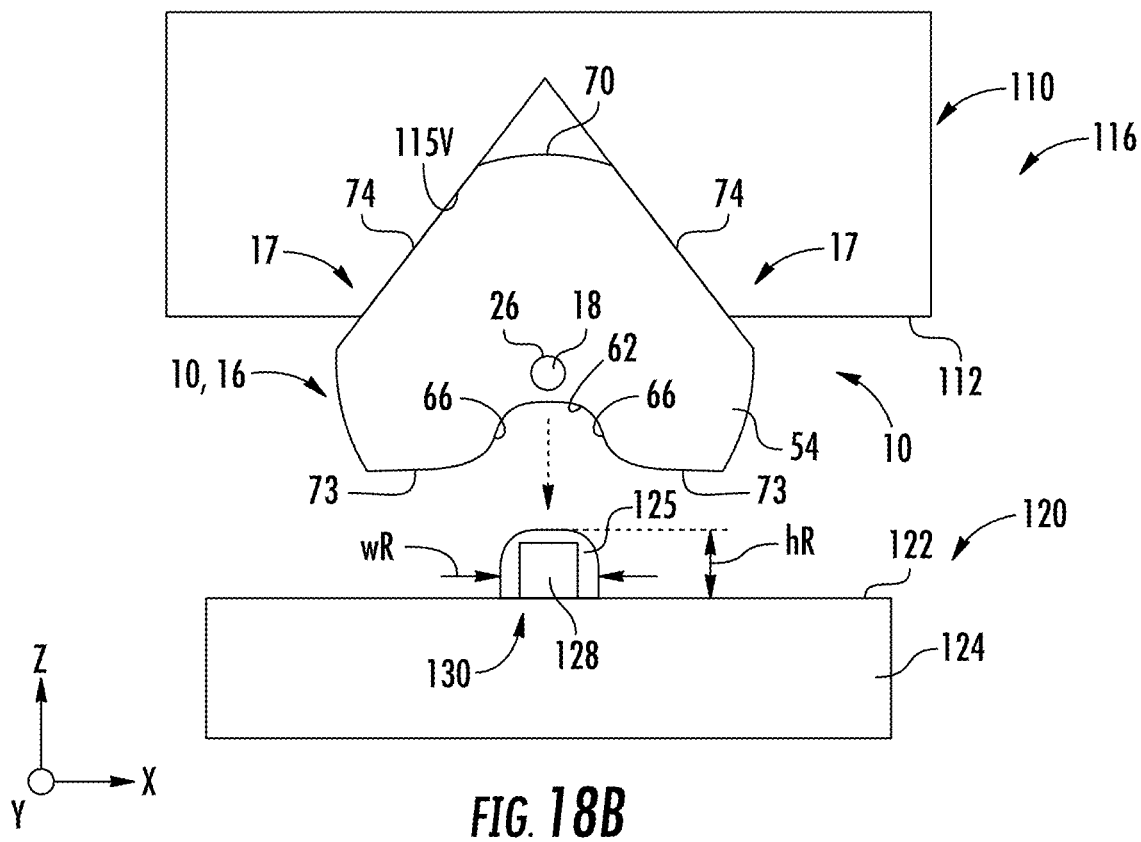
FIGS. 18B and 18C are similar to FIGS. 17A and 17B but that use the fiber of FIG. 18A.
Figure 18C:
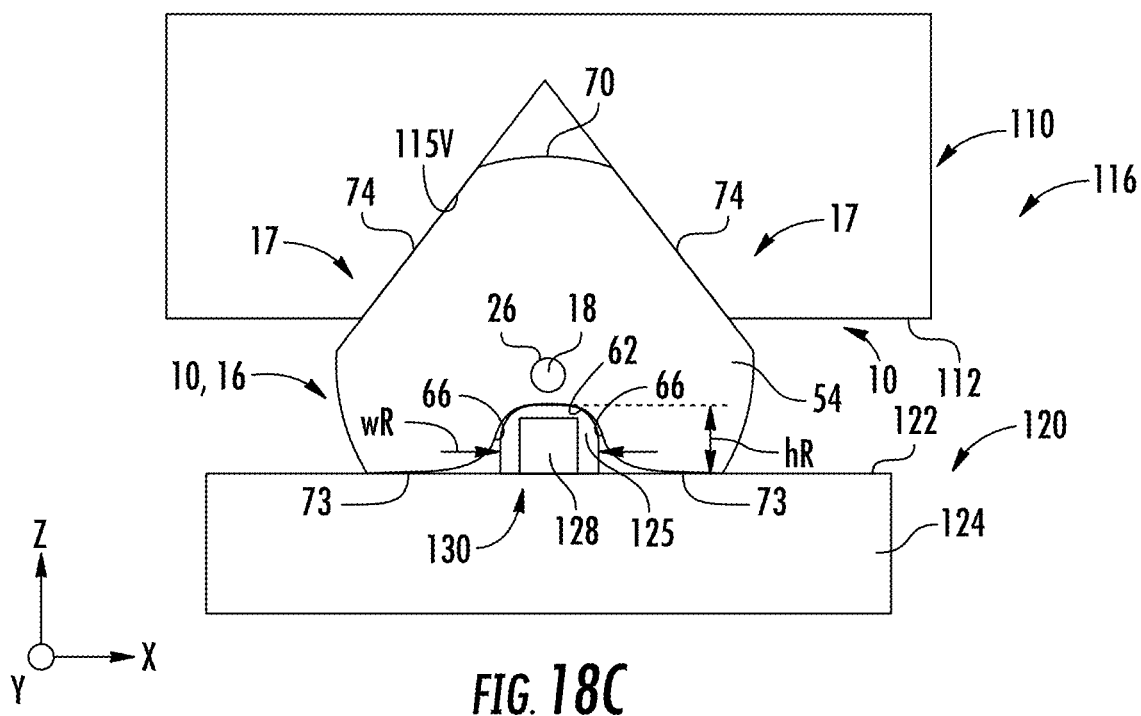

FIGS. 18B and 18C are similar to FIGS. 17A and 17B and show the glass portion 16 of the cladding 22 of the fiber 10 of FIG. 18A held by the alignment member 110 to form an example alignment assembly 116. The flat sections 80 of the glass portion 16 are configured so that the glass portion closely fits within the V-shaped alignment grooves 115V of the alignment member 110.

Cladding with Keyhole Profile

Figure 19A:
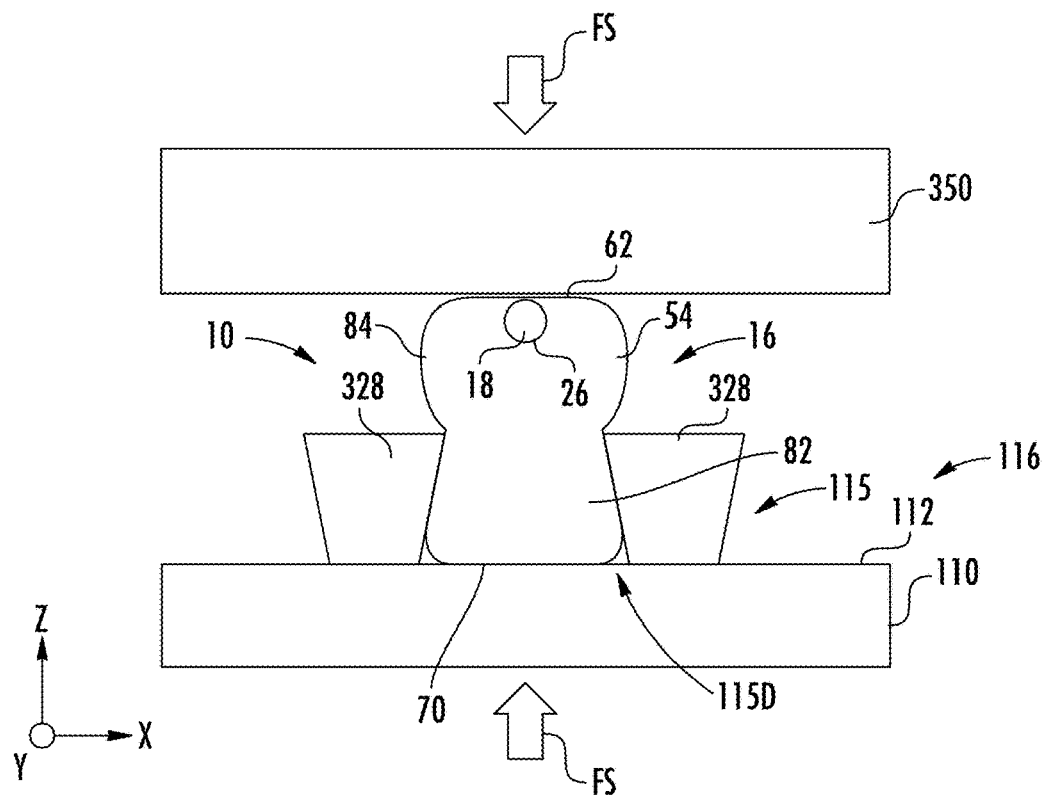
FIG. 19A shows an example fiber having a glass portion with a keyhole cross-sectional shape, and also showing an example alignment member configured to hold a bulbous section of the glass portion to form an alignment assembly.

Other profiles for the glass portion 16 of fiber 10 can be effectively employed to form an alignment assembly 116. FIG. 19A shows an example fiber 10 wherein the glass portion 16 has a keyhole cross-sectional shape with a dovetail section 82 that includes the alignment surface 70 and a bulbous section 84 that includes the glass-portion surface 62.

The alignment assembly 116 is formed by inserting the dovetail section 82 into an alignment feature 115 in the form of an alignment channel 115D that has a complementary cross-sectional shape to the dovetail section. In an example, the alignment channel 115D is defined by two generally parallel-running flexible gripping elements 328 supported on the surface 112 of the alignment member. A pressing member 350 (e.g., a glass sheet or glass member) is used to press against the flat glass-portion surface 62 to push the glass portion 16 into the alignment channel 115D to form the example alignment assembly 116.

The flexible gripping elements 328 simultaneously center the glass portion 16 and hold it down in contact with the alignment member 110. In an example, the flexible gripping elements 328 can be made of a polymer or other elastomeric material.

Figure 19B:
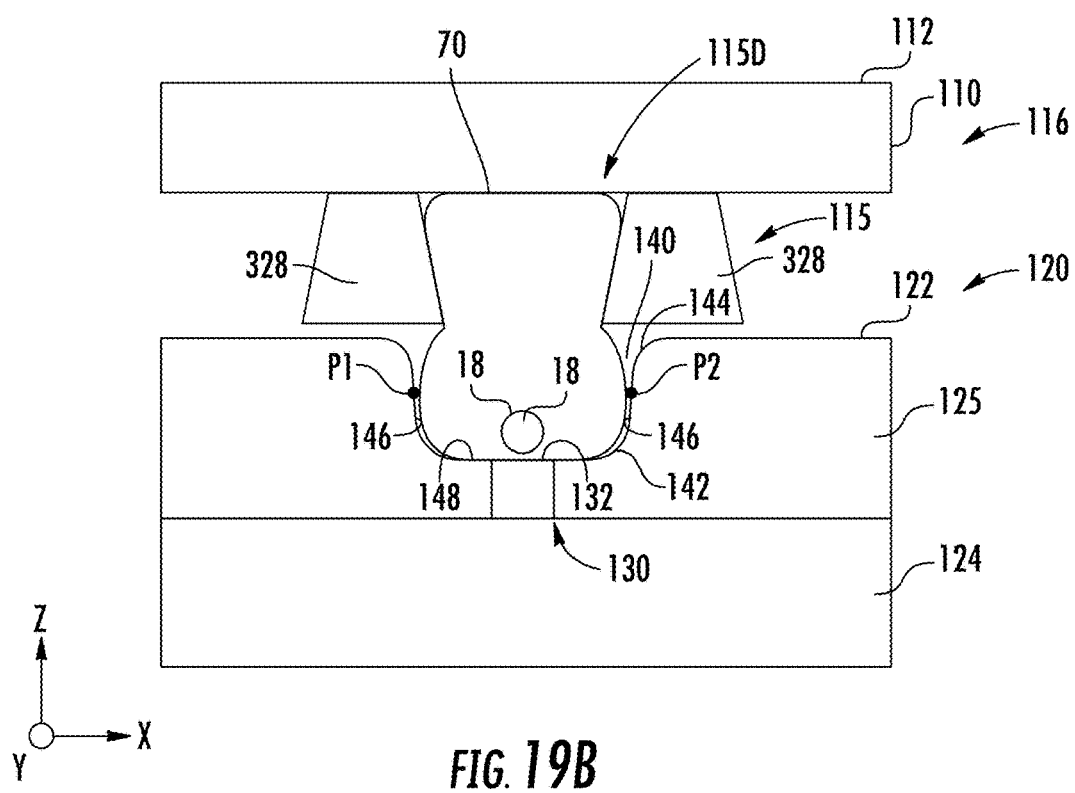
FIG. 19B shows the alignment assembly of FIG. 19A being used to operably interface the fiber with a photonic device to form an example evanescent coupler.

After the alignment assembly 116 of FIG. 19A is formed, the alignment assembly can be inverted and then operably interfaced with a photonic device 120 to form an example evanescent coupler 100, shown in FIG. 19B. The bulbous section 82 of the glass portion 16 is shown contacting the sidewalls 146 of the alignment channel 140 at the two contact points p1 and p2 while the flat glass-portion surface 62 is in contact with the bottom 148 of the alignment channel 140. This aligns the core 18 of the fiber 10 with the core 128 of the waveguide 130 of the photonic device 120. By gripping the keyhole-shaped glass portion 16 using the flexible gripping elements 328 having a relatively low elastic modulus, the keyhole-shaped glass portion 16 is free to defect laterally (left-right) while inserting the glass portion into the alignment channel 140.

It is also noted that the keyhole shaped profile of the glass portion 16 of the fiber 10 forms a tongue-and-groove type of joint with the polymeric outer cladding 58 of the cladding 22 that serves to keep these two cladding portions together for the part of the fiber 10 outside of the coupling region 30 where the inner and outer claddings 54 and 58 remain intact to define cladding 22.

Alignment Assembly with Multiple Fibers Having Keyhole Profiles

Figure 20A:
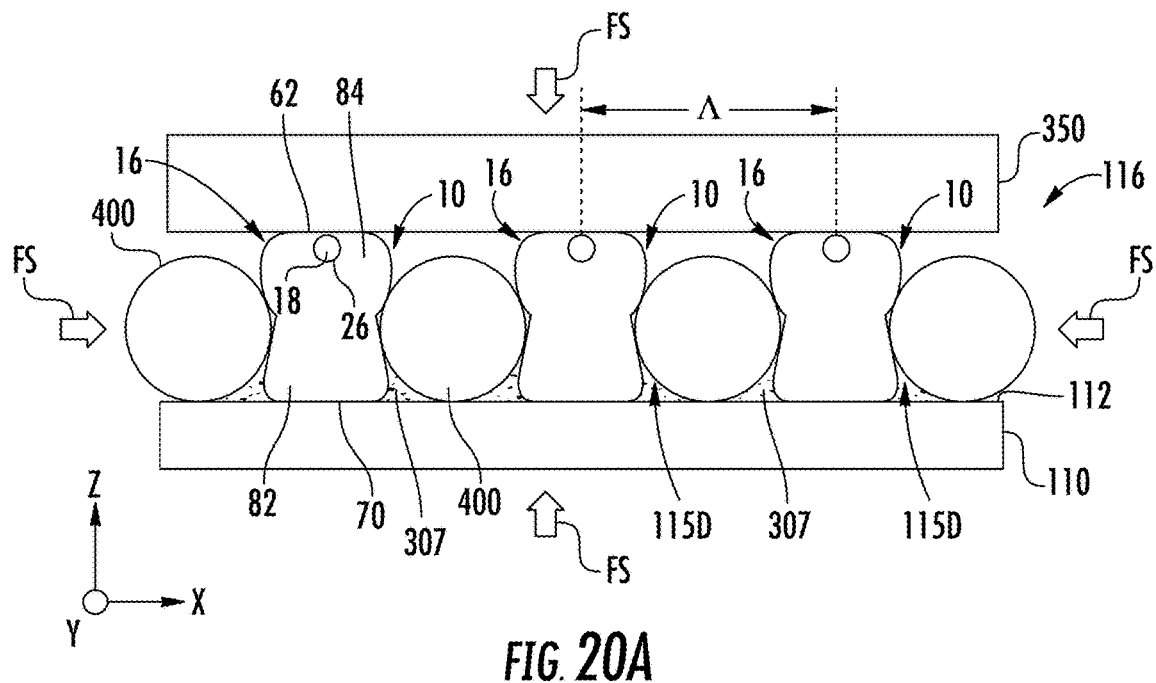
FIGS. 20A and 20B are cross-sectional views of an example alignment assembly similar to that shown in FIG. 19A but configured to support multiple fibers, with FIG. 20A showing the use of a pressing member to set the dovetail sections of the fibers with the optical fiber spacers.

FIG. 20A is similar to FIG. 19A and illustrates an example alignment assembly 116 that supports multiple fibers 10 each having a glass portion 16 with the keyhole cross-sectional shape described above. The alignment assembly 116 includes multiple spaced-apart (e.g., interdigitated) optical fibers 400 supported on surface 112 of the alignment member 110 and that serve as spacers that define spaced apart alignment channels 115D having the select period $\Lambda$. The optical fibers 400 are thus referred to hereinafter as "optical-fiber spacers." The dovetail sections 82 of the glass portions 16 of the fibers 10 reside within the alignment channels 115D, with the flat alignment surfaces 70 in contact with the surface 112 of the alignment member 110, while the flat glass-portion surface 62 face upward.

An adhesive material 307 can be used to secure the optical fiber spacers 400, the support substrate 110 and the dovetail sections 82 of the glass portions 16 to one another. Squeezing forces FS can be applied in the horizontal and vertical directions while the adhesive material 307 cures (e.g., via UV radiation). A temporary pressing member 350, such as a glass sheet, can be employed at the flat glass-portion surfaces 62 to facilitate the even application of the vertical squeezing forces and to set the dovetail sections 82 within the optical fiber spacers 400.

Figure 20B:
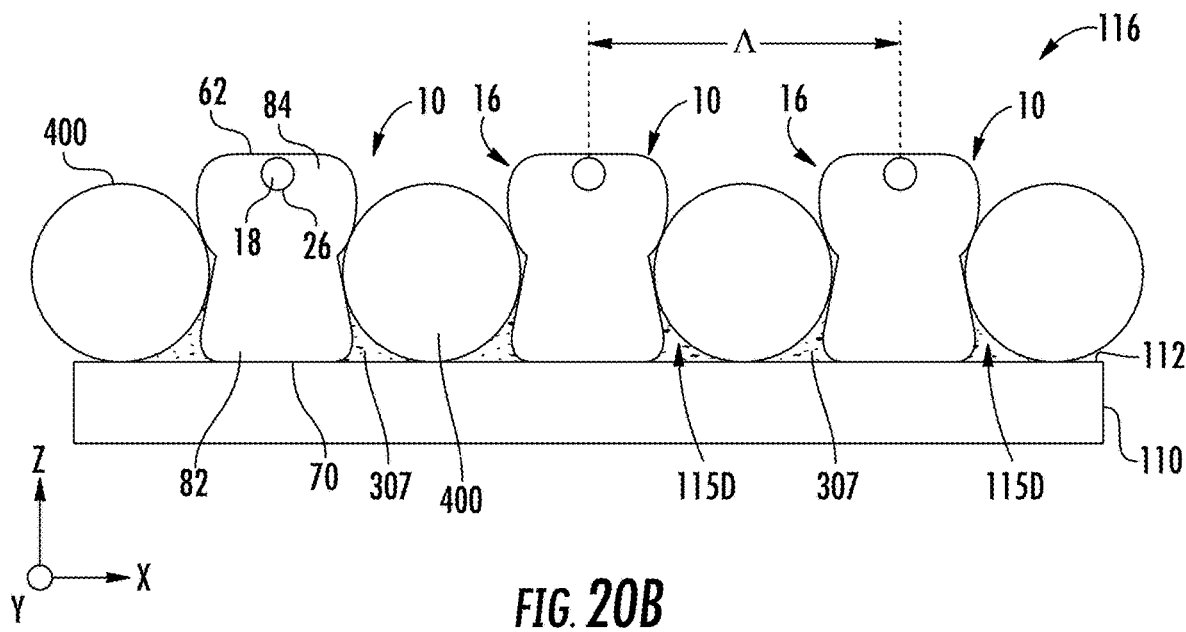

After the adhesive material 307 is cured, the temporary pressing member 350 can be removed, exposing the flat glass-portion surfaces 62 of the keyhole-shaped glass portions 16 of the fibers 10 in the alignment assembly 116, as shown in FIG. 20B. The alignment assembly 116 can then be flipped over so that the flat glass-portion surfaces 62 face downward. Since the squeeze assembly approach ensures that the glass portions 16 are arranged on the precise period $\Lambda$, the flat glass-portion surfaces 62 can be aligned to the same-period alignment channels 140 of a photonic device 120 in the manner discussed above.

Defining a Coupling Region for a Fiber Array Using Laser Processing.

U.S. patent application Ser. No. 15/405,396, which is incorporated by reference herein, discusses examples of stripping a portion of the polymer cladding 22 of the fiber 10 (e.g. some or all of the polymeric outer cladding 58) using laser processing. The discussion below is directed to improved methods of forming an alignment assembly 116 using such laser processing.

Figure 21A:
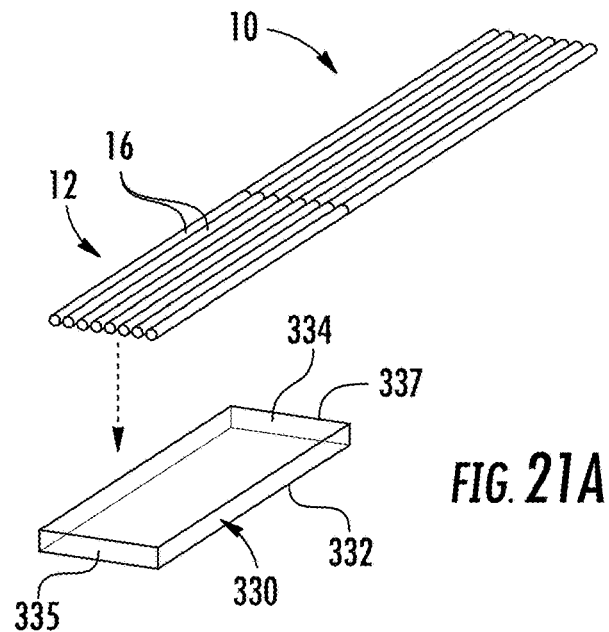
FIG. 21A is a partially exploded top-down view showing how the glass portions of an array of optical fibers are attached to a shaping member to form an example alignment assembly.
Figure 21B:
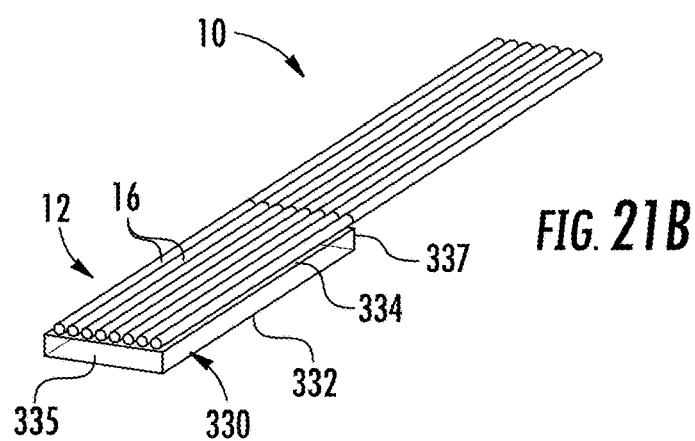
FIGS. 21B and 21C are top-down and bottom-up views, respectively, of the resulting alignment assembly of FIG. 21A.
Figure 21C:
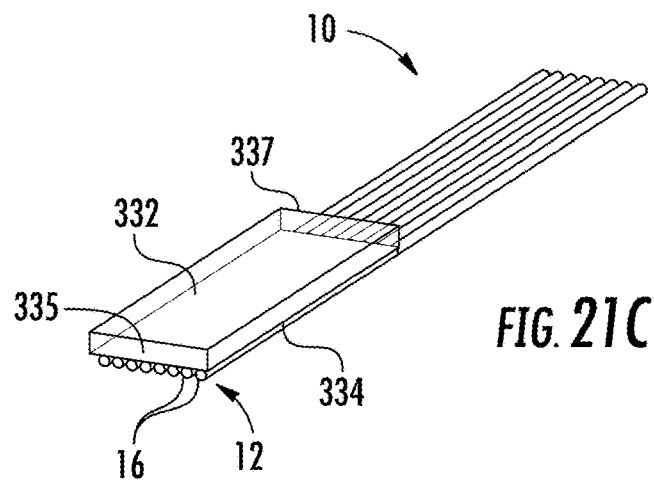

FIG. 21A is a partially exploded top-elevated view of an example array of fibers 10 each having an end section 12 where the polymeric outer cladding 58 of the cladding 22 is stripped away to reveal the glass portion 16. A shaping member 330 is shown disposed below the glass portions 16 of the fibers 10. The shaping member 330 has a top 332, a bottom 334, a front end 335 and a back end 337. The shaping member 330 can be formed from a drawn glass sheet having a desired cross-sectional shape and that is cut to the desired size. The shaping member 330 can also be formed using one or more other processes alone or in combination, such as a fusion draw process, a redraw process, a hot pressing process and a flame working process. FIGS. 21B and 21C are top and bottom elevated views of the resulting alignment assembly 116, with the glass portions 16 bonded to the bottom 335 of the shaping member 330 using an adhesive material 307.

Figure 22A:
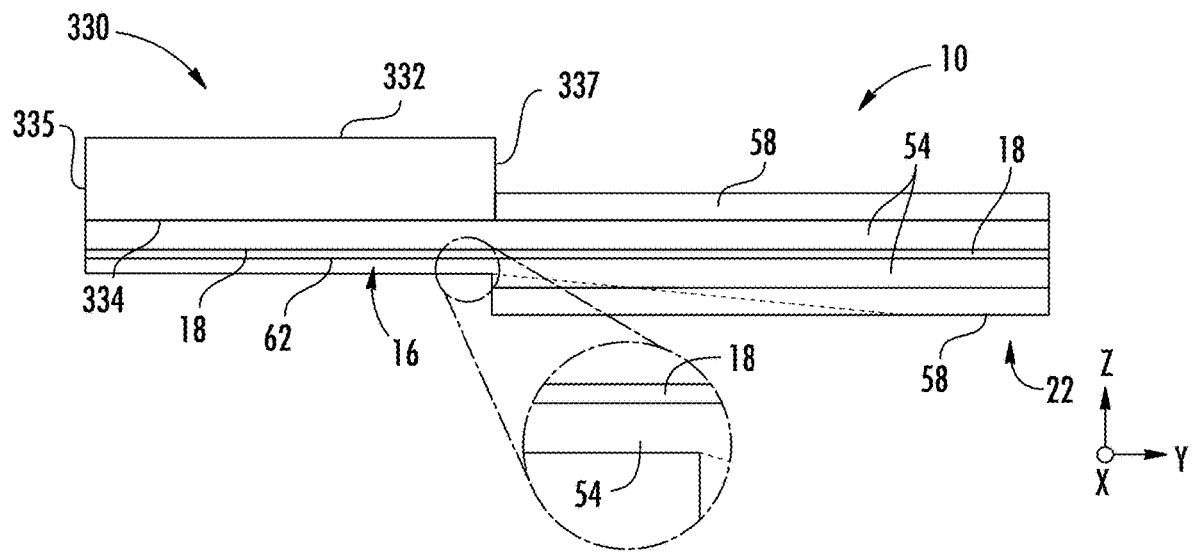
FIGS. 22A and 22B are side views of the alignment assembly shown in FIGS. 21B and 21C.
Figure 22B:
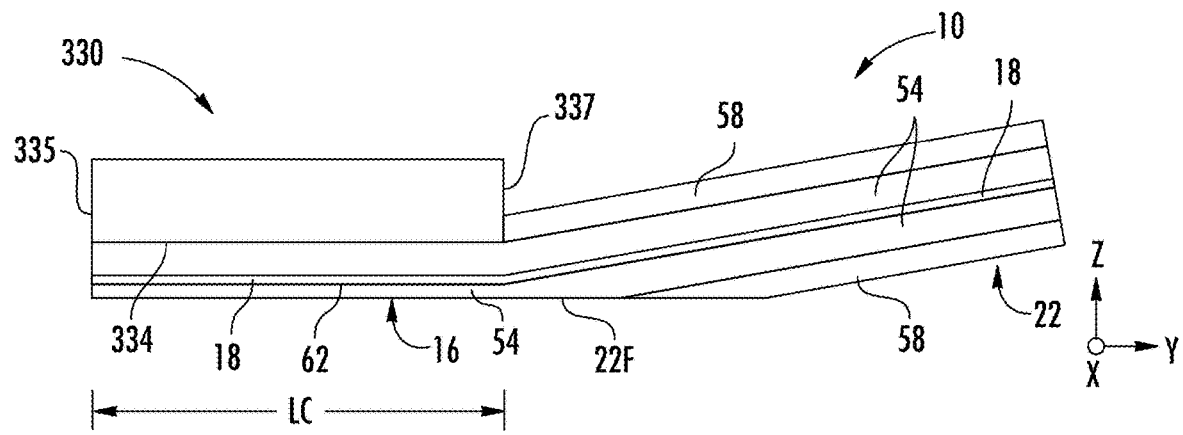

FIGS. 22A and 22B are side views of the alignment assembly 116 shown in FIGS. 21B and 21C. The end sections 12 of the fibers 10 need to be shaped so that the flat glass-portion surface 62 of the glass portion 16 can be used to establish contact with the corresponding waveguides 130 of a photonic device 120 for evanescent coupling. In some cases such as shown in FIGS. 22A and 22B, the shaping extends beyond the portion of the fiber 10 that constitutes the coupling region 30. Note that in FIGS. 22A and 22B, the end section 12 of the glass portion includes a thin portion of the glass inner cladding 54, as shown in the close-up inset of FIG. 22A.

The shaping of the end sections 12 of fibers 10 can be achieved by removing (e.g., via laser ablation) select parts of the polymeric outer cladding 58 of the cladding 22 that resides adjacent the back end 337 of the shaping member 330, as shown by the dashed line in FIG. 22A. This allows for the fiber 10 to be bent as shown in FIG. 22B so that the flat glass-portion surface 62 can reside in the x-y plane over the coupling length LC to define the coupling region 30. The bending process also defines a flat cladding section 22F that resides immediately adjacent and in the same plane as flat-glass portion 62 associated with the coupling region 30.

Figure 23A:
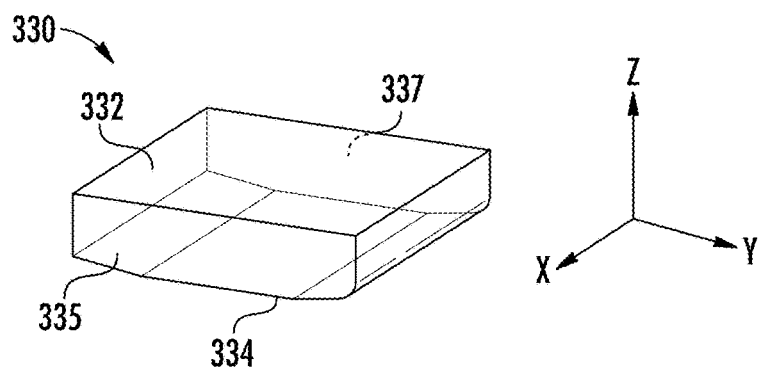
FIG. 23A is an elevated view of an example of a curved shaping member.

FIG. 23A is an elevated view of an example shaping member 330 that has a curved bottom 334 that gives the shaping member a curved y-z cross-sectional shape. The curved bottom 334 is bonded with the glass portions 16 of the fibers 10 so that after bonding, the glass portions 16 conform to the curved bottom of the shaping member 330 to define an axially extending section of the flat glass-portion surface 62 of the glass portion 16 that serves to define the coupling region 30.

Figure 23B:
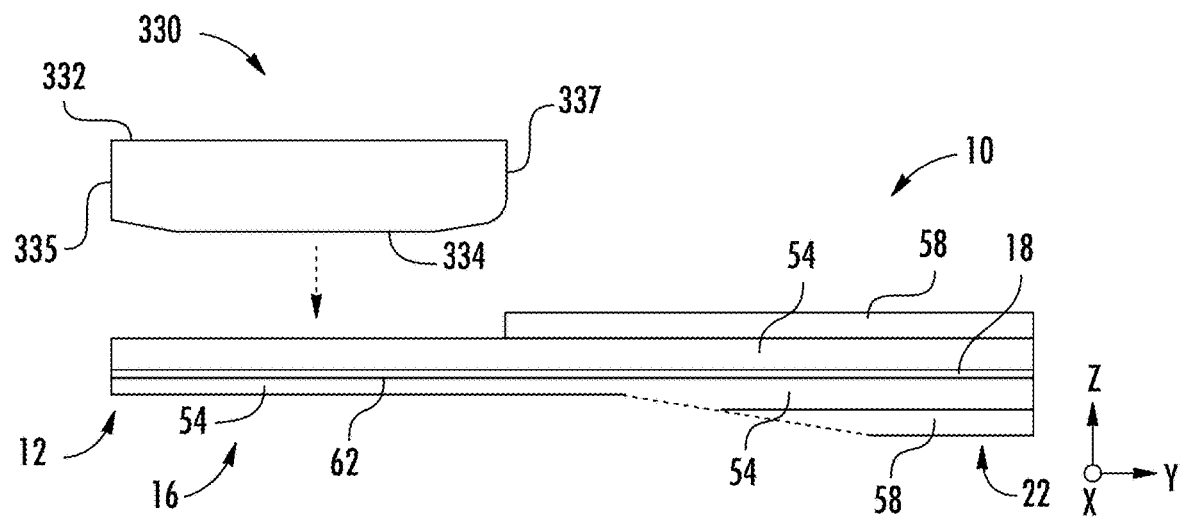
FIGS. 23B and 23C are similar to FIGS. 22A and 22B but show the use of the curved shaping member in forming the alignment assembly.
Figure 23C:
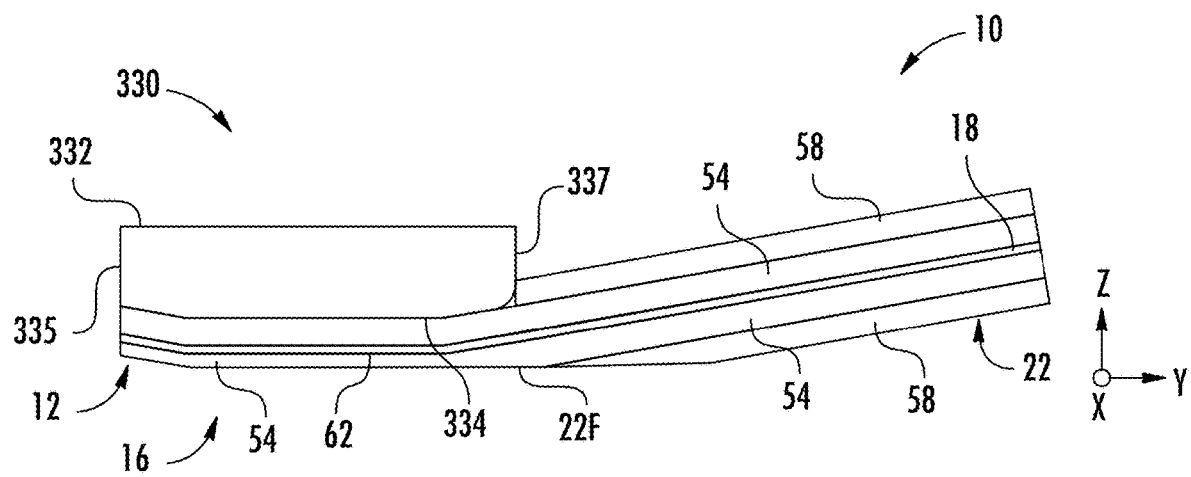

The curved bottom 334 of the shaping member 330 helps minimize local stresses where glass portion 16 is bent. The shaping member 330 can be extended in size so that it supports the unstripped fiber 10. Application of the adhesive material 307 at and near the bend in the glass portions 16 at the back end 337 of the shaping member 330 can be used to further reduce local bend stresses. FIGS. 23B and 23C are similar to FIGS. 22A and 22B but show the use of the curved shaping member 330.

Figure 24A:
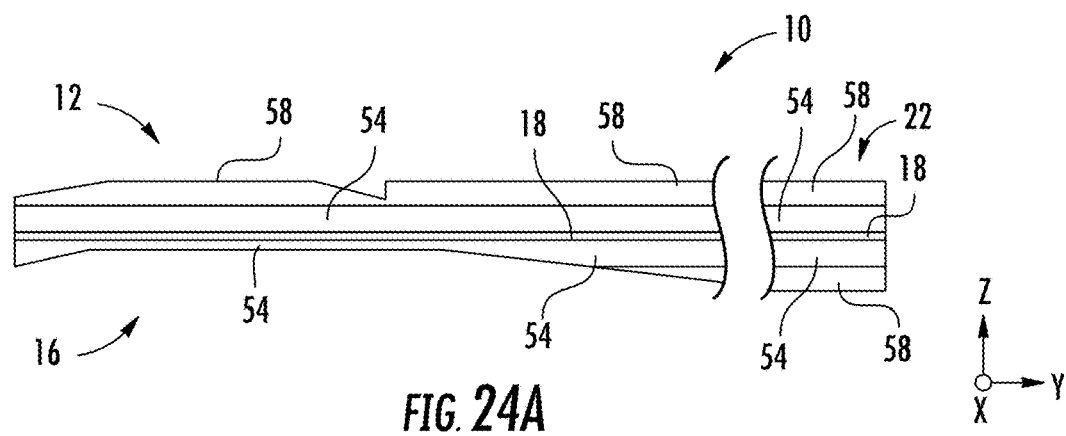
FIGS. 24A through 24C are cross-sectional views of the end section of an example fiber showing how the cladding can be processed to form an alignment assembly using the shaping member and a shaping jig.
Figure 24B:
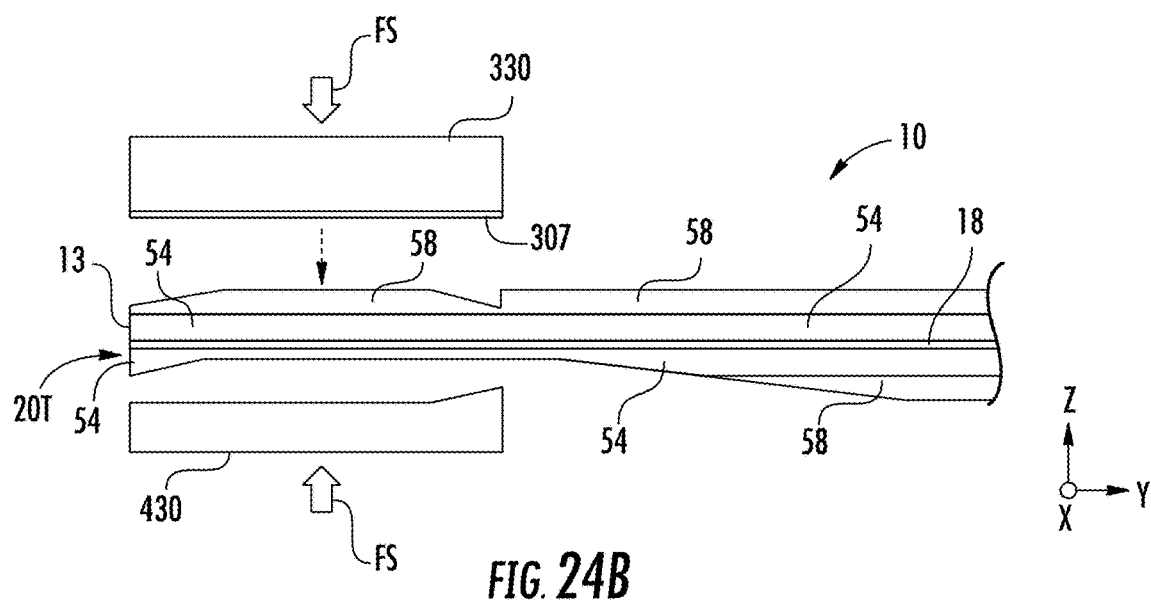

FIG. 24A is a cross-sectional view of the end section 12 of an example fiber 10 wherein the cladding 22 has been processed using a laser beam to create a select cladding profile amenable for shaping the end section 12 of the fiber. FIG. 24B shows the processed cladding 22 of the fiber 10 disposed between the shaping member 330 and a shaping jig 430 as part of a shaping process for the end section 12 of the fiber 10. The bottom 334 of the support substrate 330 is flat and includes a layer of adhesive material 307. The select cladding profile is such that when a squeezing force FS is applied to the shaping member 330 and the shaping jig 430, the glass portion 16 bends so that the top part of the cladding 22 conforms to the flat bottom 334 of the shaping member 330. The layer of adhesive material 307 maintains the conformal shape, allowing for the shaping jig 430 to be removed. In an example, the layer of adhesive material 307 can comprise a UV-curable adhesive, and the process can include irradiation of the UV-curable adhesive with UV light.

Figure 24C:
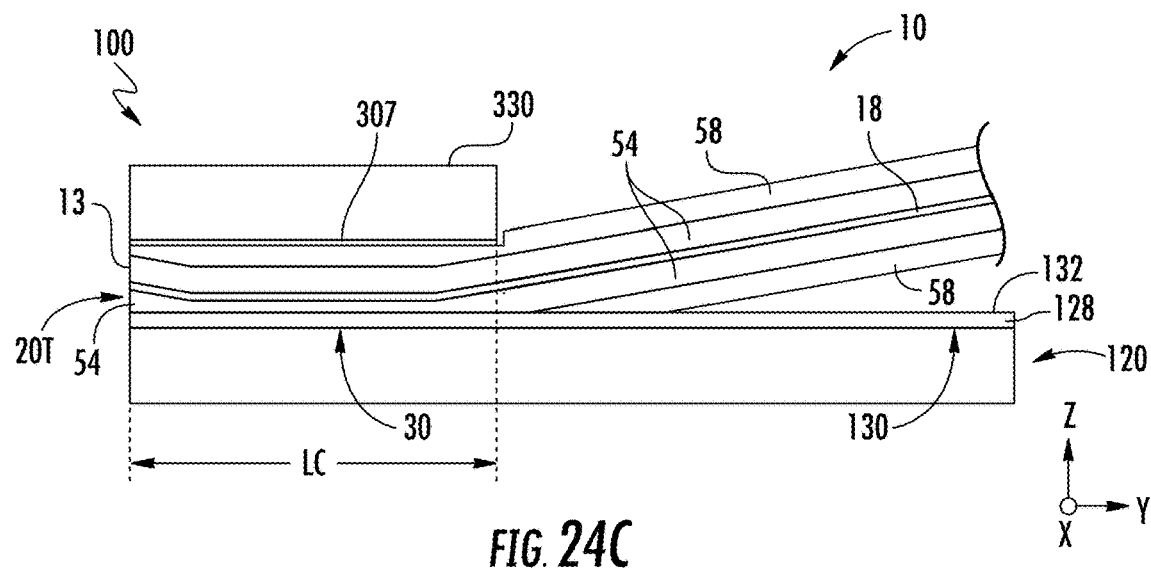

The result of the shaping process is shown in FIG. 24C, wherein the end section 12 of the fiber 10 takes on a U-shaped profile. An axial section of the flat glass-portion surface 62 has the coupling length LC and defines the coupling region 30 when the fiber 10 is operably arranged relative to the waveguide 130 of the photonic device 120 when forming the evanescent coupler 100.

Note that in the example of FIG. 24C, each fiber 10 includes adjacent the fiber tip 13 a triangular shaped piece 20T of the polymeric outer cladding 58 of cladding 22. This triangular shaped piece 20T of the polymeric outer cladding 58 serves as a bumper after the end sections 12 of the fibers 10 are bonded to the shaping member 330. The bumper 20T serves as small elastic feature that can limit the leftward travel of the fibers 10 during alignment with the waveguides 130 of the photonic device 120.

Figure 25A:
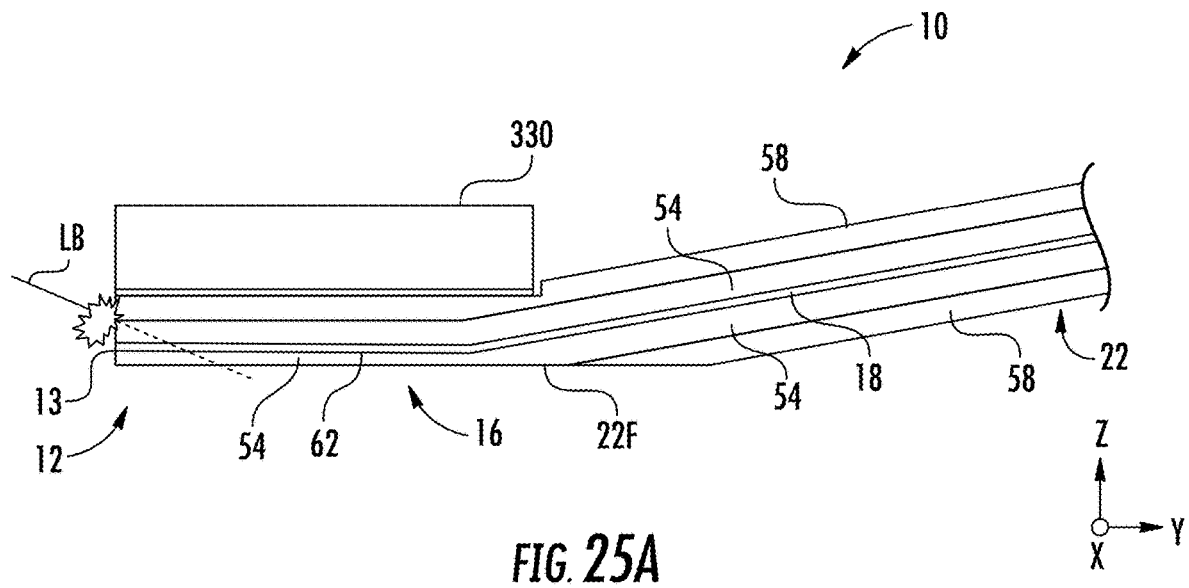
FIGS. 25A and 25B are cross-sectional views of an example alignment assembly that uses a shaping member and illustrating how laser processing can be used to shape the end section of the fiber to form an angled tip.
Figure 25B:
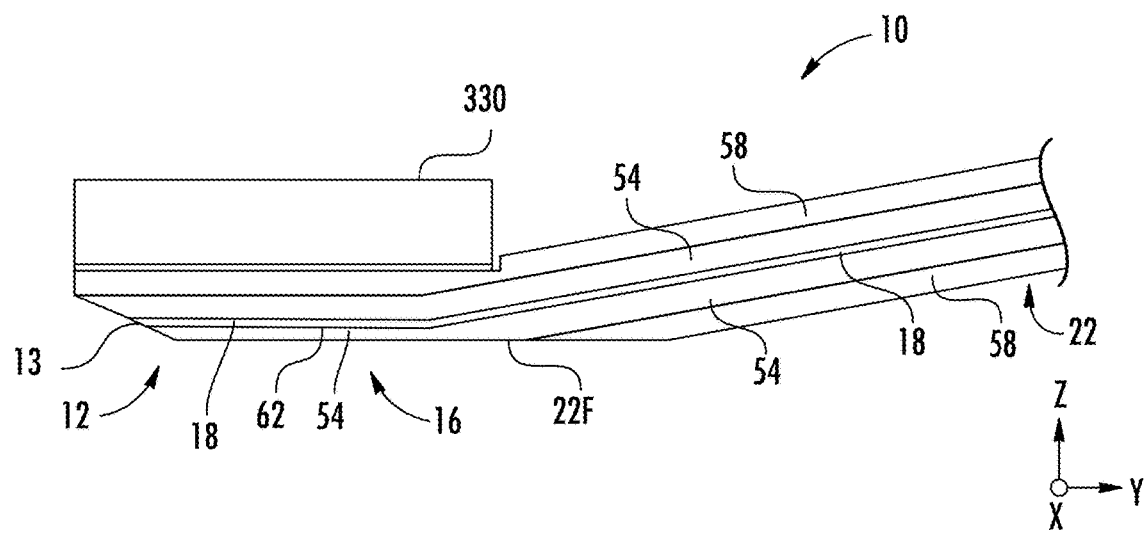

FIGS. 25A and 25B are similar to FIG. 24C and show an example wherein the front end section 12 of the fiber 10 is processed (e.g., laser processed with a laser beam LB or polished) to form an angled tip 13 at the front end section 12. This process can also be used to define or control the coupling length LC of axially extending glass-portion surface 62 that defines the coupling region 30.

Figure 26:
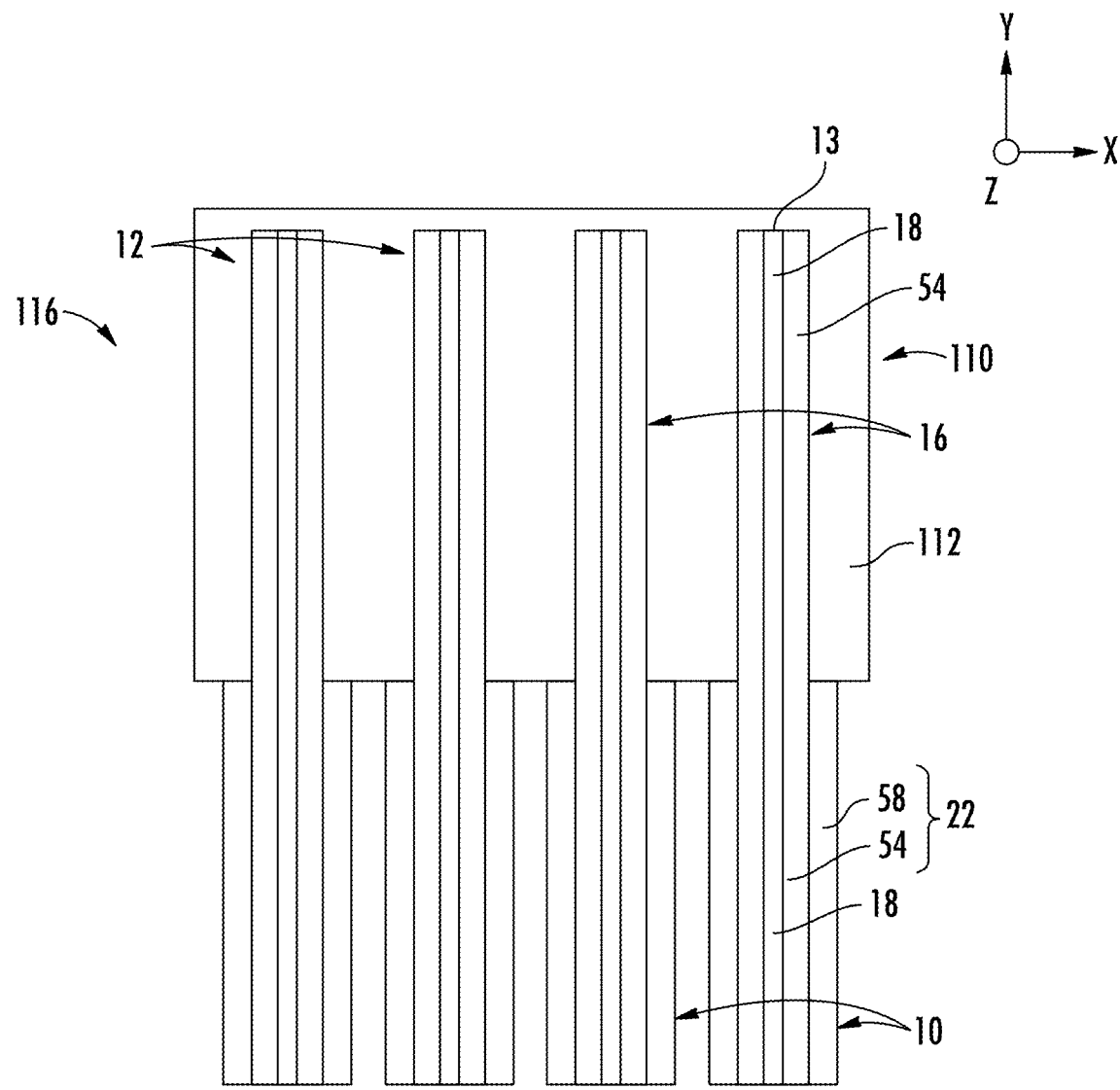
FIG. 26 is a top down view of an example alignment assembly that shows the glass portions of four fibers supported on the top of an example alignment member.

FIG. 26 is a top down view of an example alignment assembly 116 that shows the glass portions 16 of four fibers 10 supported on the top 112 of an example alignment member 110. In an example, the alignment member 110 is made of a transparent material such as glass. The polymeric outer claddings 58 of the claddings 22 of each fiber 10 have been processed as described above so that the axially extending flat glass-portion surface 62 has a desired coupling length LC.

Figure 27A:
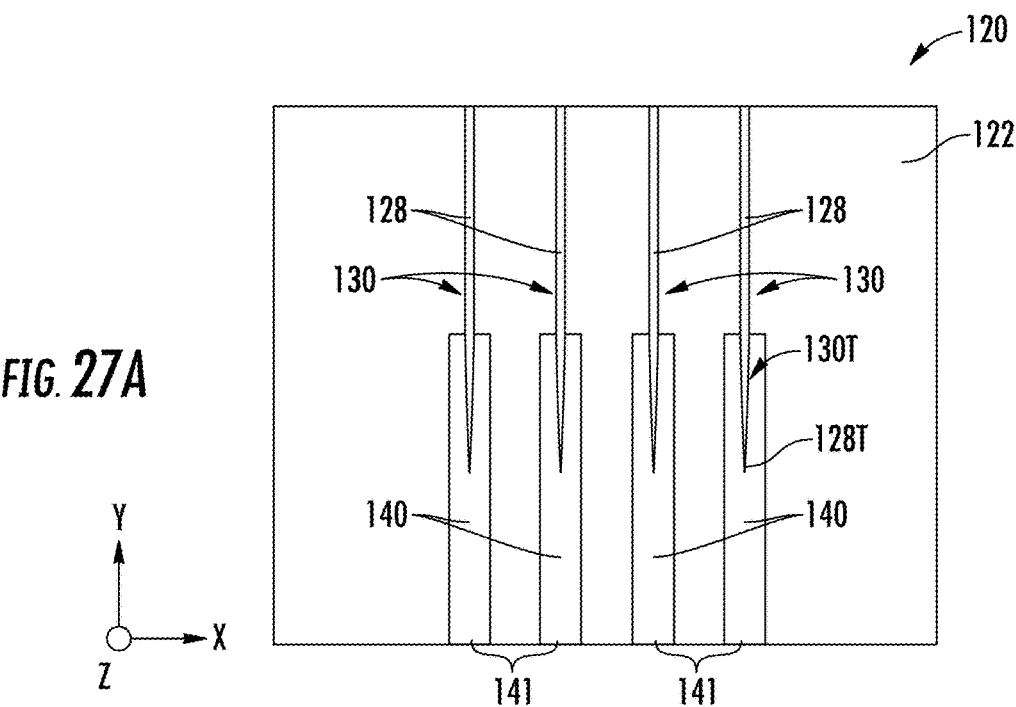
FIG. 27A is a plan view of an example photonic device having four cores that define planer waveguides, wherein the cores are terminated by respective tapered ends that define tapered waveguide portions that extend into the alignment channels of the photonic device 120.

FIG. 27A is a plan view of an example photonic device 120 having four cores 128 that define planer waveguides 130, wherein the cores are terminated by respective tapered ends 128T that define a tapered waveguide portions 130T of waveguides 130. The tapered waveguide portions 130T extend into the alignment channels 140 of the photonic device 120, with the tapered cores 128T residing at or proximate to the bottoms 148 of the alignment channels. The tapered waveguide portions 130T define the coupling regions 30 for the resulting evanescent coupler 100 as described below.

Figure 27B:
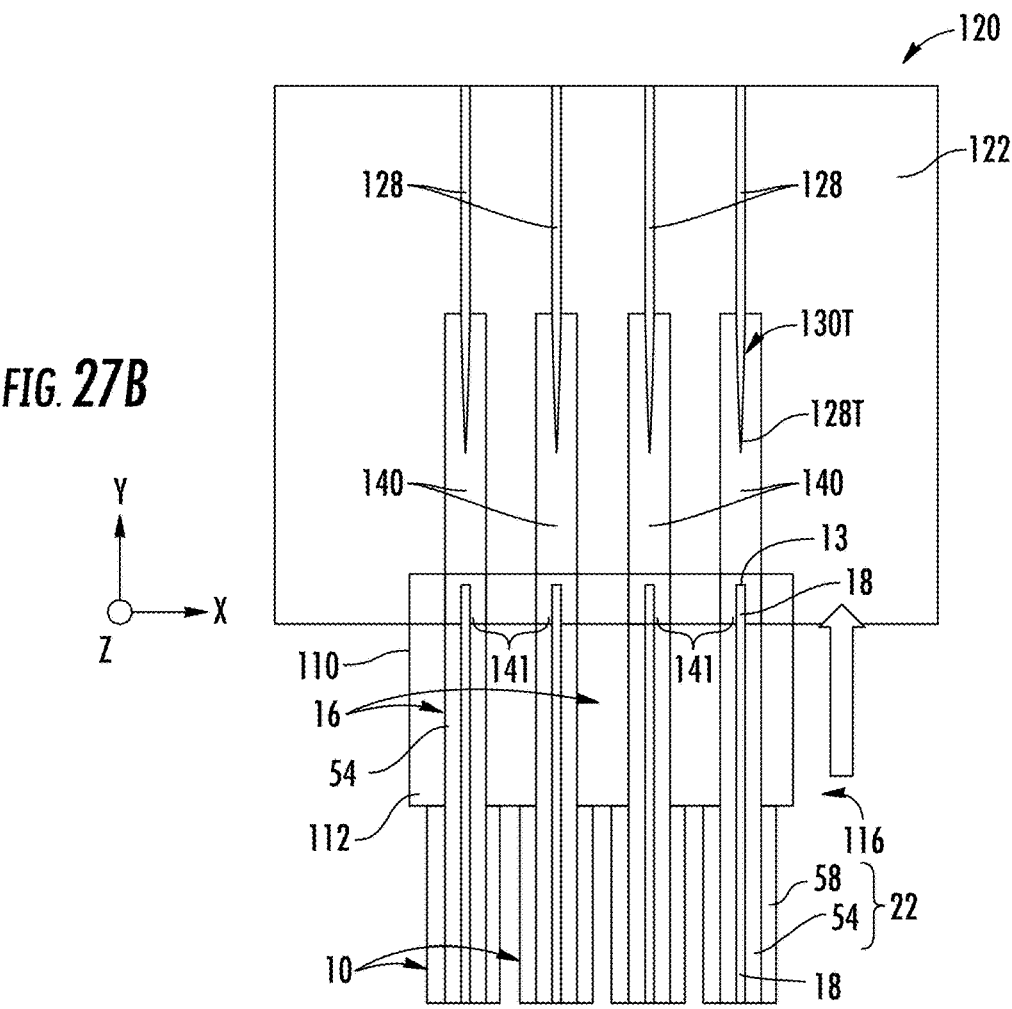
FIG. 27B shows the alignment assembly of FIG. 26 in position to be interfaced with the photonic device of FIG. 27A.
Figure 27C:
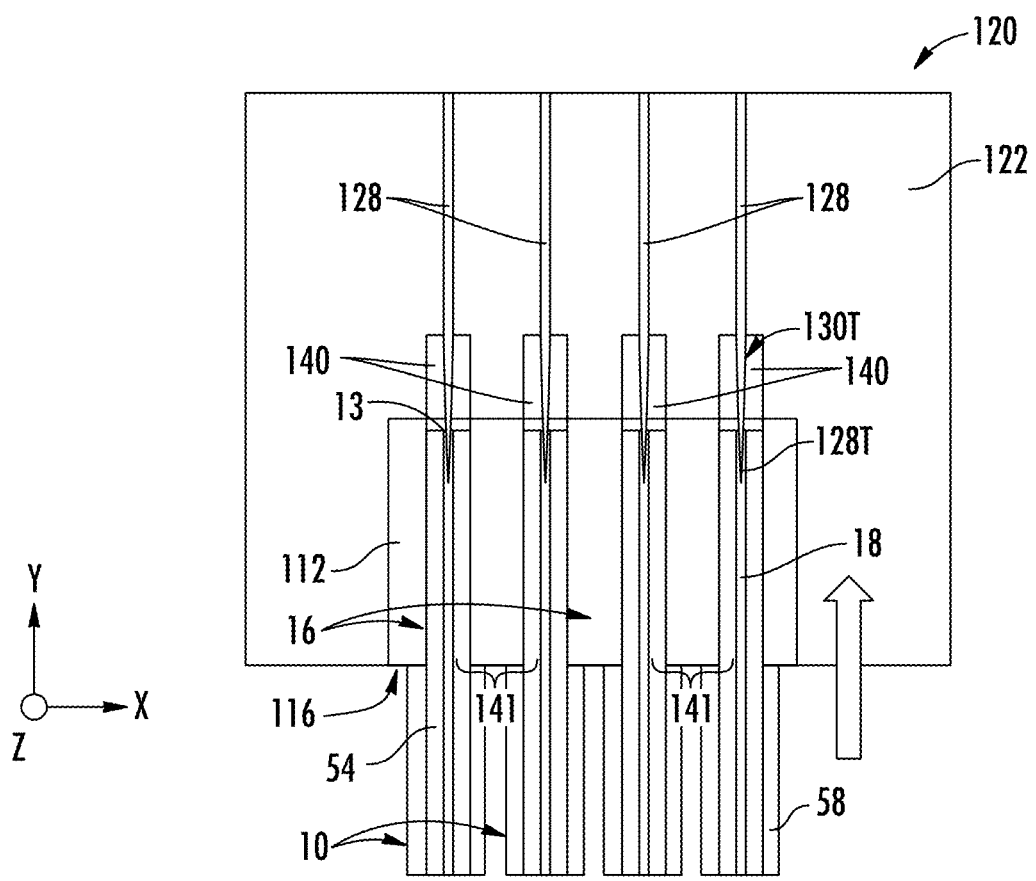
FIG. 27C shows the alignment assembly in operable position with the photonic device to form the evanescent coupler.

FIG. 27B shows the alignment assembly 116 in position to be interfaced with the photonic device 120. The alignment channels 140 have open ends 141 into which the glass portions 16 of the fibers 10 are respectively inserted. FIG. 27C shows the alignment assembly 116 in operable position with the photonic device 120 to form the evanescent coupler 100. The cores 18 of the fibers 10 are aligned with and in close proximity to the tapered waveguide portions 130T so that evanescent coupling can occur between each fiber and the corresponding tapered waveguide portion of the waveguide 130.

Figure 28A:
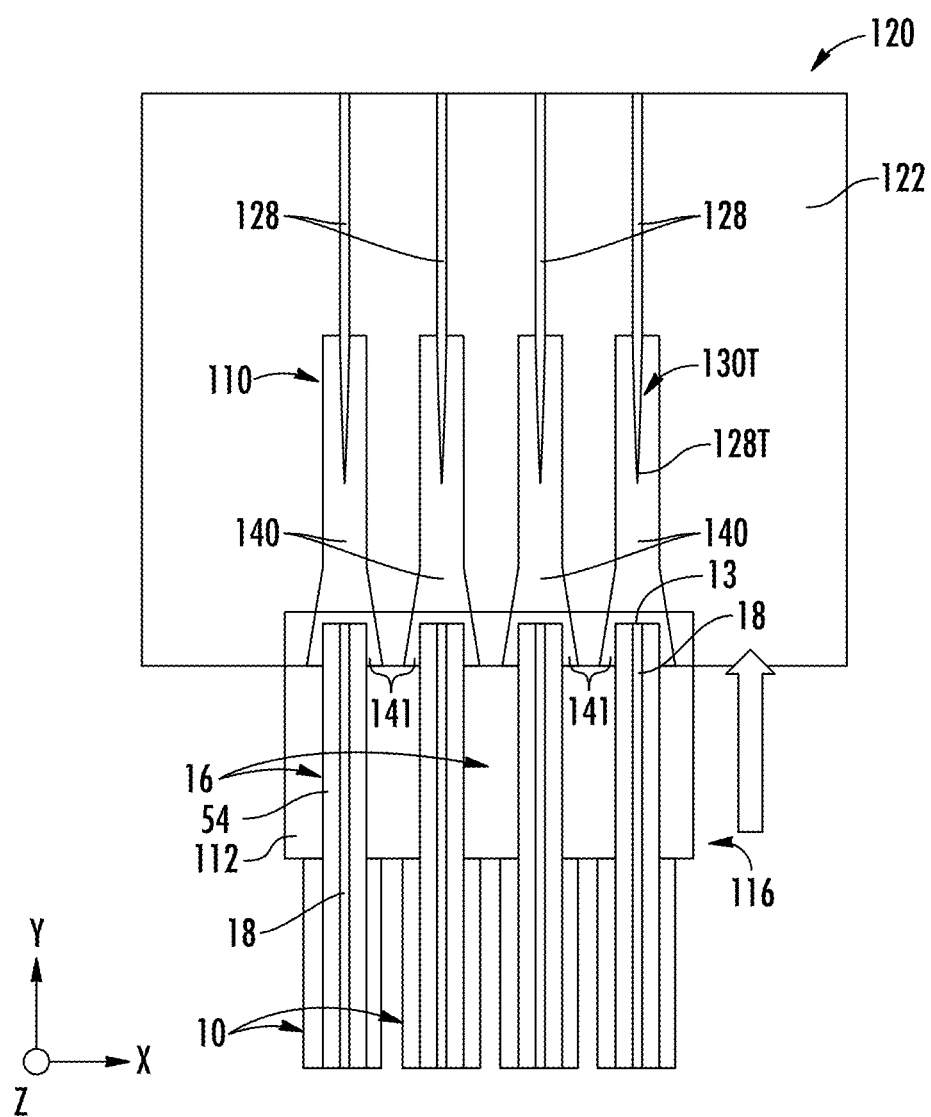
FIG. 28A is similar to FIG. 27B and shows an example wherein the alignment channels of the photonic device have flared open ends to facilitate inserting the glass portions of the fibers into the corresponding alignment channels.
Figure 28B:
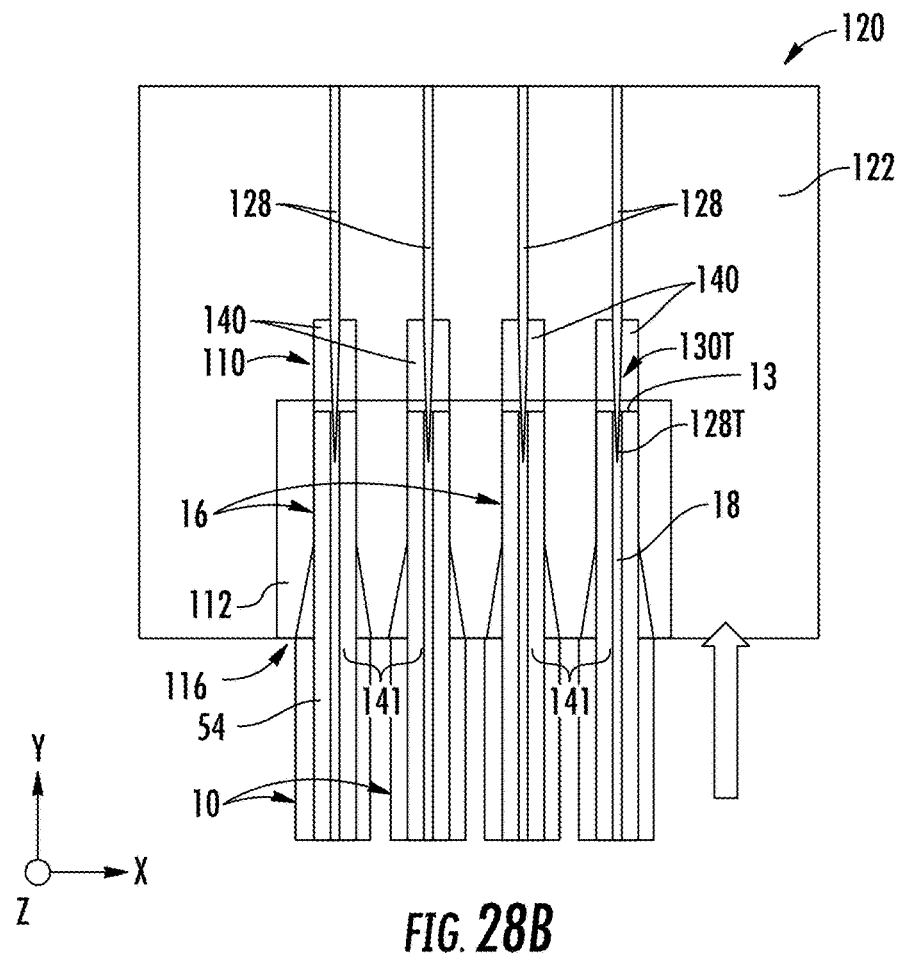
FIG. 28B shows the glass portions fully inserted into the corresponding alignment channels to form the evanescent coupler.

FIG. 28A is similar to FIG. 27B and shows an example wherein the alignment channels 140 of the photonic device 120 have flared open ends 141 to facilitate inserting the glass portions 16 of the fibers 10 into the corresponding alignment channels by allowing for a degree of lateral misalignment during the initial insertion. For example, if the glass portion 16 has a diameter of 30 µm, the lateral misalignment tolerance may be as large as ±50-100 µm using the flared ends 141 of the alignment channels 140. FIG. 28B shows the glass portions 16 fully inserted into the corresponding alignment channels 140 to form the evanescent coupler 100.

Figure 29A:
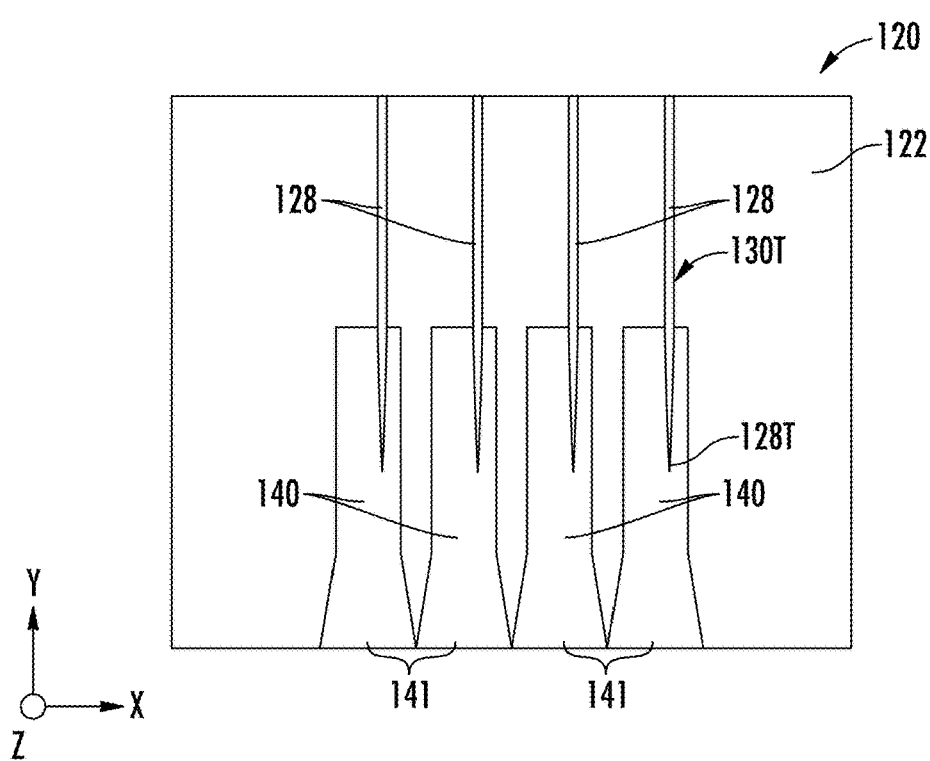
FIG. 29A is similar to FIG. 27A and illustrates an embodiment wherein the alignment channels include flared open ends sized so that only one sidewall of the alignment channel serves as a precision reference (alignment) surface.

FIG. 29A is similar to FIG. 27A and illustrates an embodiment wherein the alignment channels 140 include flared open ends 141 and are also made excessively wide (i.e., wider than the glass portion 16 of the fiber 10) and also with the waveguide cores 128 offset from the center of the channels so that only one sidewall 146 of the alignment channel serves as a precision reference (alignment) surface. This approach enables different motion paths for the alignment assembly 116 relative to the photonic device 120 when interfacing the alignment with the photonic device to form the evanescent coupler 100.

Figure 29B:
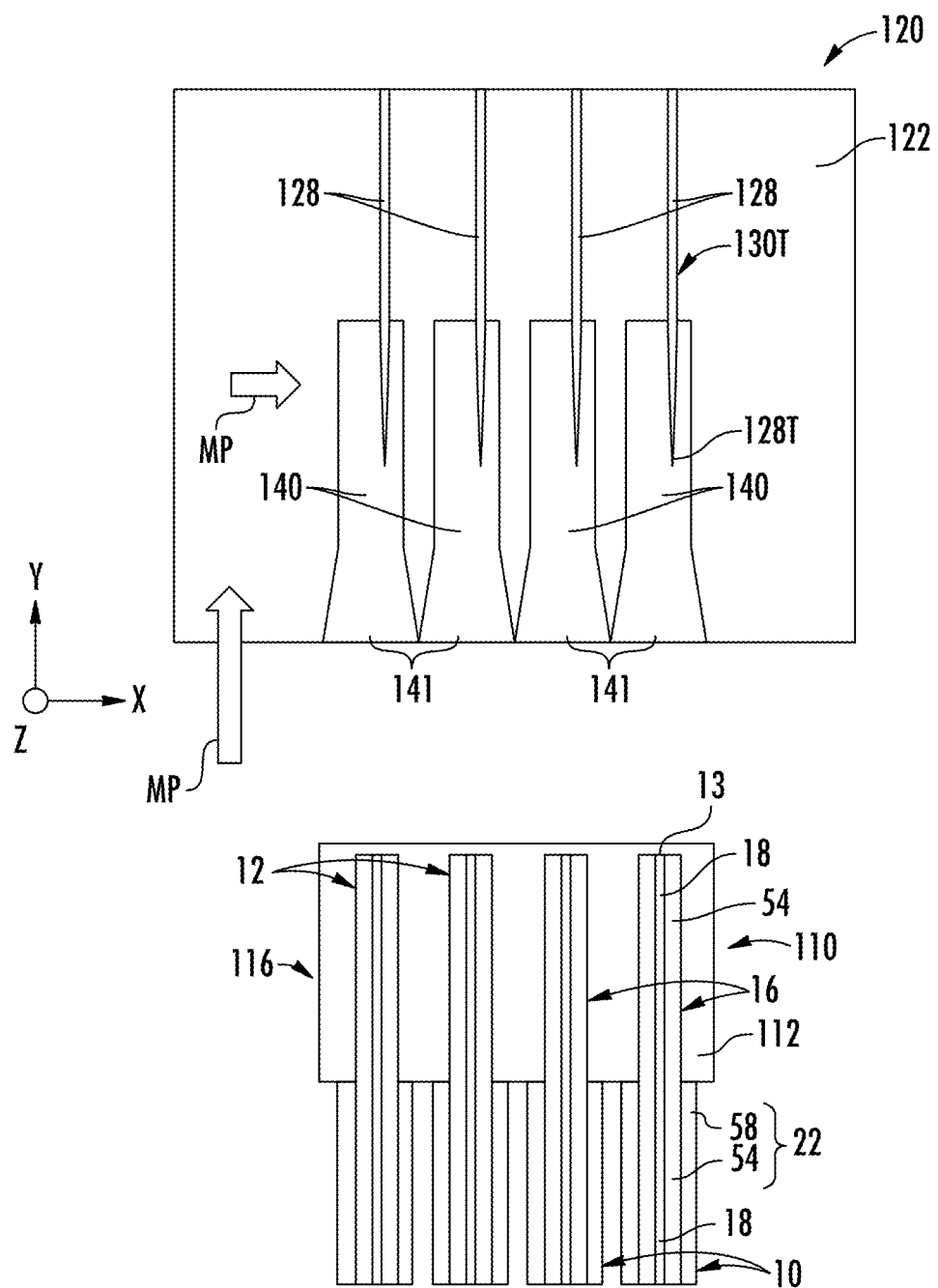
FIGS. 29B through 29D illustrate three different example motion paths for interfacing the alignment assembly with the photonic device to form an evanescent coupler.

With reference now to FIG. 29B, a first example of a motion path MP includes a first movement of the alignment assembly 116 in an axial direction that positions the glass portions 16 adjacent the leftmost sidewalls 146 of the alignment channels 140. The motion path also includes a second movement of the alignment assembly 116 in the +x (lateral) direction, which forces the glass portions 16 into the opposite sidewalls 146 of the alignment channels 140 to cause alignment of the cores 18 of the fibers 10 with the tapered cores 128T of the tapered waveguide portions 130T of the waveguides 130. An advantage of this approach is that it does not tightly constrain the glass portions 16 within the alignment channels 140 during the insertion process, thereby reducing the potential for scratching and damaging one or both of the glass portions and the sidewalls 146. It also relaxes angular alignment tolerances for the portions 16 relative to the alignment channels 140, since the glass portions are angularly aligned to the sidewalls 146 of the alignment channels 140 during the second (lateral) motion. The configuration may also reduce the likelihood of debris being trapped between the glass portions 16 and the sidewalls 146 of the alignment channels 140 since the motion of the glass portions during the insertion and alignment process provides a sweeping motion that may move debris away from critical reference surfaces prior to contact.

Figure 29C:
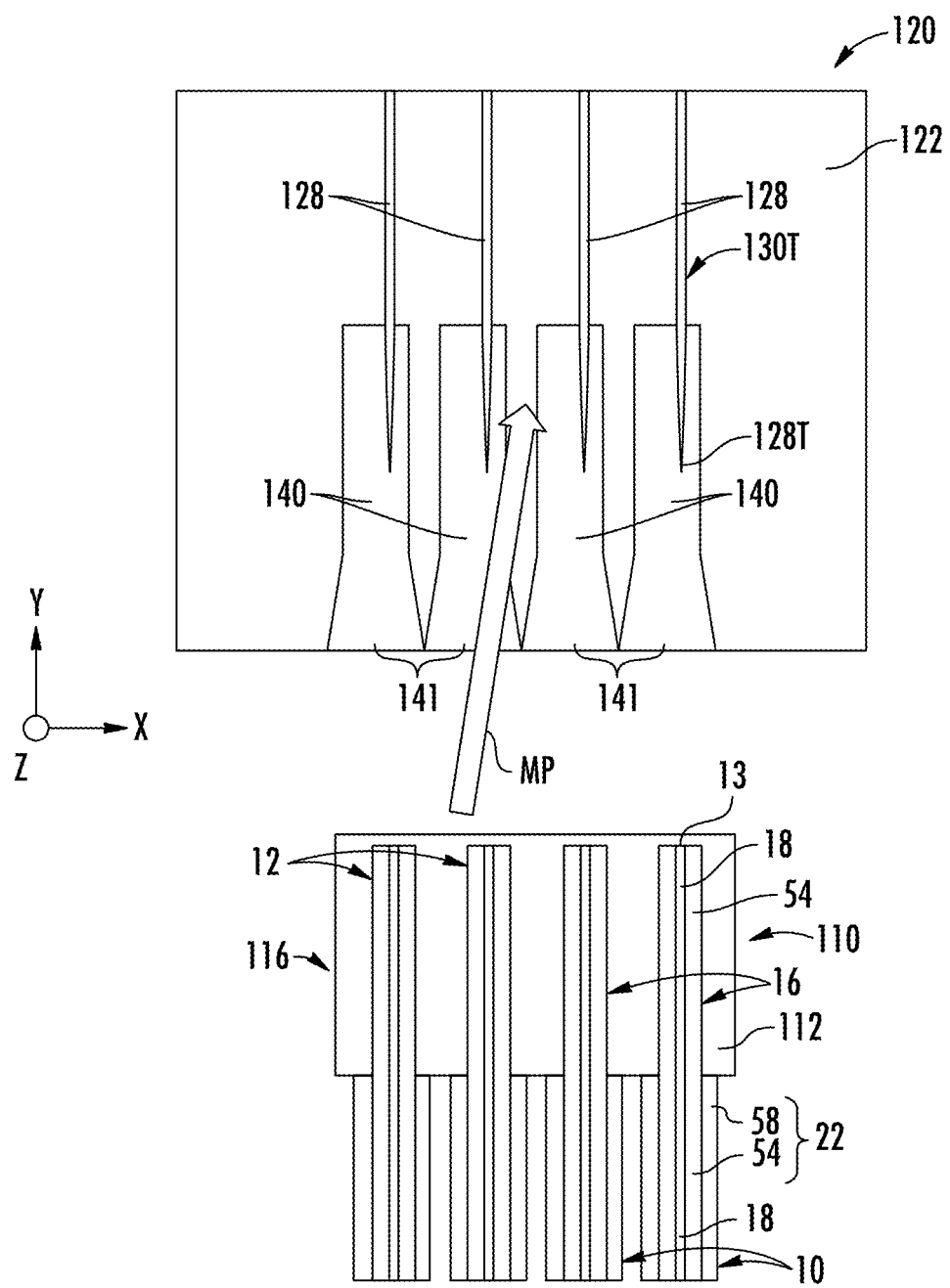
Figure 29D:
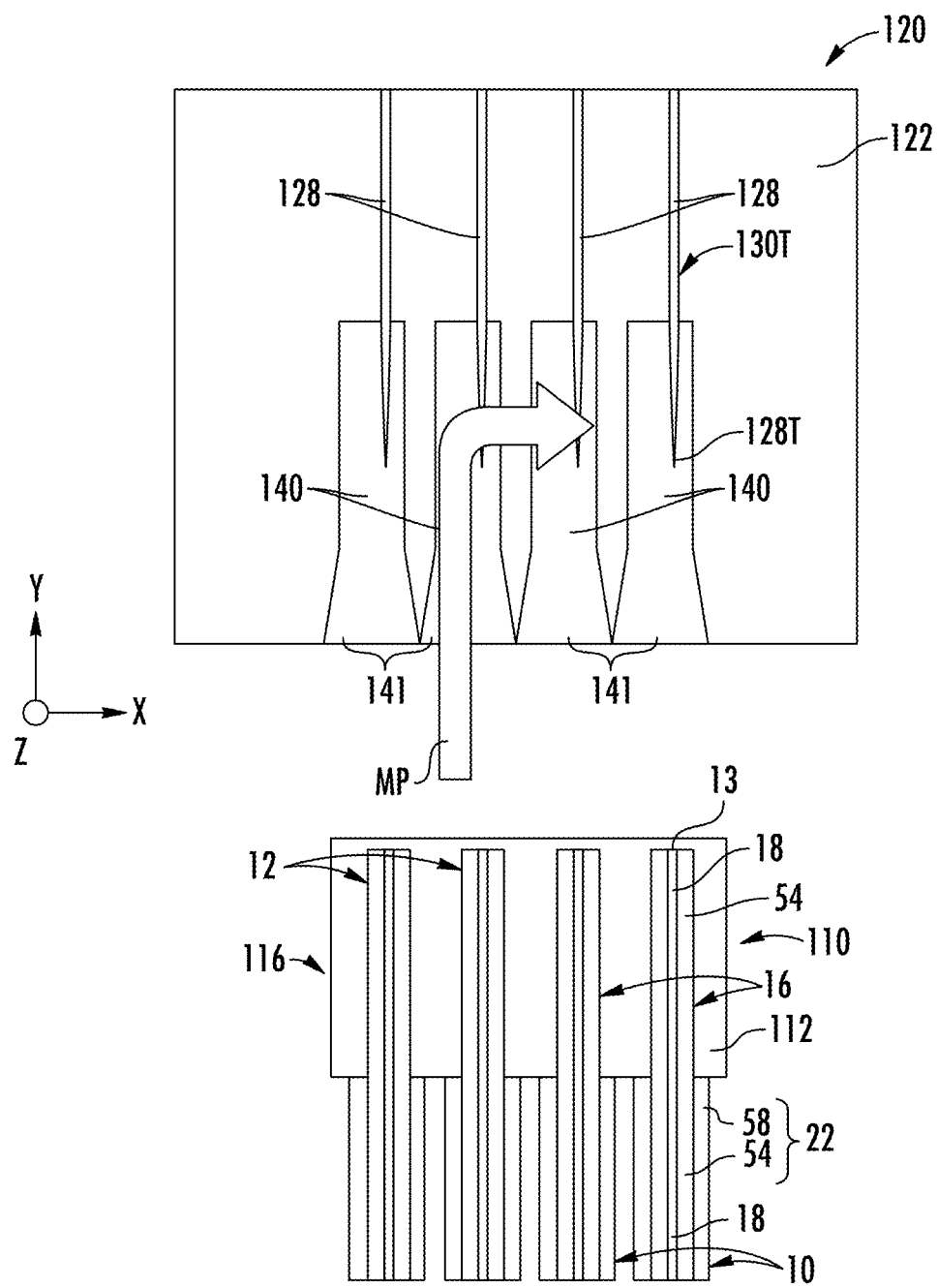

Instead of requiring two separate motions, in another example illustrated in FIG. 29C, the axial and lateral motions are combined to define a second example motion path MP with a single angled direction of motion. With reference to FIG. 29D, in another example the axial and lateral motions are replaced with curved, J-shaped motion path MP.

In an example, the motion paths MP for the alignment assembly 116 are defined in the plane of the photonic device 120. The motion paths can be determined by mechanical features (not shown) of connector elements that hold the alignment assembly 116. These mechanical features can include slot, rail, and cam structures that guide the alignment assembly 116 into position during coarse and fine alignment operations. In other examples, the motion paths MP can have small movement components that are out of the plane of the photonic device 120.

While the embodiments disclosed herein have been set forth for the purpose of illustration, the foregoing description should not be deemed to be a limitation on the scope of the disclosure or the appended claims. It will be apparent to those skilled in the art that various modifications and variations can be made without departing from the spirit or scope of the claims.

It will be understood by one having ordinary skill in the art that construction of the described disclosure and other components is not limited to any specific material. Other exemplary embodiments of the disclosure disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit, unless the context clearly dictates otherwise between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

For purposes of this disclosure, the term "coupled" (in all of its forms: couple, coupling, coupled, etc.) generally means the joining of two components (optical, electrical or mechanical) directly or indirectly to one another. Such joining may be stationary in nature or movable in nature. Such joining may be achieved with the two components (optical, electrical or mechanical) and any additional intermediate members being integrally formed as a single unitary body with one another or with the two components. Such joining may be permanent in nature, or may be removable or releasable in nature, unless otherwise stated. It will be apparent to those skilled in the art that various modifications and variations can be made without departing from the spirit or scope of the claims.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned embodiments without departing from the concepts of the present disclosure, and further it is to be understood that such concepts are intended to be covered by the following claims unless these claims by their language expressly state otherwise.

What is claimed is:

1. A method of performing evanescent optical coupling, comprising:
   providing at least one optical fiber having a central axis, a glass core, and a cladding, the cladding comprising an inner cladding made of glass and an outer cladding made of a polymer, and wherein the glass core and the glass inner cladding define a glass portion of the optical fiber;
   processing the at least one optical fiber to define a stripped portion substantially free of the outer cladding and configured to expose the glass portion, wherein the exposed glass portion defines: i) a first flat surface parallel with the central axis, wherein the core resides at or closely proximate to the first flat surface; and ii) an alignment feature;
   removing at least a portion of the outer cladding adjacent the exposed glass portion to allow for bending of the at least one optical fiber;
   bending the at least one optical fiber to define an axial coupling length for the exposed glass portion;
   operably engaging the alignment feature with an alignment member so that the alignment member operably supports the stripped portion to define an alignment assembly; and
   using the alignment assembly to bring the glass core sufficiently close to and in relative alignment with a waveguide core of at least one waveguide to establish evanescent coupling between the at least one optical fiber and the at least one waveguide.

2. The method according to claim 1, wherein the at least one optical fiber comprises multiple optical fibers, and wherein the at least one waveguide comprises multiple waveguides operably supported in respective alignment channels of a photonic device, the method further comprising:
  inserting the glass portions of the multiple optical fibers into respective ones of the alignment channels.

3. The method according to claim 2, wherein the inserting of the glass portions of the multiple optical fibers into respective ones of the alignment channels includes inserting the glass portions into respective flared open ends of the alignment channels.

4. The method according to claim 3, wherein each alignment channel includes first and second opposing sidewalls and is wider than the glass portion, wherein the waveguides each respectively reside closest to the first sidewall, and further comprising:
  moving the alignment assembly over a motion path that causes the glass portions of each optical fiber to be moved into an aligned position when making contact with the first sidewall.

5. The method according to claim 1, wherein said removing comprises performing laser ablation.

6. The method according to claim 1, wherein said bending of the at least one optical fiber comprises pressing the exposed glass portion against a curved surface of a shaping member.

7. The method according to claim 1, wherein said bending of the at least one optical fiber comprises sandwiching the exposed glass portion between a shaping member and a shaping jig and applying a squeezing force to the shaping member and the shaping jig.

8. The method according to claim 2, further comprising:
  supporting the multiple glass portions in respective alignment grooves of an alignment jig, wherein the alignment grooves have a same period $\Lambda$ as the alignment channels of the photonic device; and
  using the alignment jig to position the multiple glass portions on the alignment member so that the multiple glass portions define the period $\Lambda$.

9. The method according to claim 8, further including receiving the multiple glass portions on a resilient surface of the alignment member.

10. The method according to claim 1, wherein the exposed glass portion has a key-shaped profile with a bulbous portion that includes the first flat surface and a dovetail portion that includes the alignment feature, and further comprising:
  gripping the dovetail portion with gripping elements supported by the alignment member.

11. The method according to claim 10, wherein the at least one optical fiber comprises multiple optical fibers having a select period $\Lambda$, the method further comprising:
  arranging the exposed glass portions of the multiple optical fibers on the alignment member with optical fiber spacers residing between the exposed glass portions to define paced apart alignment channels having the select period $\Lambda$.

12. The method according to claim 1, further comprising defining the first flat surface and the alignment feature in a preform used draw the at least one optical fiber.

13. A method of performing evanescent optical coupling, comprising:
  providing at least one optical fiber having a central axis, a glass core, and a cladding, the cladding comprising an inner cladding made of glass and an outer cladding made of a polymer, and wherein the glass core and the glass inner cladding define a glass portion of the optical fiber;
  processing the at least one optical fiber to define a stripped portion substantially free of the outer cladding and configured to expose the glass portion, wherein the exposed glass portion defines: i) a first flat surface parallel with the central axis, wherein the core resides at or closely proximate to the first flat surface; and ii) an alignment feature;
  operably engaging the alignment feature with an alignment member so that the alignment member operably supports the stripped portion to define an alignment assembly; and
  using the alignment assembly to bring the glass core sufficiently close to and in relative alignment with a waveguide core of at least one waveguide to establish evanescent coupling between the at least one optical fiber and the at least one waveguide;
  wherein the at least one optical fiber comprises multiple optical fibers, and wherein the at least one waveguide comprises multiple waveguides operably supported in respective alignment channels of a photonic device, the method further comprising:
    supporting the multiple glass portions in respective alignment grooves of an alignment jig, wherein the alignment grooves have a same period $\Lambda$ as the alignment channels of the photonic device;
    using the alignment jig to position the multiple glass portions on the alignment member so that the multiple glass portions define the period $\Lambda$; and
    inserting the glass portions of the multiple optical fibers into respective ones of the alignment channels.

14. The method according to claim 13, further including receiving the multiple glass portions on a resilient surface of the alignment member.

15. A method of performing evanescent optical coupling, comprising:
  providing at least one optical fiber having a central axis, a glass core, and a cladding, the cladding comprising an inner cladding made of glass and an outer cladding made of a polymer, and wherein the glass core and the glass inner cladding define a glass portion of the optical fiber;
  processing the at least one optical fiber to define a stripped portion substantially free of the outer cladding and configured to expose the glass portion, wherein the exposed glass portion defines: i) a first flat surface parallel with the central axis, wherein the core resides at or closely proximate to the first flat surface; and ii) an alignment feature;
  operably engaging the alignment feature with an alignment member so that the alignment member operably supports the stripped portion to define an alignment assembly, wherein the exposed glass portion of the at least one optical fiber has a key-shaped profile with a bulbous portion that includes the first flat surface and a dovetail portion that includes the alignment feature, and wherein operably engaging the alignment feature with the alignment member comprises gripping the dovetail portion with gripping elements supported by the alignment member; and
  using the alignment assembly to bring the glass core sufficiently close to and in relative alignment with a waveguide core of at least one waveguide to establish evanescent coupling between the at least one optical fiber and the at least one waveguide.

16. The method according to claim 15, wherein the at least one optical fiber comprises multiple optical fibers having a select period Λ, the method further comprising:

arranging the exposed glass portions of the multiple optical fibers on the alignment member with optical fiber spacers residing between the exposed glass portions to define paced apart alignment channels having the select period Λ.

* * * * *